US007185603B2

(12) United States Patent  
Correa et al.

(10) Patent No.: US 7,185,603 B2  
(45) Date of Patent: Mar. 6, 2007

(54) AUTOMATED EGG INJECTION MACHINE AND METHOD

(75) Inventors: Rafael S. Correa, Salisbury, MD (US); Marco A Quiroz, Salisbury, MD (US); William D. Samson, Salisbury, MD (US); Erich F. Bevensee, Salisbury, MD (US)

(73) Assignee: Avitech, LLC, Salisbury, MD (US)

( * ) Notice: Subject to any disclaimer, the term of this patent is extended or adjusted under 35 U.S.C. 154(b) by 0 days.

(21) Appl. No.: 10/868,361

(22) Filed: Jun. 16, 2004

(65) Prior Publication Data

US 2005/0039688 A1 Feb. 24, 2005

Related U.S. Application Data

(63) Continuation of application No. 09/949,900, filed on Sep. 12, 2001, now abandoned.

(51) Int. Cl.  
*A01K 45/00* (2006.01)

(52) U.S. Cl. .................................... 119/6.8
(58) Field of Classification Search ............. 119/6.8  
See application file for complete search history.

(56) References Cited

U.S. PATENT DOCUMENTS

| 1,191,061 | A | * | 7/1916 | Carter | ............. | 417/297.5 |
| 3,377,989 | A | * | 4/1968 | Sandhage et al. | ............. | 119/6.8 |
| 4,040,388 | A | * | 8/1977 | Miller | ............. | 119/6.8 |
| 4,903,635 | A | * | 2/1990 | Hebrank | ............. | 119/6.8 |

(Continued)

FOREIGN PATENT DOCUMENTS

GB 2 297 677 8/1996

OTHER PUBLICATIONS

"INOVOJECT", www.embrex.com.*

(Continued)

*Primary Examiner*—Son T. Nguyen  
(74) *Attorney, Agent, or Firm*—Jacobson Holman PLLC

(57) ABSTRACT

A pneumatically operated egg injection machine includes a sealed frame structure with a pair of in line parallel tracks through an injection section and a transfer section in series. An injection assembly over one parallel track includes a plurality of injectors gripped in a support plate to simultaneously inject vaccine into the same injection region irrespective of egg height and orientation. Fluid delivery systems meter prescribed vaccine dosages to the injecting needles with reduced turbulence, friction, heat and residence time to increase the delivered titer to the injected eggs. A transfer assembly includes a plurality of transfer suction cups which lift the injected eggs by causing a reduced pressure in a ring around the injection hole while maintaining the injection hole at atmospheric pressure, thus avoiding negative pressure in the egg. Once the eggs are lifted, the plate and suction cups move horizontally across the machine over to the other parallel track to deposit the injected eggs. All of the eggs are injected and transferred as a single group. The injection assembly is sprayed with a sanitizing solution at the same time that the injected eggs are moved from the injection section to the transfer section and the transfer assembly can transfer the eggs from the incubating tray to the hatching tray while the eggs in the next incubating tray are injected by the injecting assembly, thus increasing machine speed. The operation of the machine is controlled and monitored by a controller or computer with appropriate visual display monitor.

24 Claims, 38 Drawing Sheets

U.S. PATENT DOCUMENTS

| | | | |
|---|---|---|---|
| 5,056,464 A * | 10/1991 | Lewis | 119/6.8 |
| 5,107,794 A * | 4/1992 | Bounds, Jr. | 119/328 |
| 5,136,979 A * | 8/1992 | Paul et al. | 119/6.8 |
| 5,247,903 A | 9/1993 | Bounds, Jr. | 119/44 |
| RE35,973 E | 12/1998 | Paul et al. | 119/6.8 |
| 6,032,612 A * | 3/2000 | Williams | 119/6.8 |
| 6,149,375 A * | 11/2000 | Hebrank | 414/737 |
| 6,240,877 B1 * | 6/2001 | Bounds | 119/6.8 |
| 6,244,214 B1 * | 6/2001 | Hebrank | 119/6.8 |
| 7,041,439 B2 * | 5/2006 | Phelps et al. | 435/4 |

OTHER PUBLICATIONS

INOVOJECT, embrex inc.
SERVOJECT, Automatic Egg Injection system.

\* cited by examiner

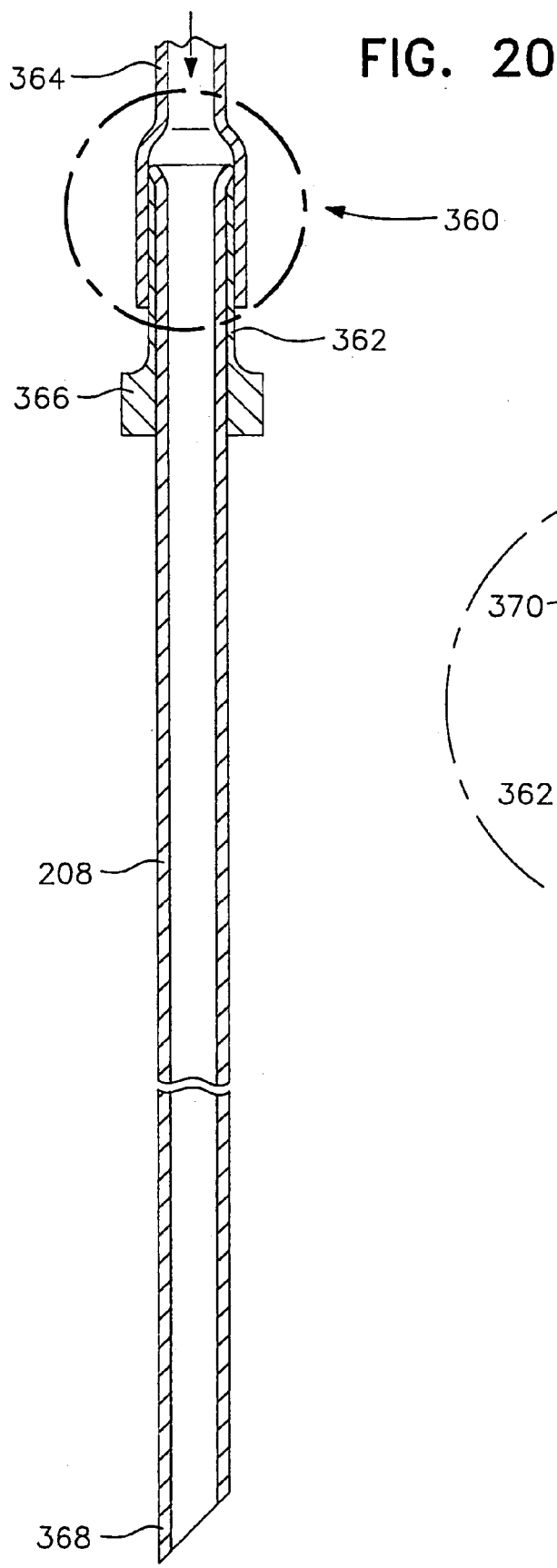
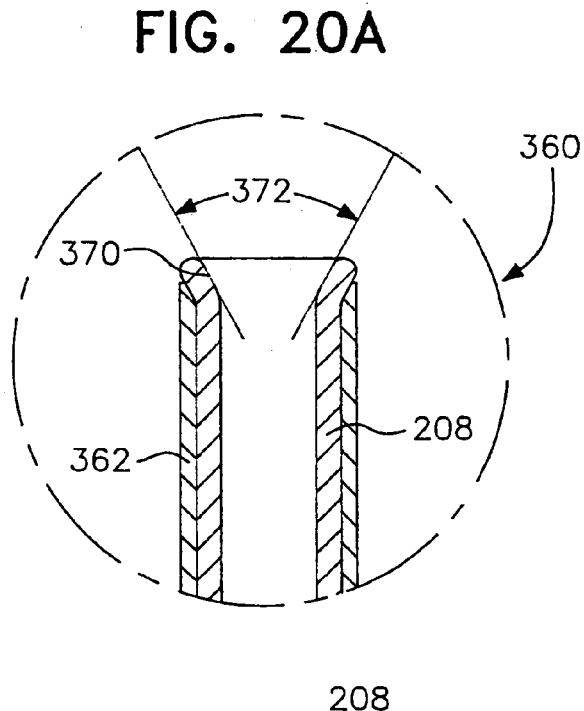
FIG. 20
FIG. 20A

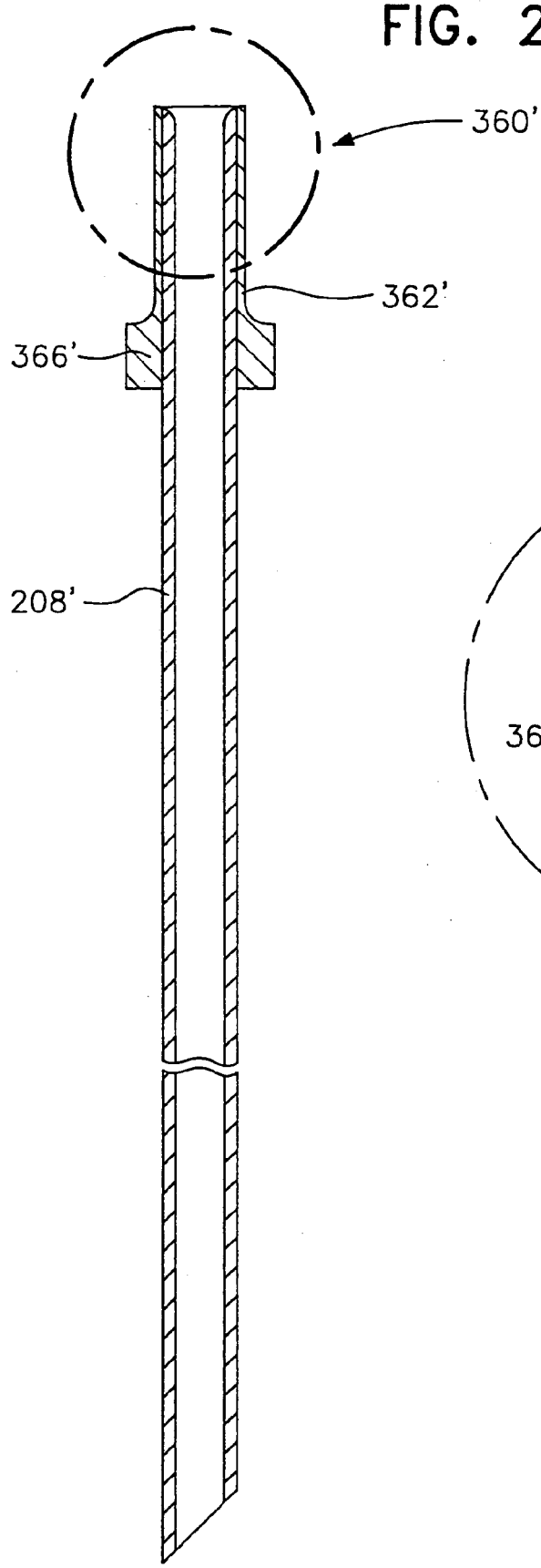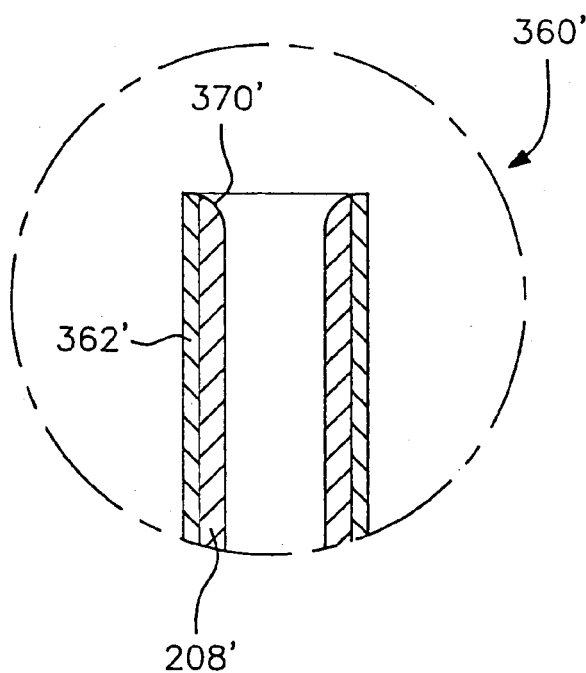

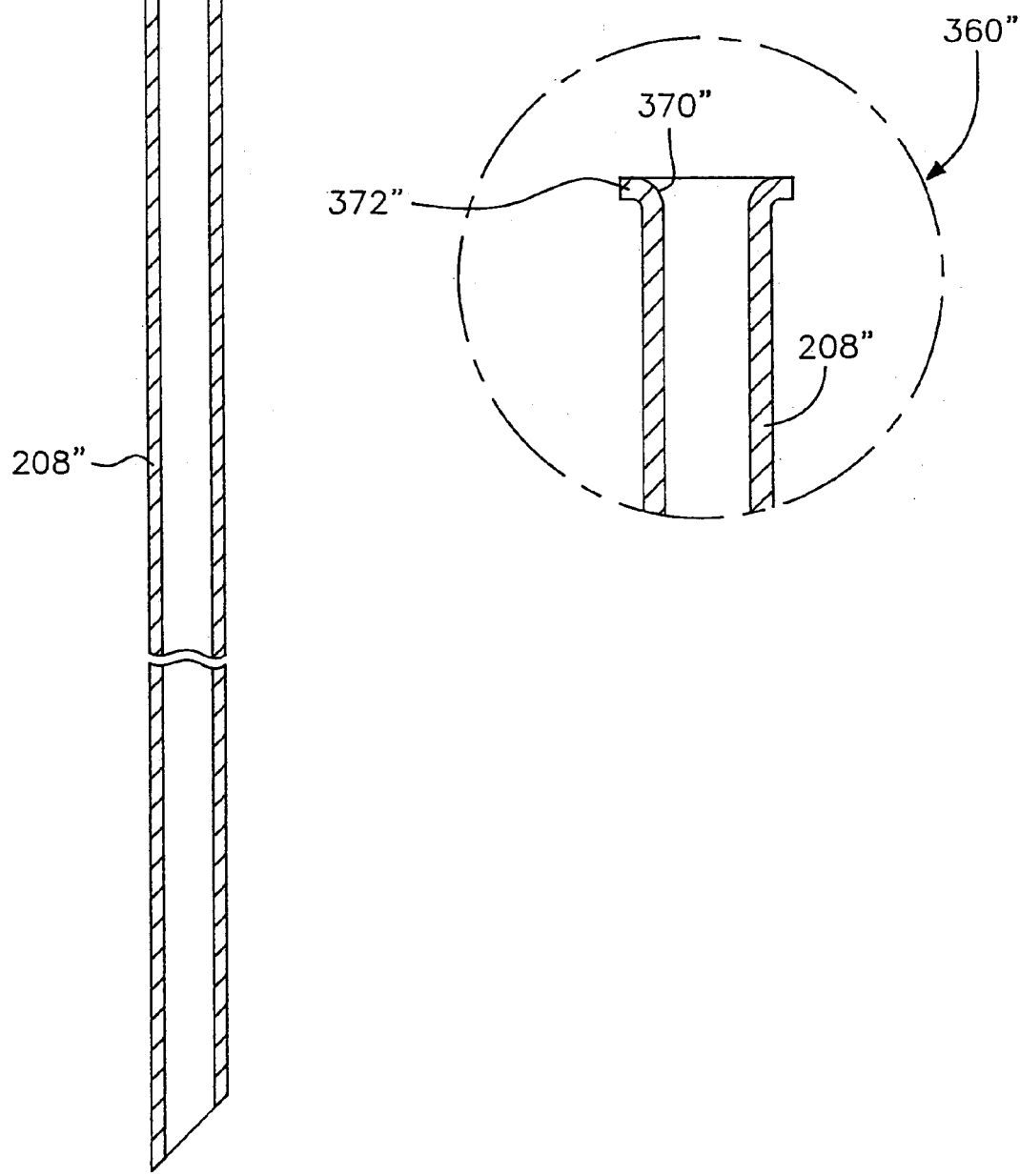

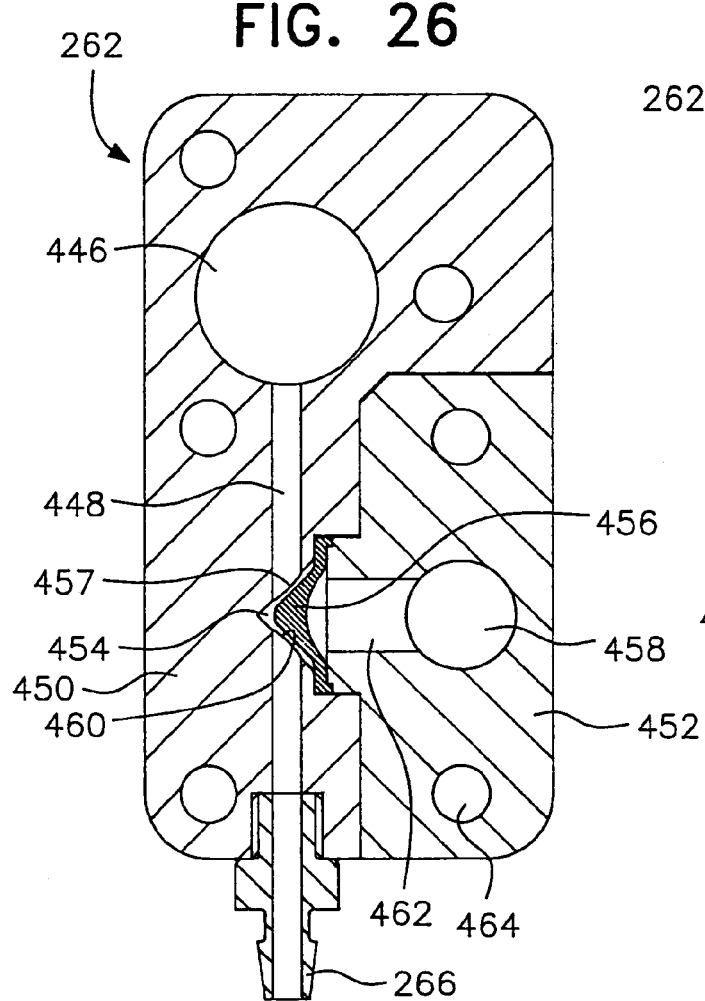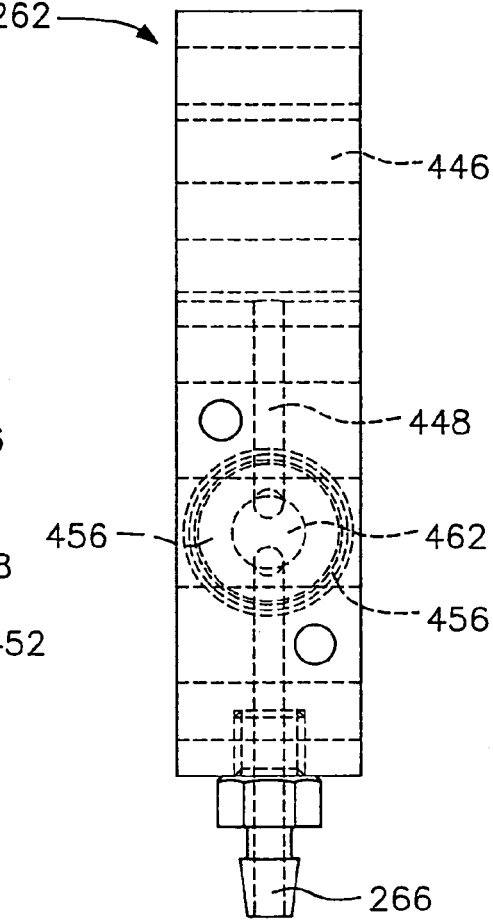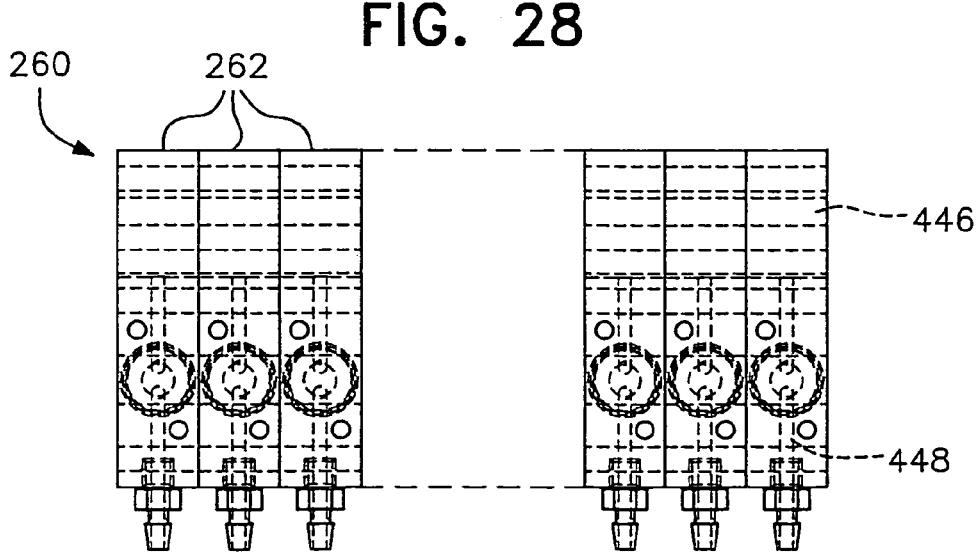

AUTOMATED EGG INJECTION MACHINE AND METHOD

This is a continuation of application Ser. No. 09/949,900 filed Sep. 12, 2001 now abandoned.

BACKGROUND OF THE INVENTION

1. Field of the Invention

The present invention relates generally to a machine for the injection of eggs, typically referred to as "in ovo" injection, and the method performed in such egg injection. More specifically, the present invention is directed to a machine and method for the automated injection of various substances into eggs, especially live vaccines for the control of diseases in chickens and other avian flocks.

2. Prior Art

Advances in poultry embryology have made possible the addition of various materials to the embryo or the environment around the embryo within an avian egg for the purpose of encouraging beneficial effects in the subsequently hatched chicks. The substances which may be added include antimicrobials such as antibiotics, bactericides and sulfonamides; vitamins; enzymes; nutrients; organic salts; hormones; adjuvants; immune stimulators, probiotics and vaccines. This in ovo injection technique can, for example, lead to an increased percentage of hatch. The chicks from eggs that are injected prior hatch may retain a sufficient amount of the injected substance so there is no need to inject the hatched bird. The chicks may grow faster and larger and experience improvement in other physical characteristics. Additionally, certain types of vaccinations which could previously only be carried out upon either recently hatched or fully mature poultry can now be successfully delivered in the embryonated chick.

Thus, in ovo injection has become an effective means for disease prevention in avian flocks. In the poultry industry, a high incidence of infectious disease increases the cull rate and causes a high rate of mortality during the growing stage of young birds. One example of the infectious diseases is Marek's disease. It is a viral disease of chickens resulting in a type of cancer, and is one of the most serious threats to poultry health. This virus lies latent in T-cells, which are a type of white blood cells. T-cells are an integral part of the immune system response which is the bird's natural defense against disease. Within three weeks of infection, the fatal virus manifests as aggressive tumors in the spleen, liver, kidney, gonads, skin and muscle of the infected bird.

It has been found that by proper selection of both the site and time of inoculation, embryonic vaccination can be effective in the control of poultry diseases. It is essential that the egg be injected during the final quarter of the incubation period, and that the inoculate be injected within either of the regions defined by the amnion or the yolk sac. Under these conditions, the embryo will favorably respond immunologically to the vaccine with no significant impairment of its prenatal development.

A live cell-associated virus vaccine of tissue culture origin typically contains the Rispens strain, the SB1 strain of the chicken herpes-virus and the FC 126 HVT strain of the turkey herpes virus alone or in combination. The vaccine is presented in glass ampules containing concentrated vaccine, typically 1000 doses each, with a specified titer defined as Plaque Forming Units ("PFUs") The vaccine product is stored in a frozen condition typically in liquid nitrogen freezer and shipped in liquid nitrogen. A special sterile diluent is supplied in a separate package, typically a sealed plastic bag with appropriate injection port and delivery tube opening. The vaccine is reconstituted by thawing the frozen vaccine in the glass ampule. The ampule is then broken open and the liquid vaccine product is withdrawn from the ampule using a needle and syringe. The diluent is stored at room temperature until use when the concentrated vaccine product withdrawn from the ampule by the needle and syringe is then injected into the diluent contained in the sealed plastic bag through the bag injection port. The reconstituted vaccine is then ready for delivery from the sealed bag through the delivery tube.

There are various factors that affect the level of PFUs delivered by a live cell vaccine, such as Marek's vaccine, to an inoculated specimen. Most of these factors occur during the vaccine reconstitution and in the delivery process. The factors which affect the level of PFUs delivered to the egg have to do with vaccine handling, temperature, turbulence in the syringe, air pressure, friction, pH, vaccine delivery tube length, diameter and configuration, needle length and diameter, needle shape and delay in vaccine consumption after thawing. Elimination or reduction of the adverse effects arising from these noted factors would greatly improve the inoculation process for Marek's vaccine, specifically, and for live vaccines, generally.

The automated in ovo injection technique involves delivering a vaccine in fluid form to the interior of an egg using an automated machine which delivers the vaccine to the egg through a needle. The needle can be used to both penetrate the egg shell and deliver the fluid substances, or the opening in the shell can be performed separately in advance of the fluid injection. The egg can be injected at any location within the egg, and even into the embryo itself. The suitability of a particular location depends on the purpose for which the egg is being injected and the fluid substance delivered. Some substances must be delivered to a particular location within the egg in order to be effective. The problem with locating the needle at the appropriate injection point is that eggs vary in size, thus varying the distance between the shell and the location at which delivery of the fluid substance is desired. A primary goal of automated in ovo injection is to be able to handle a high egg volume in a short period of time while consistently delivering a correct amount of vaccine fluid to the desired location within each of the eggs and without contaminating the eggs.

Typically, the eggs are incubated by the hatchery in an incubating tray placed in an incubator or setter machine. After injection, the injected eggs must be transferred to a hatching tray to be placed in the hatchers or hatching machine. Usually, the eggs from two or more incubating trays are transferred to each hatching tray. Conventional incubating trays include the Chick Master® 54 tray, the Jamesway® 42 tray, and the Jamesway® 84 tray (in each case, the number indicates the number of eggs carried by the tray). The eggs from three Chick Master® 54 trays, or a total of 162 eggs, would be transferred to a single hatching tray; the eggs from four Jamesway® 42 trays, or a total of 168 eggs, would be transferred to a single hatching tray; and the eggs from two Jamesway® 84 trays, or a total of 168 eggs, would be transferred to a single hatching tray. There are some incubating trays, such as the La Nationale® incubating tray, which are sufficiently large enough to include a total number of eggs, in this case 132 eggs, such that the eggs from a single incubating tray would be transferred to its corresponding hatching tray.

Automated machines and methods for simultaneously injecting a large number of eggs are known. In one well known commercial machine, the eggs in the incubating trays are brought under a bank of injectors which house both needles and punches. First, the punches open a hole in the egg shell. Then, the needle is inserted into the egg through the open hole, followed by injection of the fluid. The punch is necessary because the needle is long and thin and can not repeatedly punch egg shells without bending and/or clogging. This system is shown, for example, in U.S. Pat. No. 4,691,063 to Hebrank. In another machine, such as shown in U.S. Pat. No. 6,240,877 B1, the injectors house a single needle which both punches the hole in the egg shell with a closed needle end and then delivers the fluid through a hole in the side of the needle tip. There are drawbacks to both of these prior art needle systems.

There is another major drawback in the two known automated machines and methods in that they inject the eggs in the incubating trays in sequence, rather than all at one time. The injecting needles must then be sanitized after each injecting sequence. Hence, the sequential injection of the eggs slows down the overall operation of the machine. Equally important, the sanitizing solution remains on the undersurface of the injection assembly and/or needles as they move over to the next section of eggs to be injected. This allows the sanitizing solution to drip onto the next group of eggs to be injected, thus raising potential contamination hazards.

Automated machines for simultaneously injecting eggs must also address the fact that eggs are not identical in size. In addition, they must take into account the fact that the eggs may be slightly tilted with respect to the injectors when carried in the egg depressions of the incubating trays. Because the depressions are designed to accommodate the varying sizes of eggs, the eggs are free to wobble in the depression. The ability to accurately and precisely control the travel of a needle within the egg is diminished when the egg is tilted, even where the relative vertical travel between the egg and the needle is carefully controlled to account for differences in egg height.

Different methods have been used for dealing with the varying egg size and egg position in the egg flat. In the aforesaid in ovo inoculating machine disclosed in U.S. Pat. No. 4,681,063, the injectors include a flexible cup at their lower end which serves to engage the eggshell for positioning prior to punching the hole and injecting the fluid or vaccine. One of the problems with this inoculating machine is that the suction cups used to secure and transfer the eggs during and after inoculation are right over the injection holes. Changes in pressure inside the egg can cause contamination in the eggs and an open suction area in the mouth of the cup can cause contamination into the cups. Then the dark wet surface areas inside the cups become a good place for mold and bacteria to grow. Subsequent injections then infect the subsequently injected eggs.

In the in ovo injecting machine of the other patent, U.S. Pat. No. 6,240,877 B1, the injectors include an articulating nesting cup at the lower end, which has a frustoconical inner surface to engage the eggshell. Then, when the injector body is held in position by the machine, the nesting cup holds the egg in position for punching and injecting the egg. One problem with this injector design is the large number of operating and moving parts which wear, fail, and/or become subject to fatigue, over time and must be repaired or replaced, with consequent downtime of the machine.

Existing in ovo injection machines are also believed to be damaging to live virus vaccines, such as Marek's vaccine, due to the destruction of the live cells from the time that the concentrated vaccine is reconstituted with the diluent, transferred from the storage container to the injectors through the machine tubing and passageways and finally delivered to the eggs through the injecting needles. The residence time of the reconstituted vaccine in the machine before delivery to the egg and the heat, friction and turbulence that the vaccine encounters as it moves through the machine from the storage container and out through the injecting needle are all highly detrimental to the live cells in known vaccines, particularly Marek's vaccine, and substantially reduce the PFUs which are delivered to the eggs through the injecting needles. It is believed that the known in ovo injecting machines could reduce the level of PFUs delivered from the injecting needles as much as 75%, and more, from the prescribed titer specified by the vaccine manufacturer.

While it was known that length of delivery time, heat and turbulence could be detrimental to the live cell count of various vaccines, including Marek's vaccine, it was not appreciated that these factors were causing significant live cell destruction in the in ovo injecting machines commercially available. More specifically, it was not appreciated that residence time of the vaccine in the machine, or the length of time the vaccine is subjected to heat in the machine, or the friction imparted to the vaccine while traveling through the machine, or the significant turbulence caused to the vaccine during the delivery process, could all significantly reduce the live cell count, or the PFUs of the vaccine, including Marek's vaccine, in the automated delivery of the vaccine to the egg. Furthermore, it was not appreciated as important that an automated in ovo injecting machine should be designed to reduce the adverse effect of these factors, i.e. residence time, excess heat, friction and turbulence, on the live cell count of the vaccines.

Turning to other aspects of known automated in ovo injection machines, they typically include a transfer section in the machine, after egg injection, to transfer the injected eggs from the incubating trays to hatching trays. In one well known machine, flexible suction cups, as disclosed in the aforesaid U.S. Pat. No. 4,681,063, are used to lift the injected eggs from the incubating tray for transfer to the hatching tray. However, as pointed out previously, these flexible suction cups cause a likelihood that bacteria and mold will enter subsequent eggs, thus creating the possibility of cross-contamination, since the same suction cups are used repeatedly in creating a reduced pressure inside the eggs through the injection hole. Other type transfer stations, or separate machines, are also known. Such separate transfer machines are disclosed in U.S. Pat. Nos. 5,107,794 and 5,247,903. One drawback of these latter transfer machines is the possibility of egg breakage as the eggs are rotated 180° from the incubating tray (or egg flat) into the hatching tray.

Furthermore, known commercial in ovo injection machines have the eggs going into the machine and coming out of the machine from the same side of the machine or employ only a single tray track. More specifically, the operator places the incubating tray containing the eggs to be injected into the front end of the machine. After transfer of the injected eggs into the hatching tray, the filled hatching tray is removed by the operator also from the front or side of the machine. In more modern facilities, it may be more desirable for the incubating trays with the eggs for injection to be inserted at the front end of the machine, and have the filled hatching tray removed from the opposite or rear end of the machine. Such a through machine would permit the filled incubating tray and empty hatching tray to be loaded in a side-by-side relation at the front end of the machine, the trays to move parallel in-line through the machine, and the empty incubating tray and filled hatching tray after transfer to move away from the rear end of the machine by automatic operation. Such a design would allow the injection machine to operate more quickly and with less labor.

In addition to the foregoing, the known commercial automated in ovo injecting machines have a large number of mechanically operating components which are subject to wear, fatigue and failure during the long operating hours of the machine, thus requiring constant repair and replacement. The machine designs are also such as to allow dir, airborne contaminants, broken egg particles, etc. to collect in cracks, crevices and corners, which are not readily susceptible to cleaning or power washing. This contaminant accumulation can cause sanitation problems during the process of injecting the eggs under high speeds and over long hours of use.

For the foregoing reasons, there is a need for an automated injecting apparatus and method for simultaneously injecting eggs which are less labor-intensive than known systems, which can lend themselves to automated conveyor systems and which can be kept clean and free of debris collecting corners and crevices. The apparatus should handle a high volume of eggs with a high level of precision with respect to both the location and quality of vaccine delivered. The apparatus and method should also reduce the residence time of the vaccine in the machine prior to injection into the egg, reduce the amount of heat to which the vaccine is subjected prior to injection, reduce the friction to which the vaccine is subjected in the machine, and reduce the turbulence created in the vaccine during its passage from the vaccine delivery bag through the machine apparatus, tubing and needle and into the egg.

Ideally, fluid delivery should be quick, gentle and precise so as not to damage live vaccine cells. The apparatus design and overall method of operation should be sanitary so as to minimize, if not eliminate, cross-contamination and allow for good machine cleanability. The machine design should also minimize operating mechanical parts and facilitate both manufacture and operation, thus reducing manufacturing, operating and maintenance costs as compared to known machines and methods.

SUMMARY OF THE INVENTION

In view of the foregoing drawbacks in known automated in ovo injection machines, the present invention provides an in line parallel track egg injection apparatus and method for in ovo injection that overcomes drawbacks in known machines. The injection apparatus of the present invention provides a method for simultaneously injecting a large number of eggs with a desired vaccine fluid at a predetermined location within the egg and with a higher delivered quality of vaccine than known machines.

The present invention is particularly adapted for use with conventional incubating trays or egg carriers often referred to as "egg flats." By using the normal incubating tray or egg flat, the present invention eliminates the need to transfer the eggs into special injection trays. As described above, the eggs from one to four, or more, incubating trays are to be injected and transferred for each hatching tray. The injection apparatus and method of the present invention contemplates that all of the eggs necessary for a single hatching tray be injected at one time in the incubating tray or trays, whether it be three Chick Master® 54 trays, four Jamesway® 42 trays, two Jamesway® 84 trays, or a single La Nationale® tray. Hatcheries often place the appropriate number of incubating trays carrying the total eggs necessary for transfer onto a single hatching tray on an egg flat carrier, or "egg flat", which positions the incubating trays in proper longitudinal alignment. As used herein, therefore, the term "incubating tray" is intended to include an appropriate number of incubating trays, whether one, two, three, four or more sufficient to fill one hatching tray, so that the eggs are simultaneously injected and the hatching tray is then filled all at one time during a single injection and transfer cycle in accordance with the present invention.

The injection apparatus of the present invention includes an upright rigid frame which divides the machine longitudinally, or in the machine direction, into two sections, an injection section and a transfer section. The injection section comprises generally the front half of the machine and the transfer section comprises generally the rear half of the machine. The frame also includes a generally rectangular horizontal support structure which defines two spaced side-by-side parallel in-line tracks divided by a center guide. The parallel in-line tracks and center guide extend longitudinally through the machine and are approximately waist high in the vertical height of the machine. The parallel tracks are designed to receive and transport the incubating trays and hatching trays in a generally parallel side-by-side relationship through the injection and transfer sections of the machine. The tracks and center guide thus divide the machine in the transverse, or cross-machine, direction generally into two sides, a right side and a left side, as one faces the machine at the front end. In a preferred embodiment, the incubating trays travel the track on the machine right side and the hatching trays travel the track on the machine left side.

Each parallel track includes a pair of parallel guide rails on each side to support the incubating and hatching trays. The inside guide rail on each track is integral with or supported on the center guide. The outside guide rail of the incubating tray track is movable laterally to clamp the tray in position laterally in each of the injection and transfer sections during the injection and transfer sequences. Each parallel track also includes a tray positioning assembly to move the trays longitudinally along their respective parallel tracks. Hence, the incubating trays with the eggs for injection are inserted into the machine along the right side or incubating tray track and empty hatching trays are inserted into the machine on the left side or hatching tray track both from the front end of the machine. Once the incubating tray with the eggs for injection is inserted onto the right side track, the associated tray positioning assembly positions the tray longitudinally against a retractable stop which extends out of the center guide. The movable outer guide rail is then moved inwardly to clamp the tray in the prescribed position in the injection section.

At the injection section is an injection assembly supported on the machine frame structure over the incubating tray track carrying the eggs to be injected. As stated above, the injection section is positioned toward the front end of the machine so that filled incubating trays entering the machine first pass through the injection section. The injector assembly includes a generally horizontal injector support and holding plate and a series of individual injectors which are each separately supported in a pattern of holes or openings in the support plate. In accordance with the present invention, all of the eggs in the incubating tray are injected by the injector assembly at one time and, hence, there are an equal number of holes or openings in the support plate as there are eggs to be injected in the incubating tray. The openings then vertically align the injectors with all of the eggs, one injector over each egg, in the incubating tray. The plate is supported from a pair of vertically actuating pneumatic cylinders spacially mounted on a longitudinally extending, stationary bridge structure which is mounted on the machine frame.

When the pneumatic cylinders move the injector support plate downwardly, and the bottom of each injector engages its aligned egg, each individual injector can move vertically upward in its support plate opening to adjust for varying heights of the eggs.

The vertically movable injectors include an injector body or housing which carries the injecting needle assemblies. The needle assembly includes a single needle for both egg shell penetration and fluid injection thereby eliminating the need for a separate punch. A soft egg engaging nipple is attached on the lowermost end of each injector housing. The egg engaging nipple of the instant invention presents a much smaller circular contact area to the egg, on the order of less than about one-half inch diameter, and preferably about three-eights inch, than the contact area of injectors of known machines. This small contact area better accommodates the varying sizes of eggs and egg tilt encountered when the eggs are positioned on the incubating trays. Each injector and its associated needle are designed so that the needle extends into the same injection region irrespective of the size and orientation of the egg.

Once the injection assembly reaches it lowermost position, and the engaging nipples of all injectors are in contact with their aligned eggs, the injectors are pneumatically clamped into their respective plate openings at each individual injector height as dictated by the size and orientation of each individual egg. All of the eggs are then injected simultaneously by pneumatically operating the injection needle assembly within the injector housing to extend the injection needle which punches each of the egg shells and extends into the designated injection region. The controller or computer then signals the vaccine delivery system to deliver a prescribed quantity of vaccine through the needles and into the eggs. The needle assemblies and needles are then pneumatically retracted back into the injector housings, and the support plate is lifted by the pneumatic cylinders carrying with it the plurality of injectors.

Once the eggs in the incubating tray are injected and the injector assembly lifted off the eggs, the clamping outer rail is released and the incubating tray with the injected eggs is moved on its rails to the back half of the machine underneath a transfer assembly at the transfer section. The incubating tray is moved from the injection section to the transfer section by the tray positioning assembly or pusher assembly which pushes the incubator tray in its track in response to completion of the egg injection. The incubator tray reaches its proper longitudinal position on the right side track when the tray's front end engages another retractable stop at the rear end of the machine which extends out of the center guide. The movable outer guide rail of the transfer section is then moved inwardly to clamp the incubating tray in the prescribed location in the transfer section. The injected eggs are then in position for transfer by the transfer assembly.

The transfer assembly is supported by a rectangular support structure mounted on the machine frame, which extends over both the incubating tray track and the hatching tray track. The transfer assembly includes a support plate having a pattern of holes or opening which vertically align with each injected egg in the incubating tray. The transfer support plate is supported from a pair of vertically actuating pneumatic cylinders spacially mounted on a longitudinally extending bridge structure, similar to the injection section bridge structure, but the transfer section bridge structure is designed to move horizontally, or transversely, across the machine within the rectangular support structure. Hence, the transfer assembly is capable of being positioned directly over the incubating tray containing the injected eggs on the right hand track and a hatching tray on the left hand track.

Vertically supported or mounted in each support plate hole is a unique transfer suction cup assembly which can engage each egg independently as the support plate is lowered onto the injected eggs in the incubating tray and adjust for egg size variation and orientation. The transfer suction cup assembly is designed to pneumatically apply suction for gripping the egg at a location away from the injection hole. More specifically, the transfer suction cup assembly of the present invention grips the egg in a vacuum ring which surrounds the injection hole, while leaving the injection hole at atmospheric pressure. As such, the suction cup assembly of the present invention is not creating reduced pressure inside the egg, and the potential for contamination of the suction cup assembly and cross-contamination of the eggs is substantially reduced.

After the transfer suction cup assemblies grip the injected eggs in the incubating tray, the pneumatic cylinders lift the support plate, thus lifting all of the transfer suction cup assemblies and the gripped eggs out of the incubating tray. Once the pneumatic cylinders complete their upstroke, a transverse pneumatic cylinder moves the moving bridge structure of the transfer assembly, together with the support plate, suction cup assemblies and gripped eggs, horizontally across the machine into overlying relation with the hatching tray track and the empty hatching tray positioned on the rails thereof. The vertically acting pneumatic cylinders lower the support plate so that the eggs engage the bottom of the hatching tray. The pneumatic suction in the transfer suction cups then is released, thus releasing the injected eggs into the hatching tray. The support plate with the suction cup assemblies is then raised to its up position and returned laterally by the transverse pneumatic cylinder to its starting position above the incubator tray track to repeat the transfer operation.

Supported on the tray positioning or pusher assembly is a sanitizing assembly in alignment with the injector assembly. The sanitizing assembly is equipped to spray sanitizing solution on the underneath side of the injectors and extended needles after each egg injecting cycle. The sanitizing assembly sprays the solution upwardly onto the underneath side of the injection assembly, and a pan collects the used solution after it drips off the underneath side of the needles (which are retracted after sanitizing), the injectors and the injector support plate. The engaging nipple at the bottom of each injector also engages the outside wall of its associated needle and serves as a wiper as the needle is retracted into the injector housing. A clean injection environment is thus maintained since all egg-contacting surfaces are sanitized after each injection cycle. This minimizes the potential for cross-contamination of the eggs.

Further, the injection machine of the present invention preferably is equipped with a hand held spray wand and nozzle as an integral part of the machine. The spray wand and nozzle are separately connected to the sanitizing solution and/or water containers so that components of the machine can be sanitized if broken or exploded eggs or the like contaminate components of the machine. The sanitizing and/or cleaning operation can be carried out without having to shut down the machine which would occur if the dirtied or contaminated areas are cleaned by hand.

The machine frame includes a lower shelf to support containers for the sanitizing solution, the various cleaning solutions, water and other machine components. The frame also supports a control cabinet which houses the controller or computer. The control panel is preferable above the left side or hatching tray track laterally across from the injection section in the front half of the machine. Further, the control cabinet is preferably under a slight head pressure, as by exhausting air from the pneumatic cylinders into the control cabinet. Pressurizing the control cabinet serves to prevent airborne contamination and moisture from entering the cabinet.

In accordance with an earlier embodiment of the in ovo injection machine of the present invention, the vaccine delivery system comprises a heart-type valve pump and a modular distribution manifold, both of which are pneumatically operated. This system moves the vaccine from the delivery bag or other vaccine storage container through the machine tubing and delivers a consistently sized quantity of vaccine to each egg. The pneumatically operated valve pump moves the vaccine with a minimum of friction and turbulence. The pump valve chamber is divided by a flexible pump membrane into a vaccine valve chamber and an air pressure chamber. By pneumatically drawing air out of the air pressure chamber and moving the flexible membrane to expand the volume of the vaccine chamber, the valve pump initially suctions vaccine from the delivery bag and into the vaccine valve chamber. Then, when the injection needles have pierced the egg shell, air is forced back into the air pressure chamber, pneumatically actuating the valve membrane to force a prescribed quantity of vaccine into the distribution manifold. As the valve injects a prescribed quantity of the vaccine into the distribution manifold, a precise quantity of vaccine fluid is forced out of each needle port into the respective egg interior. Preferable, there are two modular distribution manifolds and associated heart-type valve pumps which are mounted longitudinally on the machine frame, one on each side of the injection assembly so that the hose distance between each manifold outlet port and the vaccine inlet to the needle of each injector is maintained at a minimum.

More recently, a high precision vaccine delivery system has been developed. The high precision vaccine delivery system in accordance with the present invention maintains maximum vaccine stability and assures precise reproducible dosing for each needle. In particular, the high precision vaccine delivery system of the present invention utilizes a unique valve distribution manifold incorporating a pneumatic pressure chamber and a series of pneumatically operated delivery valves which deliver the vaccine with a minimum of friction and turbulence. The valve distribution manifold includes an elongated main body section, and mating elongated back and top body sections. The elongated main body section contains a vaccine chamber and has an elongated opening in its back wall. The elongated back body section defines a low pressure air chamber and has an elongated opening in its front wall which mates with the elongated opening in the back wall of the main body section. A flexible diaphragm is positioned between the elongated openings and segregates the vaccine chamber from the low pressure air chamber. The elongated top section defines a high pressure air chamber which pneumatically operates the series of pneumatic delivery valves to control the flow of vaccine from the vaccine chamber to the individual manifold outlet ports which feed the injection needles. Again, two valve distribution manifolds are preferably positioned longitudinally on the machine frame, one on each side of the injection assembly.

A vaccine receiving valve, preferably on one end of the distribution manifold, initially opens to allow the vaccine to flow gently by gravity from the delivery bag or storage container into the manifold vaccine chamber. Once it is full, the receiving valve is pneumatically closed to isolate the vaccine chamber from the external gravity pressure produced by the raised position of the delivery bag versus the vaccine chamber. When the injection needles have pierced the egg shell, the low pressure air chamber is pressurized to push the flexible diaphragm evenly along the elongated mated openings, which increases the hydraulic pressure in the vaccine chamber and manifold main body section. Then by releasing the high pressure from the individual vaccine delivery valves for a predetermined amount of time, a precise volume of vaccine fluid is delivered from each outlet port into the needles and then into the respective egg cavity. By varying the predetermined amount of time that the vaccine delivery valves are released to the open position, the volume of vaccine fluid delivered by each needle into its respective egg cavity can be easily adjusted.

This latter high precision vaccine delivery assembly and method also eliminates the pumping of fluids through conventional fluid-handling systems and offers both precise and cell-safe fluid delivery. Few or virtually no live cells are destroyed in the delivery, ensuring that an effective quantity of vaccine titer reaches each injected egg.

Further, it has been found that air can build up in the horizontally positioned vaccine delivery manifold of commercial machines and that this air build up can interfere with delivering a precise fluid quantity through the injection needles. Surprisingly, the air build up in the manifold can be avoided if the manifold is tilted approximately 1°–2°, or more, off the horizontal. Preferably, the manifold is tilted upwardly away from the inlet and toward the outer end, such that the inlet end is lower than the outer end. Any entrapped air will hence travel to the outer end, where it can be readily bled off as necessary. In the high precision vaccine delivery assembly and method of the present invention, a pneumatically operated vaccine purging valve is mounted at the end of the distribution manifold opposite from the end having the vaccine receiving valve. As such, the vaccine purging valve can be conveniently opened to purge the manifold of air as desired.

The injecting needles in the injectors of the present invention are specially designed to reduce friction and turbulence in accordance with the teaching of our copending application, U.S. Ser. No. 09/835,482, filed Apr. 17, 2001, owned by the same assignee as the instant application. Specifically, the needles are shorter, i.e. less than 6 inches in length, have a larger diameter, i.e. 22 gauge or less, and a specially shaped entry opening. The vaccine delivery systems have also been designed to reduce friction, turbulence and residence time of the vaccine in the machine. Similarly, the machine has been designed, and the components arranged, so as to shorten tubing length and eliminate T-connections, thus again reducing friction and turbulence in the vaccine and its residence time in the machine.

The vertically movable injectors for injecting fluid substances into the eggs in accordance with the present invention are also uniquely designed to have a minimum of moving parts. An injection needle assembly is moveable between a retracted needle position and an extended needle injecting position by pneumatic pressure. The needle assembly includes a cylindrical piston surrounding the needle which moves in a generally vertical cylinder inside the injector body. Pneumatic pressure is then selectively fed to the cylinder, on either side of the needle piston, to drive the needle in either direction, extended or retracted.

The injection machine in accordance with present invention also includes a device to monitor the quantity of vaccine remaining in the fluid supply bag and feed a continuous signal based thereon to the central computer of the machine for analysis. The machine also measures the length of time the bag has been in use on the machine since extended time can adversely affect the titer of the remaining vaccine. The computer then provides the operator with real time information to alert the operator when the fluid delivery bag should be replaced, as well as to calculate the total vaccine used after each injection cycle to determine whether the proper dosage has been administered. If the calculations vary outside an established variance, the computer notifies the operator of the error.

As evident from the foregoing, after injection, when the incubating tray containing the injected eggs is moved to the transfer section of the machine, a empty hatching tray is similarly moving in its parallel track to the transfer section. While the eggs in the next incubating tray are being injected at the injection section, the already injected eggs in the incubating tray at the transfer section are being transferred by the transfer assembly to the empty hatching tray. Accordingly, the injected eggs in a first incubator tray at the transfer section can have the eggs transferred to a hatching tray, while a second egg flat containing eggs to be injected can be injected at the injection section. As the next trays are inserted into the front of the machine, the now empty incubating tray from which the injected eggs have been transferred to the hatching tray and the filled hatching tray are moved out of the rear end of the machine.

The in ovo injection machine of the present invention has been designed so that the empty incubating tray and filled hatching tray can be automatically off-loaded from the rear of the machine onto automatic conveyor(s). Thus, the machine requires only a single operator at the front of the machine to load filled incubator trays with the eggs to be injected on one parallel track and an empty hatching tray on the other adjacent parallel track. Alternatively, the parallel trays could be loaded by automatic conveyors or appropriate loading systems. The machine then sequentially moves both trays in parallel tracks, first to the injection section for injecting the eggs in the filled incubating tray, then second to the transfer section for transfer of the injected eggs from the incubating tray to the empty hatching tray, and thereafter both the empty incubating tray and the filled hatching tray can be removed by an operator or off-loaded to takeaway conveyors at the back end of the machine. Thus, labor can be reduced from known machines and methods while at the same time improving output speed.

It is an object of the present invention to provide an automated in ovo injection machine and method which includes two spaced side-by-side parallel in-line longitudinal tracks which support and guide incubating trays and hatching trays through the machine from the front to the back, first to an injection section and then to a transfer section. The parallel in-line longitudinal tracks in accordance with the machine of the present invention permit the machine to be utilized with automated off loading conveyors, as well as automated feeding conveyors. If manual labor is utilized, only a single operator is required for the front end of the machine and a single operator for the rear or back of the machine, and each handles a similar loading and unloading operation, i.e. one egg filled tray and one empty tray, thereby facilitating the timing of their activities.

Another object of the present invention is to provide an in ovo injection machine in accordance with the preceding object in which the filled incubating tray and empty hatching tray are inserted onto the parallel in-line longitudinal tracks through the front of the machine and pass to the injection section where all of the eggs are simultaneously injected at one time so as to speed up the operation of the machine and reduce the dripping of sanitizing solution on the next group of eggs to be injected.

A further object of the present invention is to provide an in ovo injection machine in accordance with the preceding objects in which the incubating tray with the injected eggs and the empty hatching tray are automatically transported along the parallel in-line tracks to a transfer section where the injected eggs are transferred by a transfer assembly, first upwardly out of the incubating tray, then horizontally across the machine, and finally downwardly into the hatching tray. The empty incubating tray and filled hatching tray are then off loaded from the back of the machine.

It is another object of the present invention to provide an automated in ovo injection machine and method which are fully pneumatically operated for all moving parts and vaccine delivery, thus avoiding the necessity of electric motors and/or hydraulic pumps, components and circuits which can cause undesired vaccine turbulence, friction and heat. By eliminating pumps, the vaccine is subjected to low internal line pressure which leads to minimized hydraulic shear, fluid turbulence, friction and cell destruction.

A still further object of the present invention is to provide an injection machine and method in accordance with the preceding objects and which are controller or computer operated and controlled with appropriate visual display monitor and control signals to fully inform the operator regarding the operation of the machine, including any malfunctions or other unknown misoperation.

It is still another object of the present invention to provide an injection machine and method which include a vaccine monitoring system to monitor the quantity of vaccine remaining in the vaccine delivery bag and the time in operation in order to give the operator advance warning that the vaccine delivery bag should be replaced, and also monitor the amount of vaccine injected into the eggs during each injection sequence to verify the correct dosage size.

Yet a further object of the present invention is to provide an in ovo injecting machine and method which incorporate a sealed machine frame made from similar size and shape components, such as square stainless steel stock, and with all connections made by welding, so as to eliminate cracks and crevices and openings where particles can collect and bacteria grow, thus reducing contamination and facilitating machine washing.

Still a further object of the present invention is to provide an in ovo injection machine and method which incorporate an improved design for vaccine flow in order to reduce friction, turbulence, heat and machine residence time, including an arranging of the components to reduce distances (and thereby reduce hose length) and eliminate T-connections, an elimination of pumping of the vaccine and a utilizing of injecting needles which are shorter, have a larger diameter and specially shaped entry opening.

Yet another object in accordance with the present invention is to provide a pneumatically-operated heart-type valve pump and modular vaccine delivery system for an in ovo injecting machine which reduces the friction, turbulence, heat and residence time imparted to the vaccine by the machine.

It is a further object in accordance with the present invention to provide a high precision, pneumatically-operated vaccine delivery assembly and method for an in ovo injection machine which introduce virtually no turbulence and friction to a vaccine, thus destroying few or virtually no live cells and insuring that an effective quantity of vaccine titer reaches each injected egg, as well as delivering a precise adjustable volume of vaccine fluid to each needle.

It is yet a further object in accordance with the present invention to provide a high precision vaccine delivery assembly and method in accordance with the preceding object in which the assembly and method deliver the vaccine fluid with a sufficient force to clear any material which may have inadvertently been entrained on the needle tip during punching.

It is yet another object to provide a high precision vaccine delivery assembly and method in accordance with the present invention which has other applications besides in ovo injection machines, such as filling multiple vials in pharmaceutical or biological research or vaccine production, etc.

It is another object of the present invention to provide an injection machine and method in which air entrapped in the vaccine delivery manifold of the vaccine delivery assembly is collected at one end of the manifold by tilting the manifold approximately 1°–2°, or more, off horizontal, and periodically purging the collected air from the higher end of the manifold.

It is still a further object of the present invention to provide an injection machine and method which include an improved injection assembly support plate to pneumatically hold each injector in its individually selected position determined by the size and orientation of its respective contacted egg.

It is still another object in accordance with the present invention to provide an improved injector for an in ovo injection machine which can accommodate a shorter needle and has a minimum of moving parts, thus reducing wear and fatigue and ultimate replacement, and operates pneumatically to move the needle in both directions, extended and retracted. Further, the improved injector allows the needle to inject the vaccine into the approximate center of rotation of the egg, thus injecting into the same egg region regardless of egg orientation in the incubating tray.

Still a further object in accordance with the present invention is to provide an improved injector and injecting needle in accordance with the preceding object and in which the needle is shorter in length and larger in diameter to reduce turbulence and friction while at the same time punching the injection hole without bending or clogging, thus eliminating the necessity for a separate punch or delivering the vaccine through needle side holes with a closed needle end for punching.

It is yet a further object of the present invention to provide an injection machine and method in which all of the eggs for one hatching tray can be injected at an injection section and the injected eggs for another hatching tray can be transferred to an empty hatching tray horizontally across the machine at approximately the same time to speed up and simplify the operation of the machine and method.

It is yet another object in accordance with the present invention to provide an improved suction cup assembly for an in ovo injection machine and method for transferring injected eggs which utilizes a vacuum suction ring to pick up and hold the injected eggs, maintains atmospheric pressure at the penetration hole and does not create any negative pressure on the inside of the egg, thus reducing the potential for contamination of the suction cup and cross-contamination of the eggs.

Still a further object of the present invention is to provide an injection machine and method in which the tray positioning or pusher assembly which pushes the incubator tray from the injection section to the transfer section supports one or more sanitizing nozzles that spray sanitizing and other solutions upwardly onto the underneath side of the injection assembly (with the needles extended) so that all of the contacting surfaces of the injection assembly are sanitized after each injection sequence and at the same time as the incubating tray with injected eggs is moved from the injection section to the transfer section.

Still yet another object of the present invention is to provide an injection machine and method in accordance with the preceding objects and which utilizes pneumatic pressure to pressurize the sanitizing and cleaning solutions, water and other liquids in their respective containers to cause liquid flow when an appropriate valve is opened, thus eliminating all liquid pumps and the like from the machine.

Still yet a further object of the present invention is to provide an injection machine equipped with a hand held spray wand and nozzle separately connected to the solution and water containers so that broken or exploded eggs and the like can be washed down out of the underlying drain pans or otherwise off the machine frame and components, as desired.

Yet another object of the present invention is to provide an injection machine in accordance with the preceding objects and which will conform to conventional forms of manufacture and will be economically feasible, long lasting and relatively trouble free in operation.

These together with other objects and advantages which will become subsequently apparent reside in the details of constructions and operation as more fully hereinafter described and claimed, reference being had to the accompanying drawings forming a part hereof, wherein like numerals refer to like parts throughout.

BRIEF DESCRIPTION OF THE DRAWINGS

FIG. 20 illustrates an injecting needle for the machine and method of the present invention, showing an improved top end for connecting to the vaccine tubing to reduce friction and turbulence;

FIG. 20A is an enlargement of the injecting needle top illustrated in FIG. 20;

FIGS. 21 and 21A illustrate an alternate top end for the injecting needle used in accordance with the present invention;

FIGS. 22 and 22A illustrate still another embodiment of the top end for the injecting needles in accordance with the present invention;

FIG. 26 is a cross-sectional side view of one manifold module which when assembled make up the fluid distribution manifold of the embodiment shown in FIG. 25;

FIG. 27 is a front elevation view of the manifold module of FIG. 26 for use in the present invention;

FIG. 28 is a front elevation view of the fluid distribution manifold for the embodiment of vaccine delivery system shown in FIG. 25, illustrating, a plurality of the manifold modules connected together in series;

DESCRIPTION OF THE PREFERRED EMBODIMENTS

Figure 1:
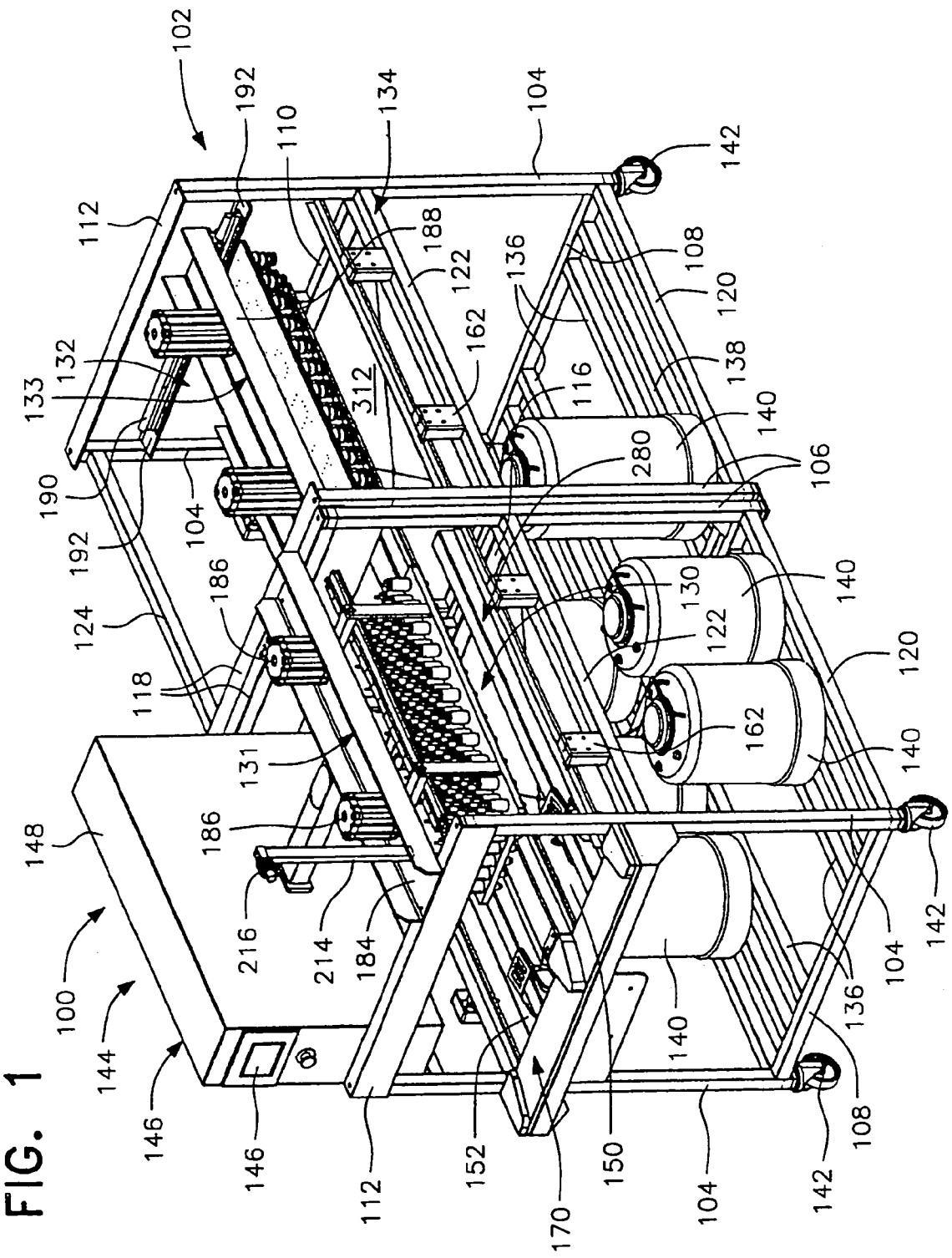
FIG. 1 is a right front perspective view of an injection machine in accordance with the present invention, with certain components omitted.
Figure 2:
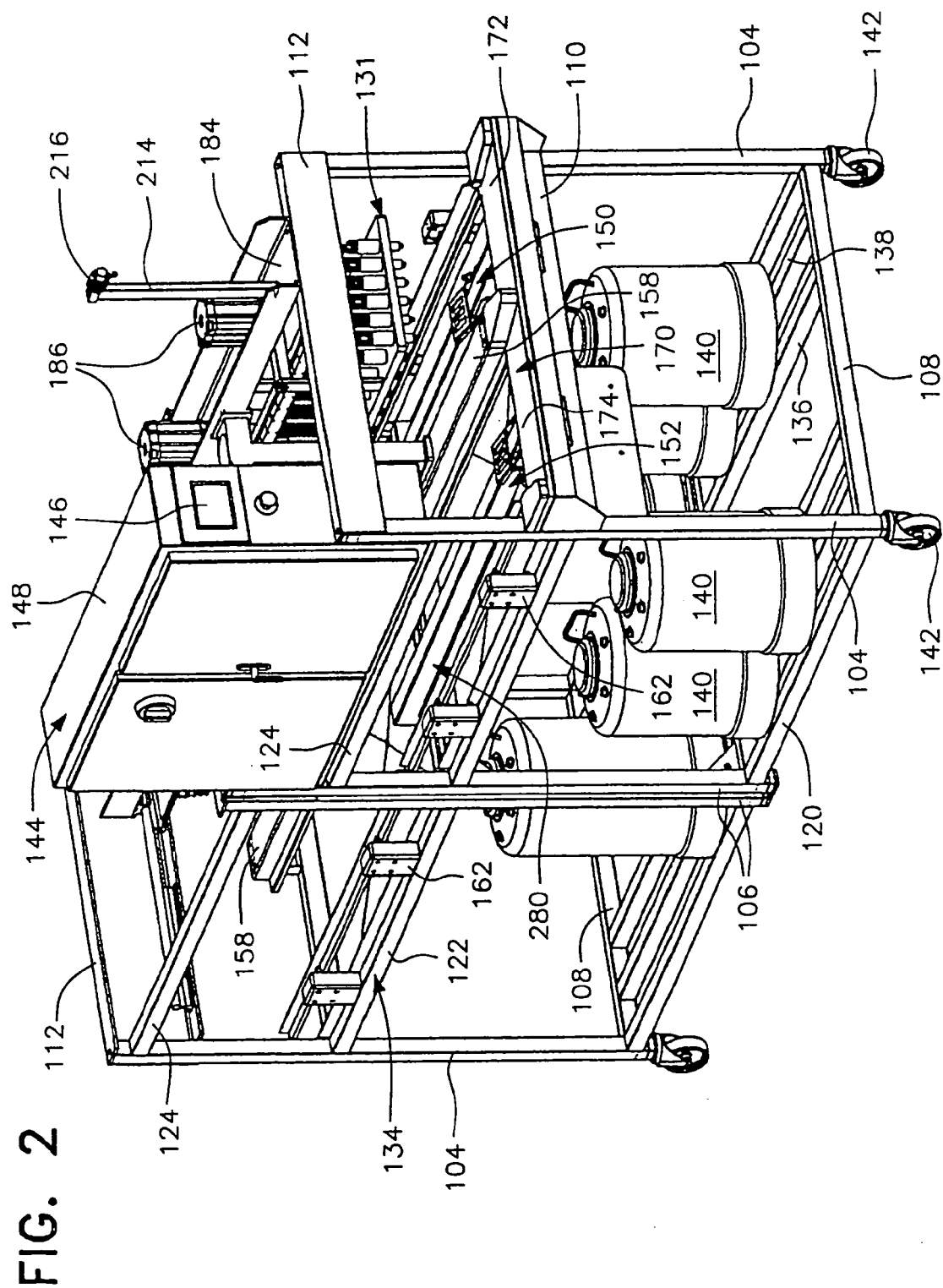
FIG. 2 is a left front perspective view of the injection machine of FIG. 1, with certain components omitted.
Figure 3:
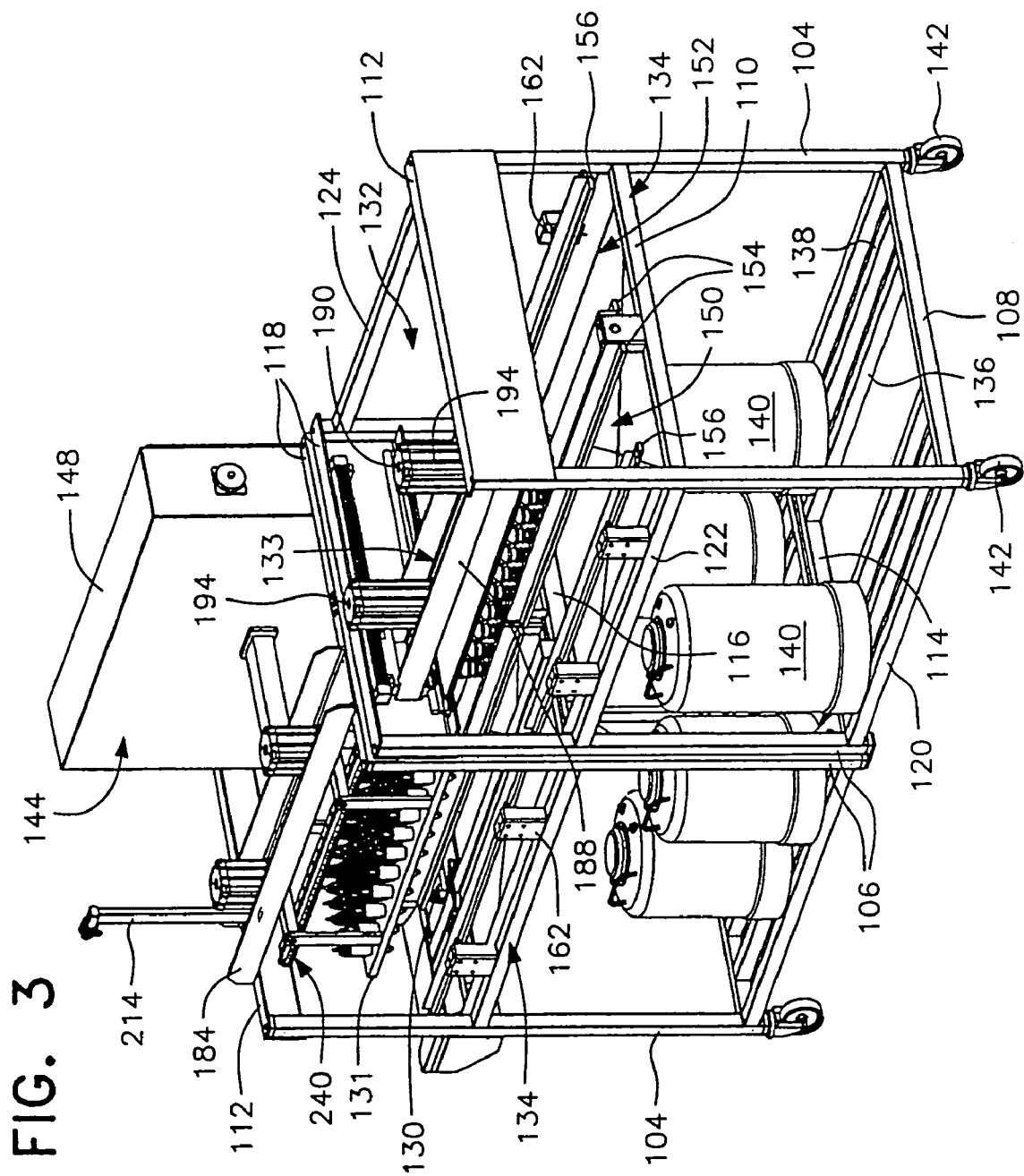
FIG. 3 is a left rear perspective view of the injection machine of FIG. 1, with certain components omitted.

Although preferred embodiments of the invention are explained in detail, it is to be understood that other embodiments are possible. Accordingly, it is not intended that the invention is to be limited in its scope to the details of constructions and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

The term "birds", as used herein, is intended to include males or females of avian species, but is primarily intended to encompass poultry which are commercially raised for eggs or meat, or to breed to produce stock for eggs or meat. Accordingly, the term "bird" is particularly intended to encompass either gender or any bird, including without limitation, chickens, ducks, turkeys, geese, quail, ostriches, pheasants, and the like. The present invention may be practiced with any type of bird egg.

The term "fluid", as used herein, is intended to include any material which will flow and is not limited to pure liquids. Thus, "fluid" refers to solutions, liquid-liquid suspensions, liquid-solid suspensions, gases, gaseous suspensions, emulsions, and any other material or mixture of materials which exhibits fluid properties. Certain solid materials also fall under this term, such as biodegradable polymers (e.g., in the form of syringeable beads) which release active agents upon biodegredation.

FIGS. 1–10 show the overall configuration of a parallel in-line machine or apparatus for inoculating eggs embodying the features of the present invention, which is denoted generally by reference numeral 100. The machine or apparatus 100 comprises a parallel in line system and includes a frame or frame structure, generally designated by reference numeral 102.

The machine frame 102 includes upright leg members 104 at each corner and four interior upright frame members 106 near the middle of the frame. The leg members 104 at each end of the frame 102 are rigidly interconnected near the bottom, middle and top by cross frame members 108, 110 and 112, respectively. Similarly, the interior upright frame members 106 are interconnected across the machine by similar cross frame members 114, 116 and 118, respectively. Further, each upright leg member 104 is rigidly connected on each side of the frame 102 to an interior upright frame member 106 near their bottom, middle and top by longitudinal frame members 120, 122 and 124, respectively. The two top longitudinal frame members 124 on the right side are omitted from FIGS. 1–7 for clarity. Finally, the adjacent interior upright frame members 106 on each side of the machine are rigidly connected together by short connectors 126 (see FIGS. 9 and 10).

The upright leg members 104 and interior upright frame members 106 together with cross frame members 108, 110, 112, 114, 116 and 118 and longitudinal frame members 120, 122 and 124 form the rigid frame 102 in the overall shape of a rectangular box, which is generally divided in the longitudinal middle at connectors 126. Positioned in the front half of the machine 100 is an injection section, generally designated by reference numeral 130, having an injection assembly generally designated by reference numeral 131. The rear half of the machine 100 houses a transfer section, generally designated by reference numeral 132, having a transfer assembly generally designated by reference numeral 133.

Further, the middle or intermediate cross frame members 110 and 116 and intermediate longitudinal frame members 122 are all positioned at approximately the same vertical height to form a generally rectangular horizontal frame, generally designated by reference numeral 134, around the apparatus 100 at a convenient height for the apparatus operator, approximately waist high. The bottom cross frame members 108 and 120 are interconnected by a series of interior longitudinal frame members 136 which serve to further rigidify the frame 102 and form a bottom shelf 138 for supporting fluid containers 140 and the like which are used in the machine apparatus. The entire parallel in-line apparatus 100 is mounted on casters or wheels 142 so that it can be moved from place to place, as desired. A brake or floor lock (not shown) can be provided for the wheels 142 to hold the apparatus 100 in place during operation.

All of the frame members, including upright leg members 104 and interior upright members 106, cross frame members 108, 110, 112, 114, 116 and 118, longitudinal frame members 120, 122 and 124, and shelf frame members 136 are preferably made from the same size square stainless steel 1.5 inch stock. Further, all connections are by welding so as to eliminate cracks and crevices and openings where particles can collect and bacteria grow. The parallel in-line apparatus 100 and machine frame 102 form a completely sealed machine. Because it is a completely sealed machine, there is no place for dirt, debris or mold to build up. Also, the machine can be easily washed down at the end of the day, or anytime after egg injection.

At the left front of the apparatus 100, the upright leg member 104 and interior upright frame member 110, where joined by upper longitudinal frame member 124, form a support for a control panel, generally designated by reference numeral 144. The control panel 144 includes button, switches, visual liquid crystal display (LCD) touch-tone panel 146 and indicator lights, and is provided in a self-contained waterproof box 148 mounted between the upright leg 104 and upright interior frame member 106 on upper frame member 124. The control panel 144 also includes a micro-modular PCL DL 205 controller or similar type computer which is readily programmable.

Running through the frame 102 from front to back and mounted slightly above the horizontal frame 106 are a pair of side-by-side parallel generally horizontal tracks, an incubator tray or egg flat track generally designated by reference numeral 150, herein sometimes referred to as the right side track (facing the front of the machine), and a hatching tray track generally designated by reference numeral 152, or the left side track (facing the front of the machine). Each horizontal track is defined by a pair of horizontal guide rails, an inside guide rail 154 and an outside guide rail 156. The guide rails 154 and 156 are preferably discontinuous as at 159 (see FIGS. 5, 6 and 7) adjacent cross frame members 116 so that the transfer section 132 of the machine can readily be separated from the injection section 130 of the machine.

The inside guide rails 154 for each track 150 and 152 are rigidly mounted in back-to-back relation approximately down the longitudinal middle of the machine 100, front to back, on a center guide, generally designated by reference numeral 158. Preferably, the center guide 158 is a U-shaped rail with laterally extending flanges. The legs of the U-shaped rail form the vertical section of the guide rails 154, the flanges form the horizontal section, and the yoke of the U-shape defines the top of center guide 158 (see FIG. 6). The center guide 158 is also split at 160 (see FIG. 5) adjacent the middle of the machine in the same area 159 of the guide rails 154 and 156. The outside guide rails 156 are supported above the horizontal frame by a series of upstanding boxes 162 which are mounted on top of the longitudinal frame members 122.

The outside guide rails 156 of the incubating tray, or right side, track 150 are also individually movable laterally by a pair of short horizontally moving pneumatic cylinders 164 at the injection section 130 and a second pair of short horizontally moving pneumatic cylinders 166 at the transfer section 132. The cylinders 164 and 166 are supported within the boxes 162, as described in more detail further on in this description.

A receiving guide, generally designated by reference numeral 170, is mounted on the front end of the apparatus 100 in front of cross frame member 110 to define the front end of the tracks 150 and 152. Preferably, the receiving plate 170 is designed with two parallel receiving slots 172 and 174 defined by raised end portions 176 and a raised center portion 178 (see FIG. 7). The receiving slots 172 and 174 are horizontally aligned with the guide rails 154 and 156 of the incubating tray track 150 and hatching tray track 152, respectively. The receiving slot 172 and incubating tray track 150 receive a conventional incubating tray or egg flat carrier 168 used in commercial hatcheries. The receiving slot 174 and hatching tray track 152 receive a conventional hatching tray 169, as used in commercial hatcheries.

The receiving guide 170 is preferably made of high density polypropylene or other suitable material to provide a smooth, low friction surface for the receiving slots 172 and 174 to facilitate the placement of the incubating tray and hatching tray on their respective right side and left side tracks 150 and 152, respectively. The horizontal portion of the guide rails 154 and 156 are preferably covered with a high density polypropylene strip (or other suitable material) to also provide a low friction surface for movement of the respective incubating and hatching trays thereon.

Figure 13A:
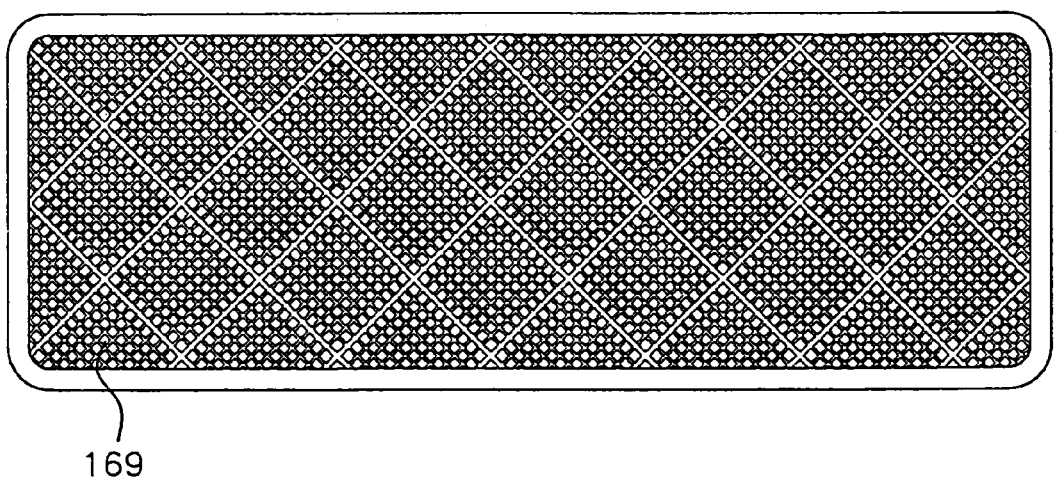
FIG. 13A is a top plan view of a conventional hatching tray.
Figure 13B:
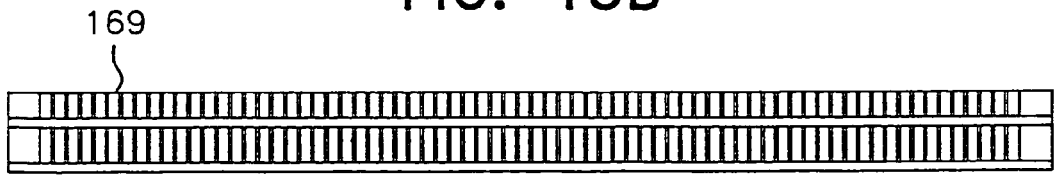
FIG. 13B is a side view of the hatching tray of FIG. 13A.

As defined previously, the incubating tray 168 can be made up of one to four, or more, commercial incubating trays, depending upon the manufacturer. FIGS. 13A and 13B show a "La Nationale"® incubating tray 168, having handles 180. The illustrated incubating tray 168 includes a plurality of rows of apertures 182. Each aperture or egg holding depression 182 is configured to receive one end of a respective egg so as to support the respective egg in a substantially vertical position with the large end facing up. The incubating tray 168 carries approximately one hundred and thirty-two eggs in a staggered array of 22 rows with six eggs each. The tray 168 comes right from the incubator machine with the eggs already positioned and is directly loaded on the right side receiving slot 172.

Of course, the incubating tray used in accordance with the present invention may contain any number of rows containing any number of eggs. Furthermore, eggs in adjacent rows may be parallel to one another as in a rectangular tray, or may be in a staggered relationship, as in an offset tray. It is also contemplated in accordance with the present invention that the incubating tray 168 can be any special design. Depending on the type of incubating tray 168 to be used in the machine 100, the injection assembly 131 and transfer assembly 133, as described hereinafter, are then appropriately configured so that the depressions 182 of the incubating tray align with the operating components of each of the assemblies 131 and 133.

While an incubating tray 168, carrying eggs to be injected, is placed on the right side track 150, an open hatching or receiving tray 170, shown FIGS. 13A and 13B, is placed into the receiving slot 174 and onto the left side track 152. Once the eggs are injected in the injection section 130 and the incubating tray 168 moved down track 150 to the transfer section 132, the hatching tray 169 is also moved down its track 152 to the transfer section 132. The injected eggs are then transferred from the incubating tray 168 to the hatching tray 169. The hatching tray 169 is open and without individual places to hold the eggs. Transferring the eggs to the open hatching tray 169 is common practice because the hatched chicks would get hurt if the eggs remained in the tray 168 after hatching.

Returning to FIGS. 1–10, the injection assembly 131 and transfer assembly 133 are suspended in series within the machine frame 102. The injection assembly 131 is suspended from a rigid longitudinal platform or bridge 184, which is supported on top of the upper cross frame members 112 and 118. A pair of pneumatic cylinders 186 mounted in tandem on the bridge 184 move the injection assembly 131 up and down. The transfer assembly 133 is suspended from a longitudinal platform or bridge 188, which is movable transversely across the machine 102 in the transfer section 130. Each end of the bridge 188 is mounted on a slide rail 190 for lateral sliding movement transversely across the machine 100. The slide rails 190 rest on angle irons 192 which are welded to an inside surface of the two interior upright frame members 106 and two upright leg members 104, respectively, of the transfer section 132 at an appropriate location spaced above the tracks 150 and 152 and below the top frame members 112, 118 and 124 (see FIGS. 1 and 6). A second pair of pneumatic cylinders 194 are also mounted in tandem on the movable bridge 188 to move the transfer assembly 133 up and down. A fifth, rodless pneumatic cylinder 196, preferably mounted inside upper cross frame member 118 of the transfer section 132 is connected to one end of bridge 188 by stud 198, which moves the bridge 188 carrying the transfer assembly 133 horizontally back and forth laterally across the transfer section 132.

The injection assembly 131 includes a vertically movable injector support and holding plate 200 having a series of openings 202 which align with the eggs in the incubating tray 168 when the tray is properly aligned on track 150 for egg injection. The plate 200 is connected along its side edges to the ends of a pair of U-shaped supports 210 which are in turn connected at their yoke to the outer end of the piston rods of cylinders 186. Positioned in the openings 200 are a series of vertically movable injectors, generally designated by reference numeral 204. Each of the injectors 204 houses a reciprocating needle assembly 206 carrying an injection needle 208 for supplying a fluid substance to the interior of the eggs (see FIG. 24). The number and location of the injectors 204 correspond in number and location to the aperture or egg-holding depressions 182 in a full incubating tray 168 so that all of the eggs for any hatching tray can be injected at one time.

Since the design of incubating trays 168 may vary, it is understood that any number of injectors 204 may be provided in the injection assembly 131 so long as the injectors 204 are arranged to correspond to the locations of the egg-holding depressions 182 in the particular incubating tray 168, to be used in the machine 100. In accordance with the present invention, the injection assembly 131 should be designed so that all of the eggs in the incubating tray to be used on the machine are injected at one time. For example, some one-piece incubating trays hold as many as one hundred sixty-eight eggs. When injecting such a large number of eggs in this type of incubating tray, the injection assembly 131 should preferably hold one hundred and sixty-eight injectors 204 thus requiring only one injection sequence to simultaneously inject all of the eggs in the tray at one time.

When an injection cycle is initiated, the plate 200 of the injection assembly 131 moves from its "home" position underneath the support platform or bridge 184 and rapidly traverses downwardly to a position directly over the incubating tray 168. Meanwhile, the injectors 204 are free to move vertically upwardly in their respective openings 202. As the support plate 200 approaches its most downward position, each injector 204 is positioned directly above one of the eggs in the tray 168 and an elastomeric contact or stabilizing nipple 230 (see FIGS. 23 and 24) on the bottom or lower end of each injector 204 engages the top of its respective egg. Once contact is made, the injector 204 is free to move vertically upward in its respective hole 202. Hence, the injectors 204 are able to adjust independently for variations in height and tilt of each egg in the incubating tray.

Once the plate 200 is in its full down position with all contact or stabilizing nipples 230 in contact with their respective eggs, a gripper ring 212 in each hole 202 is pneumatically expanded to grip and hold the injectors 204 rigidly in plate 200 with the contact nipples 230 seated on the egg shell surface. The needle assemblies 206 are then actuated to extend needles 208 a predetermined distance with sufficient velocity to penetrate the egg shell. The needles 208 continue through the opening in the egg shells to an injecting position. Fluid is delivered to each egg via one of the needles 208. Since all of the injectors 204 are the same and the nipple 230 of each is in surface contact with the egg, each egg is injected to the same depth. Following fluid delivery, the needle assemblies 206 carrying needles 208 are retracted, and injectors 204 are then picked up during upward movement of the support plate as it returns along with the injectors 204 back to the up, or "home," position above the eggs in the tray 168.

Fluid substances to be injected, such as vaccines, are ordinarily provided in a closed, sterile plastic bag having ports (not shown), similar to an IV bag. The delivery bag is suspended from a vertical support hanger 214, preferably mounted on the platform 184 directly above the injectors 204. Fluid delivery from the fluid delivery bag to the needles 208 is accomplished via a unique vaccine delivery assembly, generally designated by reference numeral 240, which is mounted inside the U-shaped supports 210. There are preferably two vaccine delivery assemblies, one on each side for the one-half of the injectors on its side.

As the vaccine is dispensed from the fluid delivery bag to the vaccine delivery assemblies, the machine monitors the quantity of vaccine remaining in the bag by a unique vaccine volume monitoring system. This monitoring system consists of a waterproof load-cell 216 located at the top of the vaccine bag support hanger 214. The vaccine bag hangs directly from the load-cell and it continuously monitors the weight of the vaccine bag. The load cell is connected to the central computer of the machine in control panel 146 and sends a continuous signal, which the computer analyzes. It compares the reducing weight of vaccine in the bag to the programmed dosage and provides the operator with real time information, such as quantity of vaccine left, quantity of doses left per single units or quantity of trays that can receive dosage from the remaining vaccine. The machine also measures the length of time each new vaccine bag has been in operation on the machine. It has been found that delays in delivering the vaccine from the delivery bag to the injectors can be detrimental to the quality of the vaccine remaining in the bag. Thus, the machine alerts the operator when time is approaching to replace the vaccine delivery bag. Further, after each tray has been injected the computer calculates the total vaccine used and compares that information to the size dosage multiplied by the quantity of eggs per tray. If there is a discrepancy, the computer immediately alerts the operator with a message on the touch-tone monitoring screen 146.

In one embodiment, the vaccine delivery assembly 240 includes a heart-type valve pump, generally designated by reference numeral 242 (see FIG. 25), which is connected directly to one end of a fluid distribution manifold, generally designated by reference numeral 260, made up of individual manifold modules, generally designated by reference numeral 262. The valve pump 242 and manifold 260 are supported above the injectors 204 inside the U-shaped supports 210 by any suitable attachment. A flexible delivery tubing conveys the vaccine the short distance from the plastic delivery bag to the inlet connection 264 of the valve pump 240, and from the outlets 266 of the manifold modules 262 to the injection needles 208 of the injectors 204.

The routing and number of flexible delivery tubes or tubing are not shown in the drawing figures to avoid unnecessary complication. The tube lengths are as short as possible and as direct as possible and without any T-connections so as to minimize friction, turbulence and machine residence time for the vaccine. The routing and number of tubing are apparent from this description. All fluid delivery tubes between common points are substantially the same length so that there is no variation in internal fluid pressure. Therefore, fluid is equally distributed to each individual injector 204 at substantially the same time. This allows for consistent delivery of the proper dosage of fluid to the injected eggs.

Figure 11:
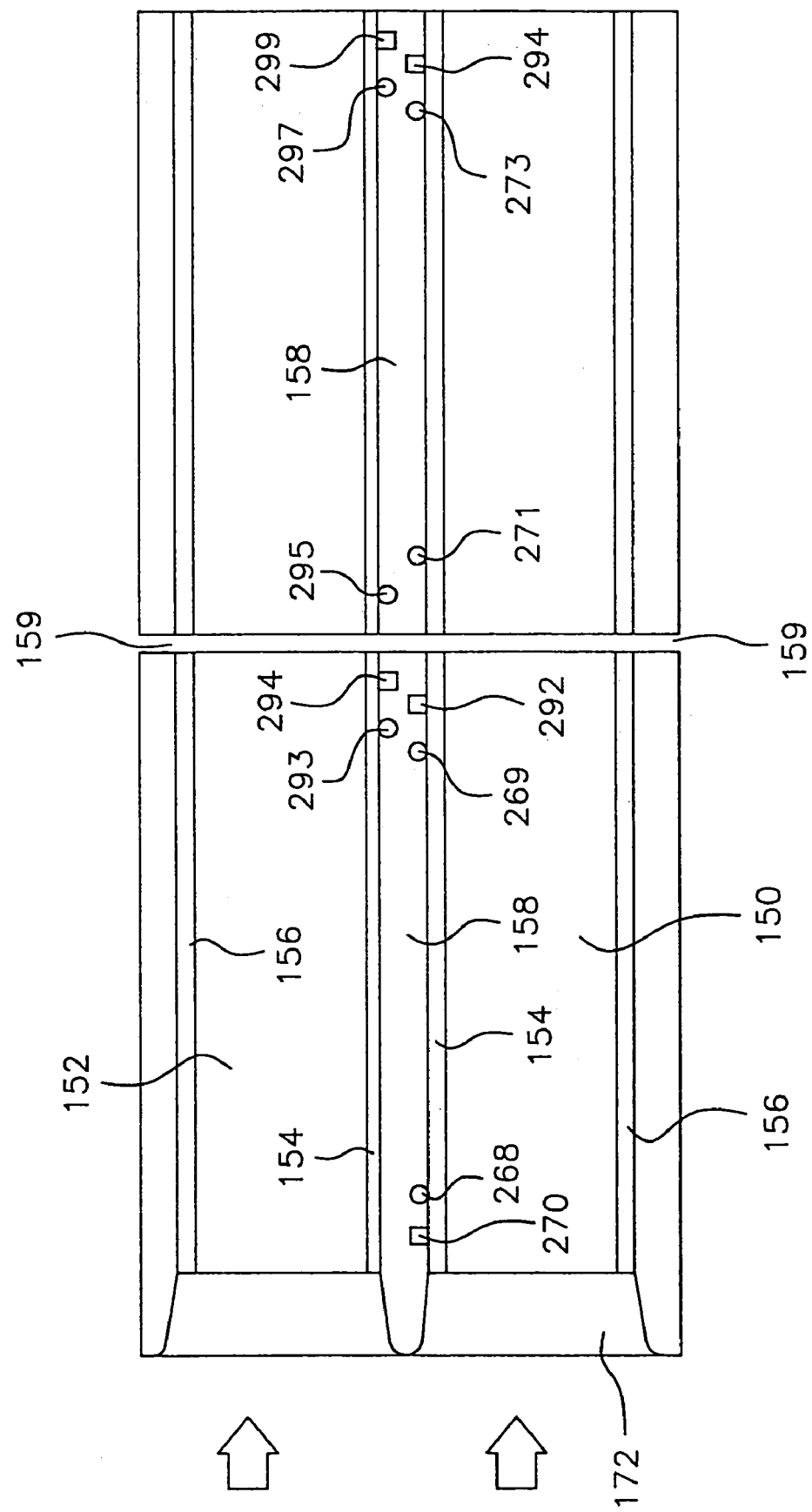
FIG. 11 is a schematic top plan view of the in line incubating and hatching tray tracks of the injection machine of FIG. 1, illustrating the location of the fiber optic sensors and retractable stops in the center guide and inside guide rails.
Figure 12A:
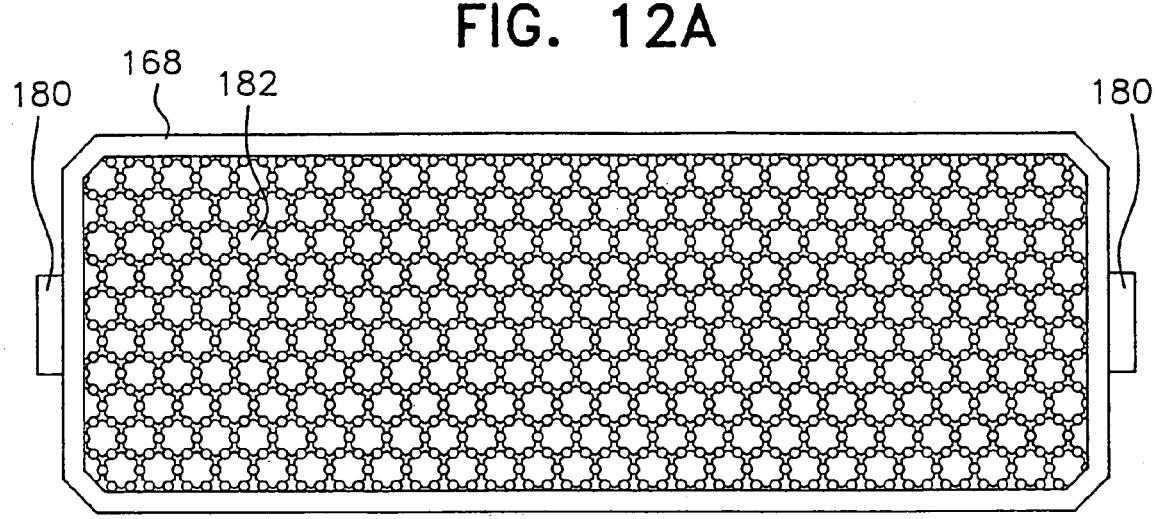
FIG. 12A is a top plan view of a conventional incubating tray.
Figure 12B:
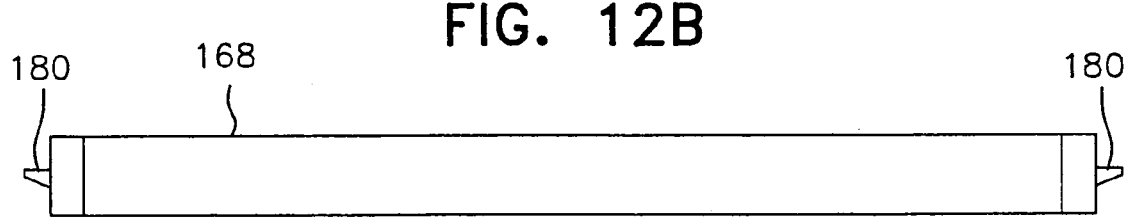
FIG. 12B is a side view of the incubating tray of FIG. 12A.

As previously described, a full incubating tray 168 is loaded or placed onto the incubating or right side track 150 of the apparatus 100, and an empty hatching tray 169 is placed on the hatching tray or left side track 152. There are a plurality of sensors positioned along the track 150 on the rigid guide rail 154 to detect the location of the incubating tray 168. In the preferred embodiment, there are four fiber optic sensors 268, 269, 271 and 273 along the track 150. The sensors are positioned to detect and locate the position of the front and back of the tray 168 in the injection section 130 and in the transfer section 132. Initially, a retractable stop 270 in the rigid rail 154 of the right side track 150 extends outwardly at the front of the inside guide rail 154 adjacent receiving slot 172 (see FIG. 11). The stop 270 prohibits the placing of the next incubating tray onto the guide rails 154, 156 until the previous tray 168 has moved to the transfer section 132.

The center guide 158 rigidly supports or forms the inside rails 154 for each of the right and left side tracks. The outside rails 156 of the incubating tray or right side track 150 are independently movable laterally in each of the injecting section 130 and the transfer section 132 to clamp the egg incubating tray 168 against the fixed inside rails 154 on the center guide 158. The outside rails 156 are moved laterally by the pair of pneumatic side cylinders 164 in the support boxes 162 in the injection section 130 and another pair of pneumatic side cylinders 166 in support boxes 162 in the transfer section 132. In order to position the incubator tray 168 in proper longitudinal position on the right side track 150, in each the injector section 130 and the transfer section 132, the center guide includes two retractable pneumatic stops 292 and 294, respectively, at the back of each section. When extended, the stops prevent further movement of the incubator tray 168 on the track 150 so that it is properly positioned longitudinally for the injecting or transfer operation. The outside rail 156 is then moved laterally to clamp the tray 168 in proper lateral alignment against the fixed inside rail 154.

Each of the tracks 150 and 152 includes a tray positioning or pusher assembly, generally designated by reference numeral 280 (see FIG. 7), which is located centrally below each track and extends longitudinally from the front of the frame structure 102 adjacent the receiving guide 170, through the injection section 130 and into the beginning of the transfer section 132. The tray positioning assemblies 280 push the filled incubating tray 168 and hatching tray 169 through the injection section and into the transfer section along their respective right side track 150 and left side track 152, respectively. Each tray positioning assembly 280 includes a rodless pneumatic cylinder 282 housed within a U-shaped cover 284 and a U-shaped carrier 285 which straddles underneath the cover 284 and is moved by the pneumatic cylinder 282 (see FIG. 14). A plate 286 is pivotally attached to the carrier 285 with bolts 288 and includes a counterweight component 290 which biases the plate 286 in the up or angled position as shown in FIG. 15. When a tray is placed on top of the plate 286, it pivots to a flat horizontal position, generally parallel to the top wall of cover 284 and below the horizontal plane defined by the track rails 154 and 156.

The pneumatic cylinder 282, carrier 285 and plate 286 start at the "home" position at the front of the frame 102 adjacent the receiving guide 170 in their traveling position. With the injection assembly 131 at its "home" position, and the previous tray 168 pushed to the transfer section 132, the stop 270 retracts and stop 292 at the back of the injection section extends out. When the next filled tray 168 is placed on the right side track 150 and moved past the plate 286 by the operator, the plate 286 moves into its pushing position. The leading edge 294 of the plate 286 moves forward to abut the tray 168, and the plate 286 pushes the tray 168 to its proper longitudinal location in the injection section 130 against pneumatic stop 292. The pneumatic cylinders 164 are actuated to move the injection section outside guide rail 156 laterally towards the opposed inside guide rail 154, to thus clamp the incubating tray 168 in position in the injection section 130.

When the egg injection sequence is completed, the cylinders 164 are again actuated to move the injection section outside guide rail 156 laterally outwardly away from the inside guide rails 154 to thereby release the incubating tray 168. The pneumatic stop 292 retracts and the pusher assembly 280 pushes the tray 168 into position in the transfer section 132 against pneumatic stop 294 at the end of the transfer section. The sensors 271 and 273 in the rigid rail 154 of the right side tract (see FIG. 11) detect the movement and the positioning of the tray 168 in the transfer section 132. Once positioned longitudinally in the transfer section 132, pneumatic cylinders 166 are actuated to laterally move the transfer section outside guide rail 156 inwardly towards the inside guide rail 154 to clamp the incubating tray 168 in position in the transfer section 132.

Upon completion of the removal of the eggs from the incubating tray 168 by the transfer assembly 132, the pneumatic cylinders 166 are again actuated to move the transfer section outside guide rail 156 outwardly away from the inside guide rail 154 and thereby release the incubating tray 168, and stop 294 is retracted for removal of the empty tray 168 from the back end of the machine 100. The outside guide rails 156 of the hatching tray, or left side, track 152 are typically not movable in accordance with the present invention inasmuch as it is not necessary to clamp the hatching tray 169 in a lateral direction in either the injection section 130 or the transfer section 132. However, the hatching tray track includes a sensor 293 and a retractable stop 294 at the back end of the injection section 130 to sense the position of the hatching tray 169 and prevent its movement into the transfer section 132 until the preceding hatching tray has been removed from the back end of the machine. The hatching tray track 152 also includes front and back sensors 295 and 297, respectively, and stop 299 which sense and stop the position of the hatching tray 169 in proper position in the transfer section 132 for receiving the transferred eggs. Once the transfer sequence is complete, the pneumatic cylinder 282 moves the plate 286 back to its home position at the front of the frame 102.

Figure 14:
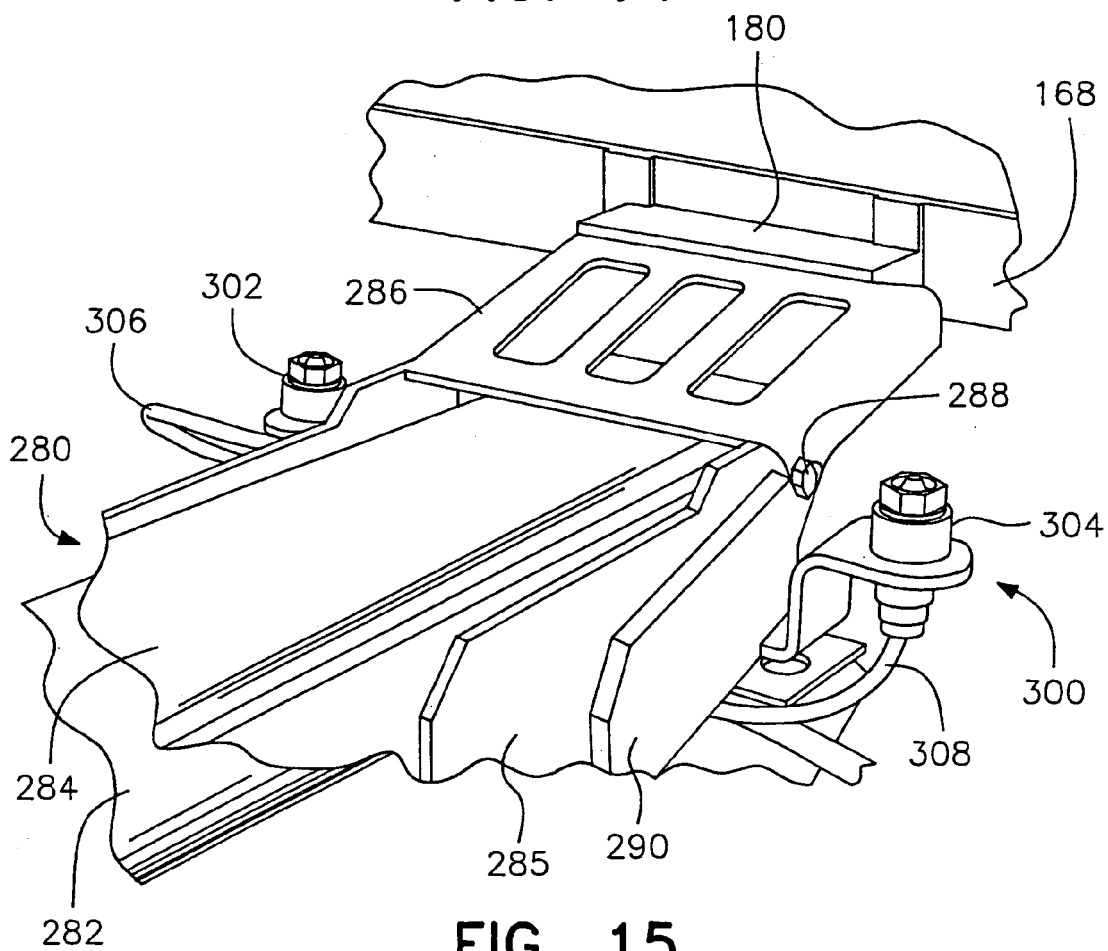
FIG. 14 is a partial perspective view of the tray positioning or pusher assembly and the sanitization sprayer assembly used in the machine and method of the present invention.
Figure 15:
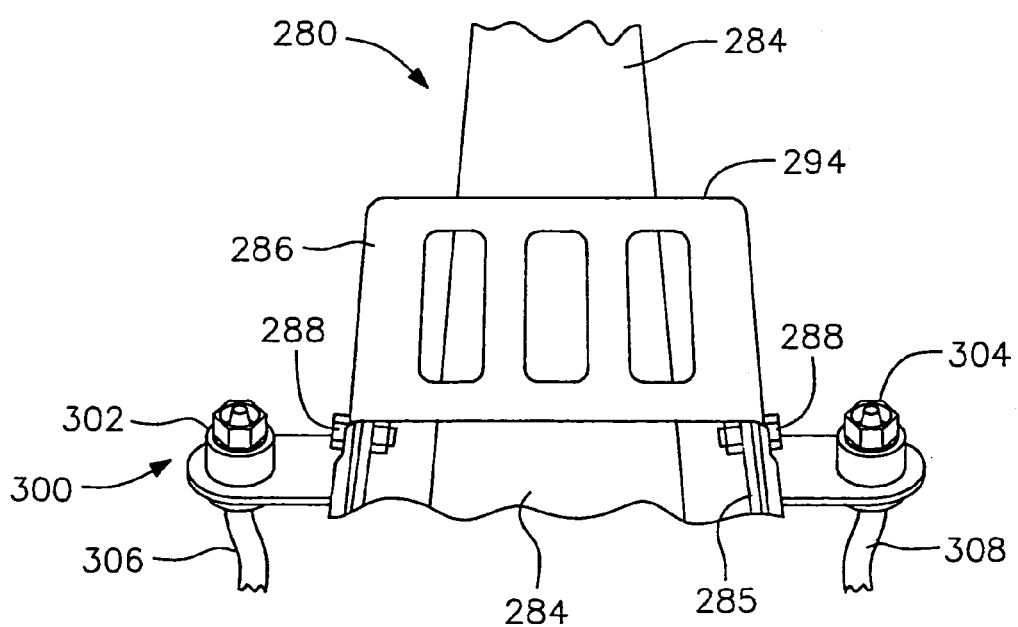
FIG. 15 is a front partial perspective view of the pusher and sanitization sprayer assemblies of FIG. 14.

The tray positioning assembly 280 associated with the incubating tray or right side track 150 also includes a sanitization assembly, generally designated by reference numeral 300, as shown in FIGS. 14 and 15. The sanitization assembly 300 is mounted to the carrier 285 and travels with the carrier 285 and plate 286 by operation of the pneumatic cylinder 282. Thus, when the injector assembly 131 is in its up "home" position underneath bridge or platform 184, the sanitation assembly 300 travels directly underneath the injection assembly 131, and the injectors 204 supported thereon, as the carrier 285 and plate 286 travel through the injecting section 130. The sanitization assembly 300 includes at least one pair of upwardly directing spray nozzles 302, 304 attached one on each side of the carrier 285 and spaced slightly below the upper surface of the plate 286. Sanitizing fluid supply pipes 306, 308 are threaded into the side of each nozzle. The end of the pipes connect to a sanitizing fluid supply tube leading from the appropriate supply containers 140 supported on bottom shelf 138. The sanitizing fluids in the containers 140 are under pneumatic pressure which forces the appropriate fluid out of the nozzles 302, 304 when the controller or computer opens the applicable valve(s). The tray positioning assembly 280 associated with the hatching tray or left side track 152 preferably does not include a sanitization assembly 300.

Positioned below tracks 150 and 152 underneath each of the injection section 130 and the transfer section 132 are drain pans 310 and 312, respectively. The drain pans 310 and 312 slope toward their center to a drain opening 314 to which is connected a suitable drain hose 316 which connects to a floor drain (not shown) or to a spent fluids container 140, which can also be supported on bottom shelf 138. The drain pans 310 and 312 extend for substantially the entire length and width underneath each of the injection section 130 and transfer section 132, respectively. They thus serve to catch any broken or exploded eggs or debris generated in either section. The drain pans have upstanding vertical sides which can be press fitted inside of middle cross frame members 110 and 116 and middle longitudinal frame members 122 around each side of the horizontal frame 134. Preferably, the vertical sides of drain pans 310 and 312 are connected to the horizontal frame members at an inwardly spaced distance of about one inch for cleaning and sanitization purposes. The drain pan 310 also catches the spent sanitization fluids after each sanitization cycle and directs the fluids away from the working sections of the machine.

Sanitization of the needles and the head of the injectors is performed after each injection to minimize cross-contamination of the eggs. Spray sanitization is initiated after injection and when the tray positioning assembly 280 begins its travel to push the incubating tray 168 with injected eggs from its position in the injection section 130 to its position in the transfer section 132. The injectors 204, raised after injection, are sequentially surrounded by the spray as the plate 286 pushes the incubating tray 168 and the spray nozzles 302, 304 move down the right side track 150. The needles 208 are extended out of the injectors 204, and the sanitizing fluid is sprayed in a V-shaped spray, from each of the nozzles 302, 304, which sprays overlap to provide complete coverage of the injectors 204 and the underneath side of support plate 200. As the tray positioning assembly 280 moves the incubating tray 168 down the track 150, the sanitizing spray continues until the incubating tray reaches its position in the transfer section 132. At this point, the pneumatic cylinder 282 has reached the end of its stroke triggering a magnetic sensor inside cover 284. At the same time, the tray 168 reaches the back fiber optic sensor 273 and the back stop 294 in the transfer section. The spraying stops, the needles 208 retract into the injectors 204 and the pneumatic cylinder 282 returns the tray positioning assembly 280, including the carrier 285 and plate 286, to its home position. The stoppage of spray occurs before the injection assembly 131 is allowed to commence another injection cycle.

The tray positioning assembly 280 for the hatching tray 169, or left side track 152, operates in the same manner and with the companion carrier 285 and pusher plate 286 (but without a sanitization assembly 300). Hence, the incubating tray 168 and hatching tray 169 can be automatically moved from the injection section 130 into position in the transfer section 132.

Figure 4:
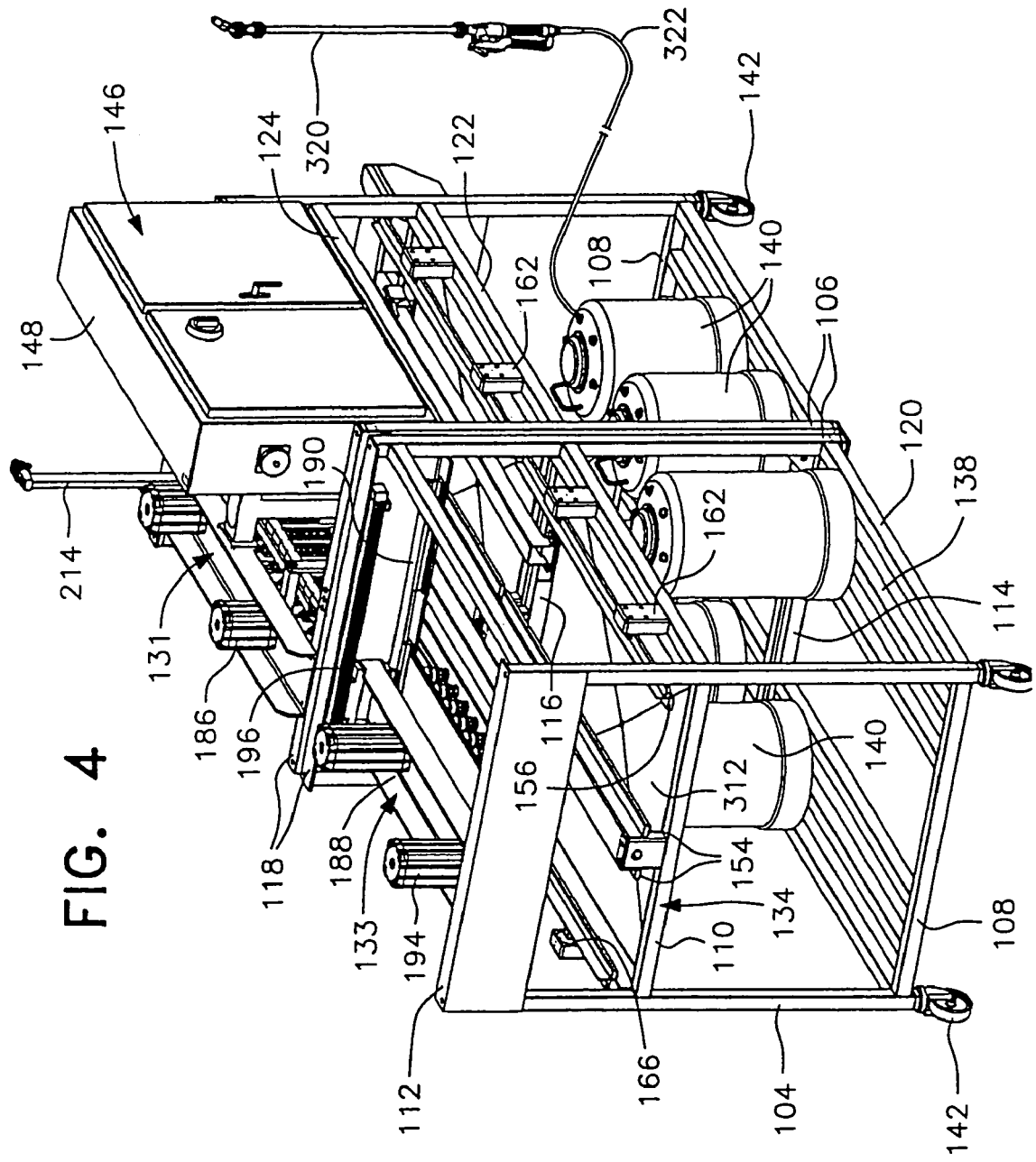
FIG. 4 is a right rear perspective view of the injection machine of FIG. 1, with certain components omitted.

A hand held sprayer and hose assembly 320 is provided as an integral component of the machine in order to wash down broken or exploded egg components off the machine and into either of the drain pans 310 and 312. The assembly 320 is preferably of conventional construction and is connected by hose 322 to a water supply container 140, such as shown in FIG. 4.

After the sanitization has been completed, the machine is ready for another injection sequence. Another incubator tray 168 with a new set of eggs have, by this time, been placed into the injection track 150 over receiving slot 172 by the operator, and the injection sequence is repeated.

The machine of the present invention is equipped and programmed with an appropriate cleaning cycle. The cleaning cycle is an integral component of the apparatus and method carried out by the machine 100 and is typically conducted pre-operation in the morning and post-operation in the evening. The cleaning cycle operation is displayed on the video control panel 146 as the cycle is in progress and preferably uses different colors to differentiate the different solutions used in the cleaning cycle, including standard sanitizer solution, standard cleaning solution, alcohol and water. One or more containers 140 contain each of these four solutions which are connected to a separate cleaning supply hose (not shown). The solutions in the containers 140 are under pneumatic pressure which delivers the appropriate fluid during the cleaning cycle to the vaccine circuit when the appropriate valve is opened. In order to perform the cleaning cycle, the operator merely removes the tubing from the vaccine delivery bag which supplies the vaccine to the vaccine delivery assembly 240 and assembles the separate cleaning supply hose thereto. The machine 100 is then ready to commence the cleaning cycle by delivering the respective cleaning and other solutions sequentially to the vaccine delivery assembly 240 and, thence, to all the subsequent components connected thereto.

Each of the sub-assemblies of the apparatus of the present invention will now be described in more detail below. Preferably, a source of pressurized gas is used to drive the apparatus of the present invention. The pressurized gas is air. The movement and operation of the injection assembly 131, the transfer assembly 133, the injectors 204 and needle assemblies 206, and the tray positioning assembly 140, as well as the other assemblies and components to be described hereinafter, are all carried out pneumatically. As seen in FIGS. 1–10, electrical and pneumatic enclosures are mounted on the bridges 184 and 188 for housing the pneumatic cylinders 186 and 194 which move the injection assembly 131 and transfer assembly 133, respectively, up and down. A pair of cylinders generally aligned with the longitudinal axis of the machine are preferably used to properly guide each assembly in its down and up strokes. Air is supplied at an air supply inlet mounted adjacent the exterior of the pneumatic enclosure. The air supply inlet is connected to the source of pressurized air (not shown), such as instrument air, an air compressor or the like. From the air supply inlet, the pressurized inlet air preferably passes through a series of air filters (not shown) where the inlet air is filtered and most of the moisture and oil content removed. The clean dry air then flows through an air pressure regulator (not shown) for controlling the operating pressure of the overall machine 100. The inlet air supply pressure is preferably from about 100 psi to about 120 psi. The inlet air supply pressure may be monitored by an air pressure switch (not shown) and visually indicated on an air pressure gauge (not shown). All of these components are conventional and known to those skilled in pneumatics.

The air or pneumatic cylinders referred to herein, and their connection to the parts they move, are generally conventional in nature and will not be described in detail other than to point out that the appropriate arrangements can be made without undue experimentation in building or operating the machine. It is understood that other devices, such as solenoids, could be used in the present invention, but double-acting pneumatic cylinders are preferable since egg injection machines are typically washed down after each use.

The parallel in line machine 100 of the present invention is controlled by an onboard computer or central programmable logic controller (PLC) which is mounted in the waterproof control panel 144. The programming of the operations of the machine 100 are easily accomplished from the logical operation of the machine 100 as described herein. The PLC is preferably a Direct Logic 205 controller and controls the normal operation of the unit. The operation of the pneumatic cylinders, pneumatic control valves, operator interface, LCD, retractable stops, indicator lights buttons and switches are all controlled by the PLC. Sensors for air pressure and fluid levels may also be provided. The fiber optic sensors 268, 269, 271, 273, 293, 295 and 297 are selectively mounted at various points and signal the position of the moving incubating tray 168 and hatching tray 169 on their respective tracks 150 and 152 to the PLC for the various machine functions.

Figure 16:
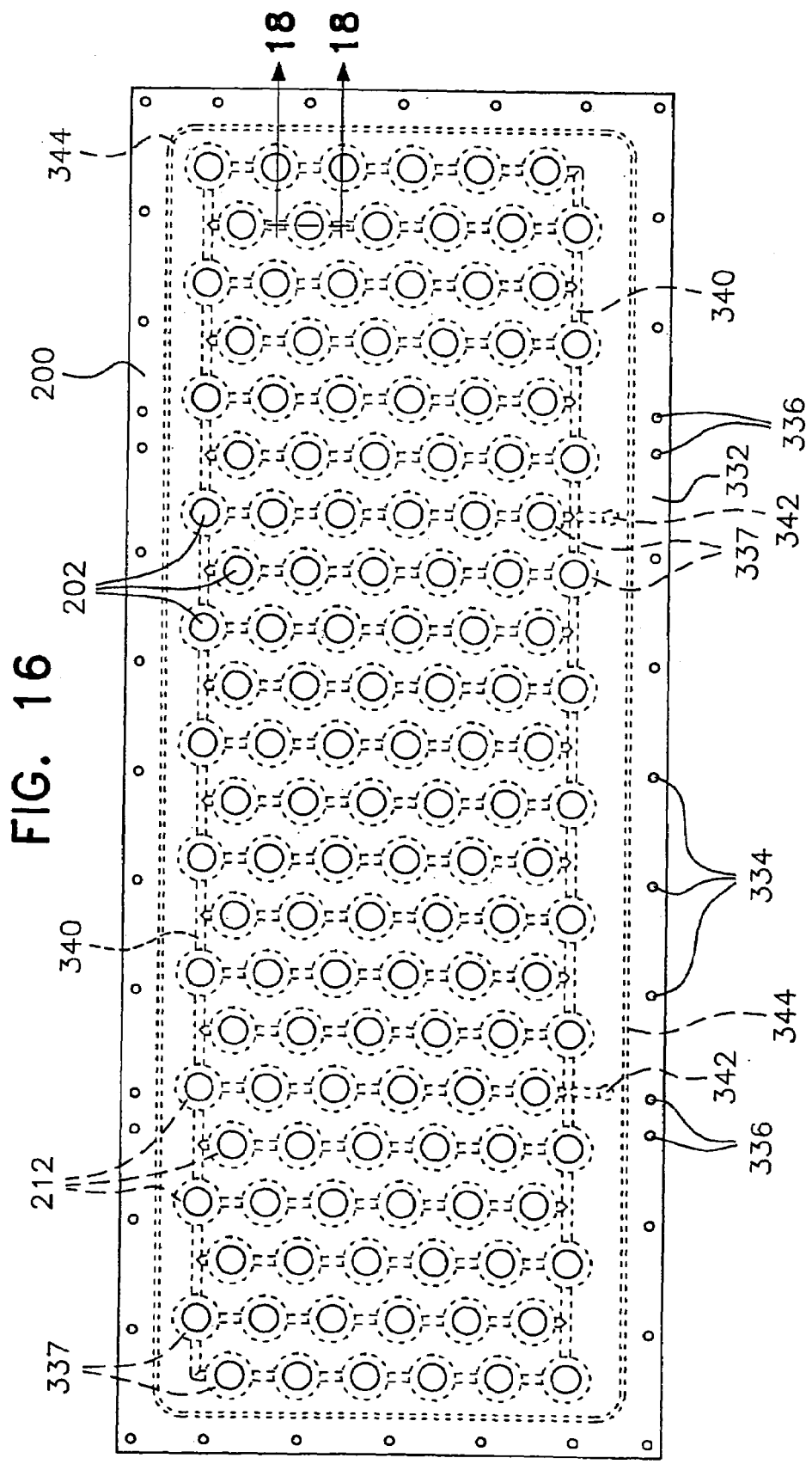
FIG. 16 is a top plan view of the injector support plate for use in accordance with the present invention, illustrating a plurality of openings or holes for receiving the plurality of injectors and a pneumatic circuit which controls the gripping or holding of the injectors in the openings.
Figure 17:
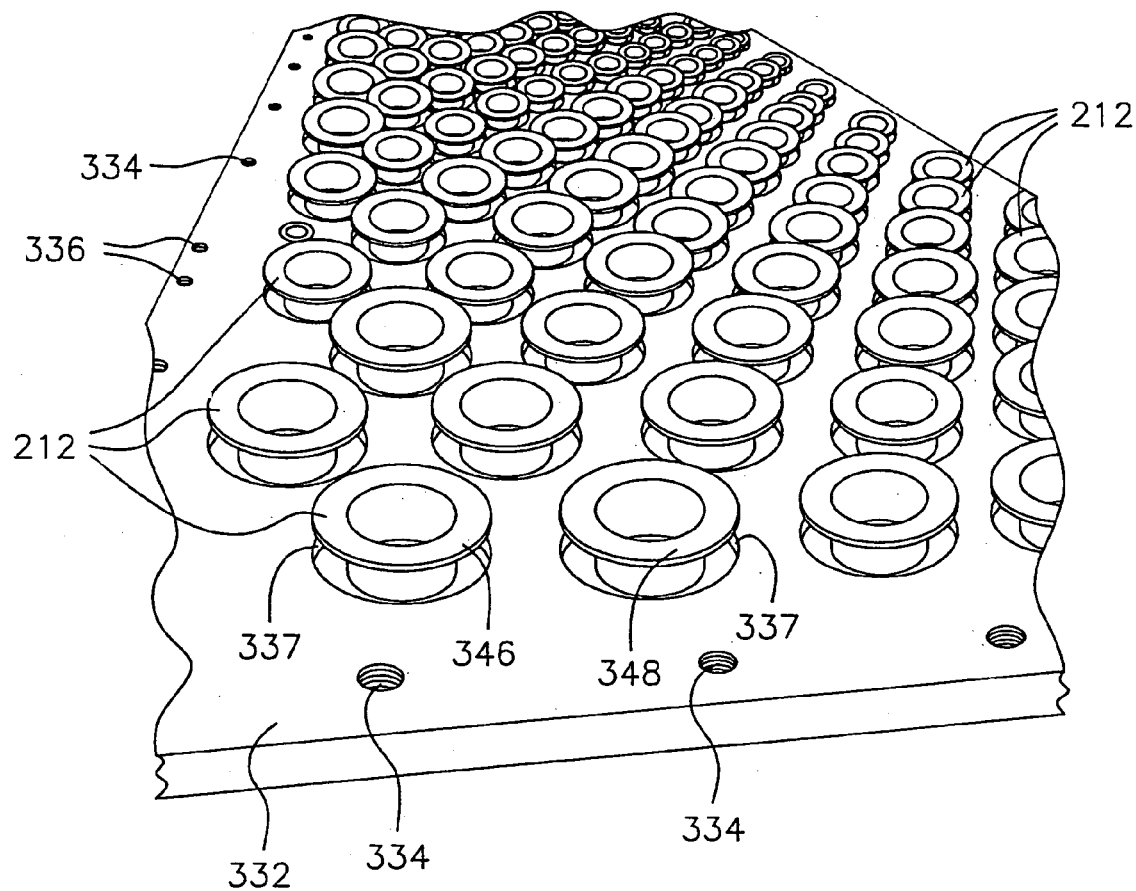
FIG. 17 is a partial perspective top view of the bottom half-plate of the injector support plate of FIG. 16, illustrating a plurality of gripper rings positioned in the plate openings in accordance with the present invention.

Turning now to FIG. 16, there is shown a plan view of the underneath side of the injector support plate 200. The support plate 200 is made up of two rectangular mating half-plates, an upper half-plate 330 and a lower half-plate 332. The half-plates 330 and 332 are secured to one another at specific intervals through plate connectors (not shown) in holes 334, preferably spaced around the periphery of the plate 200. The support plate is connected to the pair of pneumatic cylinders 186 through the two upstanding U-brackets 210. A plurality of equally spaced pairs of bracket connectors (not shown) secure the support plate to the legs of the U-brackets 210 through holes 336. The piston rod of each pneumatic cylinder is connected at its outer end to the yoke of the U-bracket 210. As shown, the support plate 200 is rectangularly shaped and includes a plurality of holes 202. The holes 202 receive the injectors 204 of the injection assembly 131 and are properly spaced in columns and rows to match the eggs in the incubating tray 168. Since the tray 168 of one poultry processor may differ from the trays of another processor, the number and configuration of the holes 202 in the plate 200 are specially designed to match the incubating tray or plurality of trays corresponding to the hatching tray of a specific processor whose eggs are to be injected on the machine 100. The trays 168 of poultry processors are also typically of an unique color to identify a particular processor. Hence, the fiber optic sensors 268, 269, 271 and 273 are preferably capable of distinguishing different levels of illuminosity so that the machine 100 will not function if the sensors read an illuminosity different than that of the incubating tray for which the pattern of holes 202 is specially configured.

Figure 18:
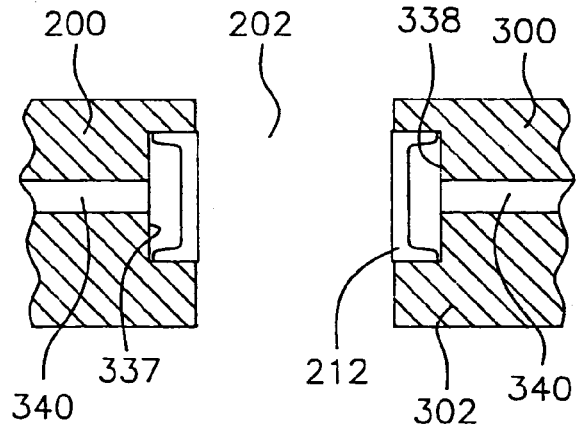
FIG. 18 is a partial sectional view taken along section line 18—18 in FIG. 16.
Figure 19:
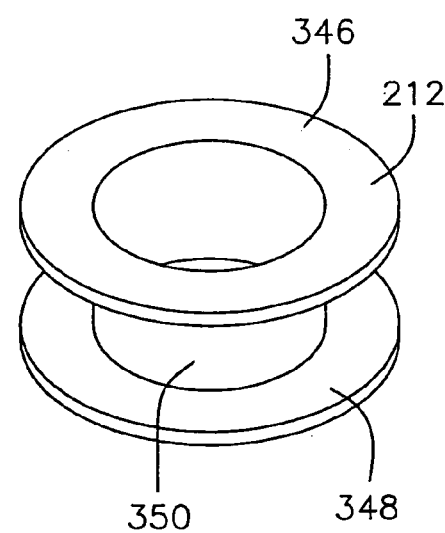
FIG. 19 is a perspective view of one of the plurality of gripper rings which engage the outer wall of the injector body when pneumatically expanded in accordance with the present invention.

The inside (top) surface of the bottom half-plate 332 is shown in FIG. 18. Each hole 202 in the bottom half-plate 332 is surrounded by a groove 337 which is machined into the inner surface of the bottom half-plate. The upper half-plate 330 also has a plurality of injector holes 202 which match and align with the plurality of holes 202 in the bottom half-plate 332. Similar to the grooves 337 of the bottom half-plate 332, the injector holes 202 of the upper half-plate 330 have a similar groove 338 machined around each hole 202. Sandwiched between the upper and bottom half plates 330 and 332 and positioned in the respective grooves 338 and 337 are the gripper rings 212 as shown in FIGS. 18 and 19.

Also machined into the bottom (inner) surface of the upper half-plate 330 is an air flow path 340. The air flow path 340 interconnects to all of the openings 202 and to a pair of air inlets 342 on the upper half-plate 330. Between the plurality of plate connectors 334 and the outer edge of the air flow path 340 is an air seal 344. Preferably, there is no air path 340 machined into the inside (top) surface of the bottom half-plate 302. While machining the air flow path 340 into the inner (bottom) surface of the upper half-plate 330 is preferred, it could be machined into the inside (top) surface of the bottom half-plate 332, or machined into both facing inner surfaces, if desired.

The gripper ring 212 is made of rubber or other suitable elastomeric material and includes a top ring seal 346, a bottom ring seal 348, and a center gripping cylinder 350 connecting the top and bottom ring seals. The ring seals 346 and 348 seat snugly in the respective grooves 338 and 337 of the upper half-plate 300 and corresponding bottom half-plate 302 so that the gripping cylinder 350 forms the inner wall of each opening 202. The inside diameter of gripping cylinders 350 is slightly larger than the outer diameter of the injectors 204 to provide clearance so that the injectors 204 are free to move vertically in each hole 202 when the gripper rings 212 are in their relaxed condition. When pneumatic pressure is applied to the air flow path 340 through air inlet 342, the air pressure is communicated to each of the gripper rings 212, causing the gripping cylinders 350 to expand out into the holes 202 and press against the outside wall of injectors 204 to hold each individual injector 204 firmly in its vertically assumed position.

Turning next to FIGS. 20 and 20A, 21 and 21A and 22 and 22A, there are shown different embodiments for the inlet end of the needle 208 in order to reduce turbulence and friction imparted to the vaccine in accordance with the present invention. In FIG. 21, the upper end, generally designated by reference numeral 360, of the needle 208 is bonded through the center of a male hub fitting 362, preferably made of stainless steel. The upper end 360 of the needle connects to an appropriate fluid delivery tubing 364 so that fluid can be delivered to the top of the needle and then to the egg. The fitting 362 includes a barbed flange or other enlargement 366 for attaching to the injection needle assembly 206, as described hereinafter. The needle tip 368 is beveled. The beveled tip 368 is desirable since this type of needle will tend to shear a hole in the egg starting at the very point of the tip. After the initial break-through, the needle tip shears the remainder of a round hole, often creating a flap of shell at the hole.

The needle 208 is sufficiently large that the needle can penetrate thousands of egg shells without bending, yet is thin enough to meter very small amounts of fluid in a precise manner. The needle for the machine of the present invention has a larger diameter and a shorter length than in other known commercial in ovo injection machines and can deliver the vaccine through a straight needle opening without clogging. Thus, the needle 208 overcomes the problems of known machines and imparts less friction and turbulence to the vaccine. The shorter needle length is possible as a result of the simpler design and fully pneumatic operation of the injectors 204, as described hereafter, which allows for a shorter injector body. Needle length less than 6 inches and on the order of about five and one-half inches is possible in the machine of the present invention. This compares with needles as long as 7½ and 8½ inches on known commercial machines.

Preferably, the needle size used in the present invention is from about 16 gauge to about 22 gauge. A needle thicker than about 16 gauge could create cracks in the egg shell, and a needle thinner than about 22 gauge is ordinarily too thin to repetitively penetrate an egg shell without bending. A needle which is about 17 gauge (0.059 inches in outer diameter) is most preferred. At the preferred needle thickness, the preferred bevel angle is from about 20 degrees to about 45 degrees from the horizontal. At angles less than about 20 degrees, the contact area between needle tip and the surface of the egg shell become large, thus requiring more force to break through the shell and possible cracking of the shells. Bevel angles greater than about 45 degrees require unnecessary needle length. The most preferred bevel angle is about 30 degrees.

The needle is preferably stainless steel and the outside of the tip of the needle may be titanium-plated partially along its length. This allows the same needle to be used for a larger number of injections without loss of sharpness or damage, usually evidenced by burrs on the leading edge of the needle tip. Alternatively, a pencil-point needle may be used.

As shown in FIGS. 20 and 20A, the top end 360 of the needle 208 differs from the straight needle inlet of conventional needles. Instead, the top end 360 has an open mouth or funnel shaped tip to minimize damage to the wall or membrane of the vaccine cells, in accordance with the teaching of our copending application, U.S. Ser. No. 09/835,482, filed Apr. 17, 2001. The funnel shaped tip 370 is made of the same material as the remainder of the needle 208 and can be formed thereon in any conventional manner, such as by conventional mechanical and/or hydraulic equipment. The open mouth top end 370 of the needle 208 shown in FIGS. 20 and 20A is in the form of a funnel shape having an inlet angle 372. The top end of the barb fitting 362 is also funnel shaped to be flush to the outside surface of the funnel mouth 370. The barbed flange or enlargement 366 of the hub fitting 362 may have a clip mechanism for attaching the needle 208 to the injection needle assembly 206.

In the embodiment shown in FIGS. 21 and 21A, the inlet end 360' has a gradual curved shape to form the funnel shape mouth 370', and the top end of the male hub fitting 362' extends all the way to the top of the needle inlet. The embodiment of the needle inlet top end 360'' shown in FIG.

22 and 22A also has a funnel configuration having a gradual curved shape to form the funnel shaped mouth 370". In this embodiment, however, the end 360" is formed to have an outwardly extending flange or lip 372" around the mouth 370". The barb fitting can be eliminated in this embodiment because the flange 372" can form the enlargement for attaching the needle 208" to the injection needle assembly 206.

Figure 5:
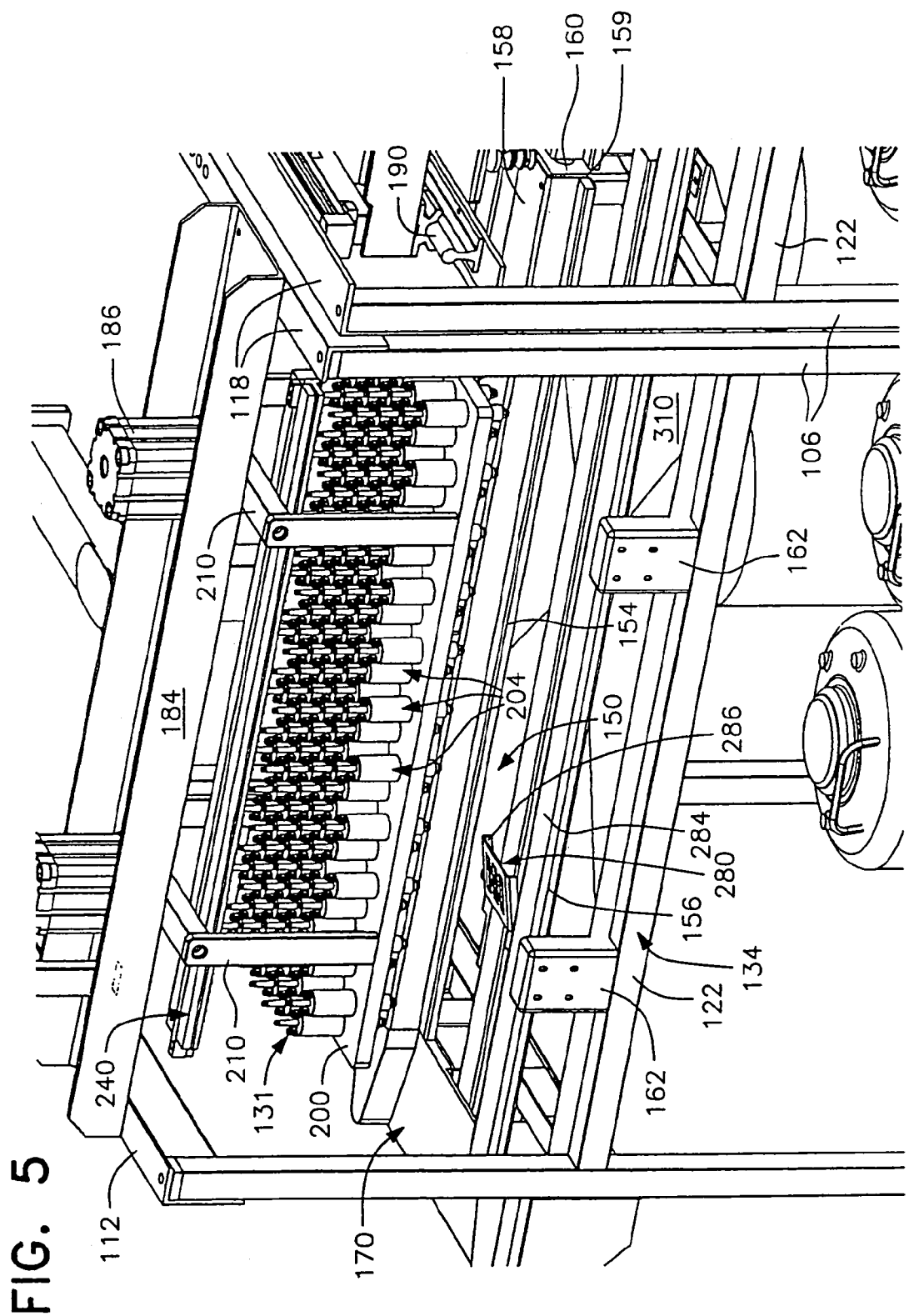
FIG. 5 is an enlarged right side perspective view of the front portion of the injection machine of FIG. 1, with certain components omitted, illustrating the injection section.
Figure 6:
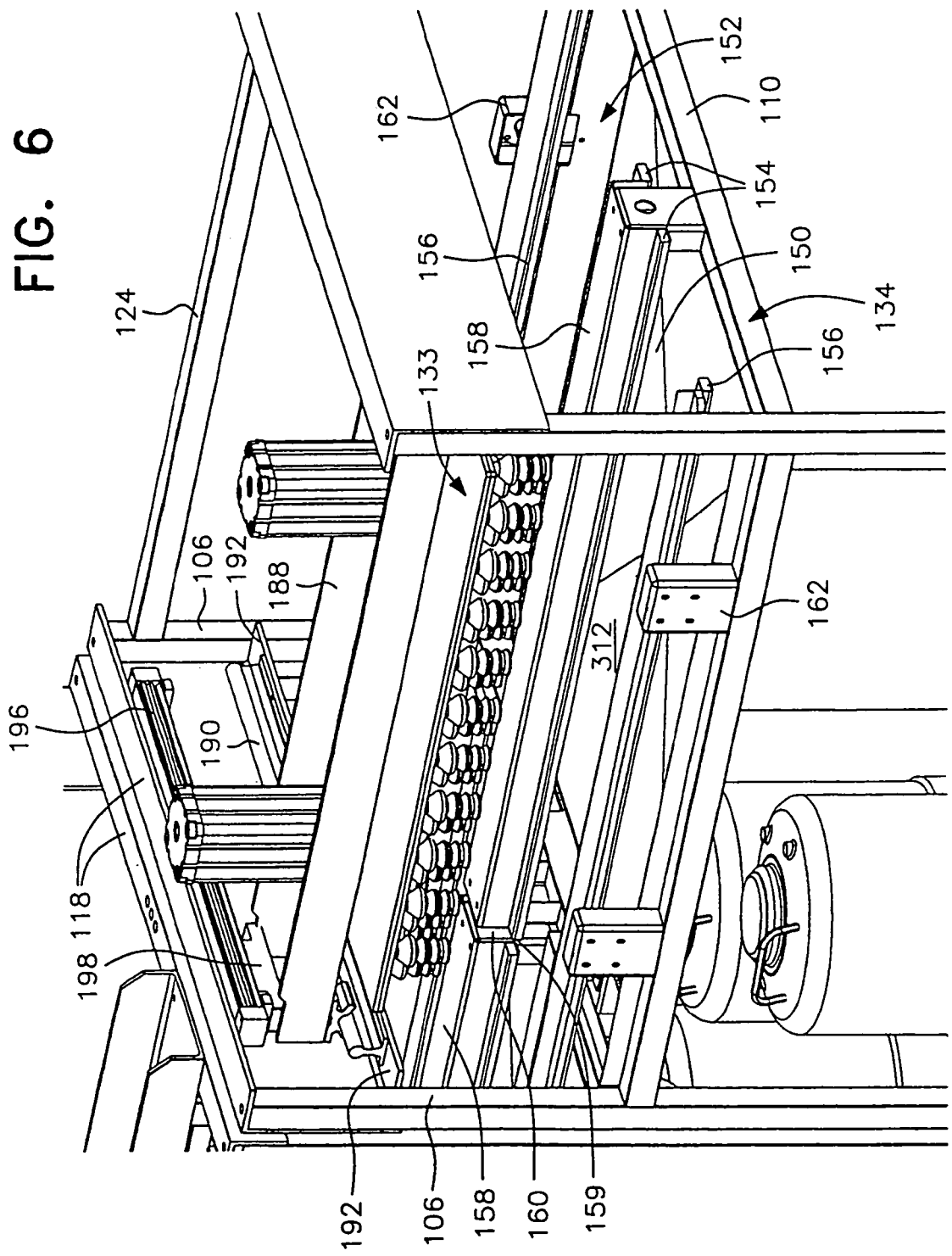
FIG. 6 is an enlarged right side perspective view of the rear portion of the injection machine of FIG. 1, with certain components omitted, illustrating the transfer section.
Figure 7:
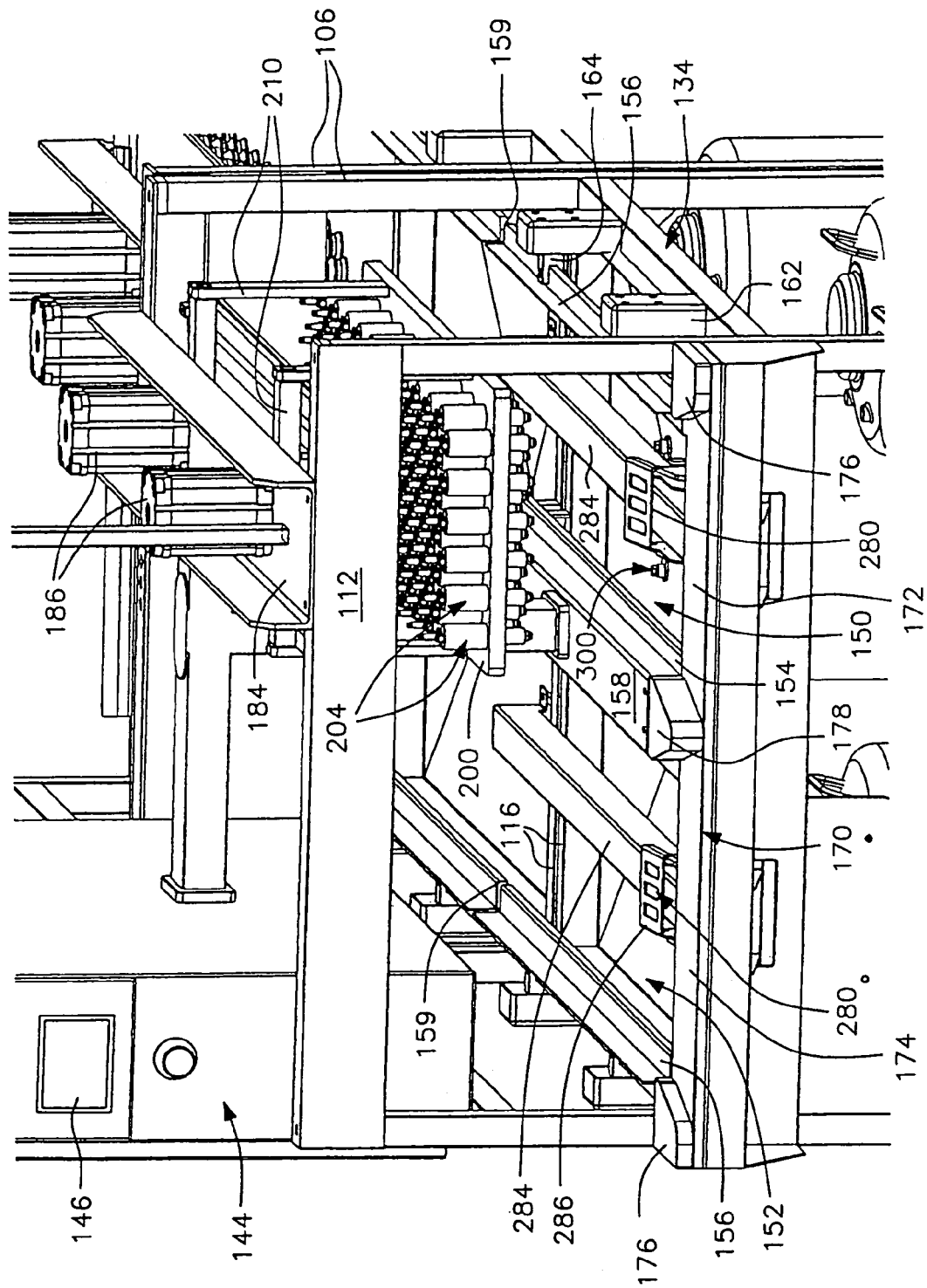
FIG. 7 is an enlarged front perspective view of the injection machine of FIG. 1, with certain components omitted, illustrating the injection assembly and side-by-side parallel incubating tray track and hatching tray track.
Figure 8:
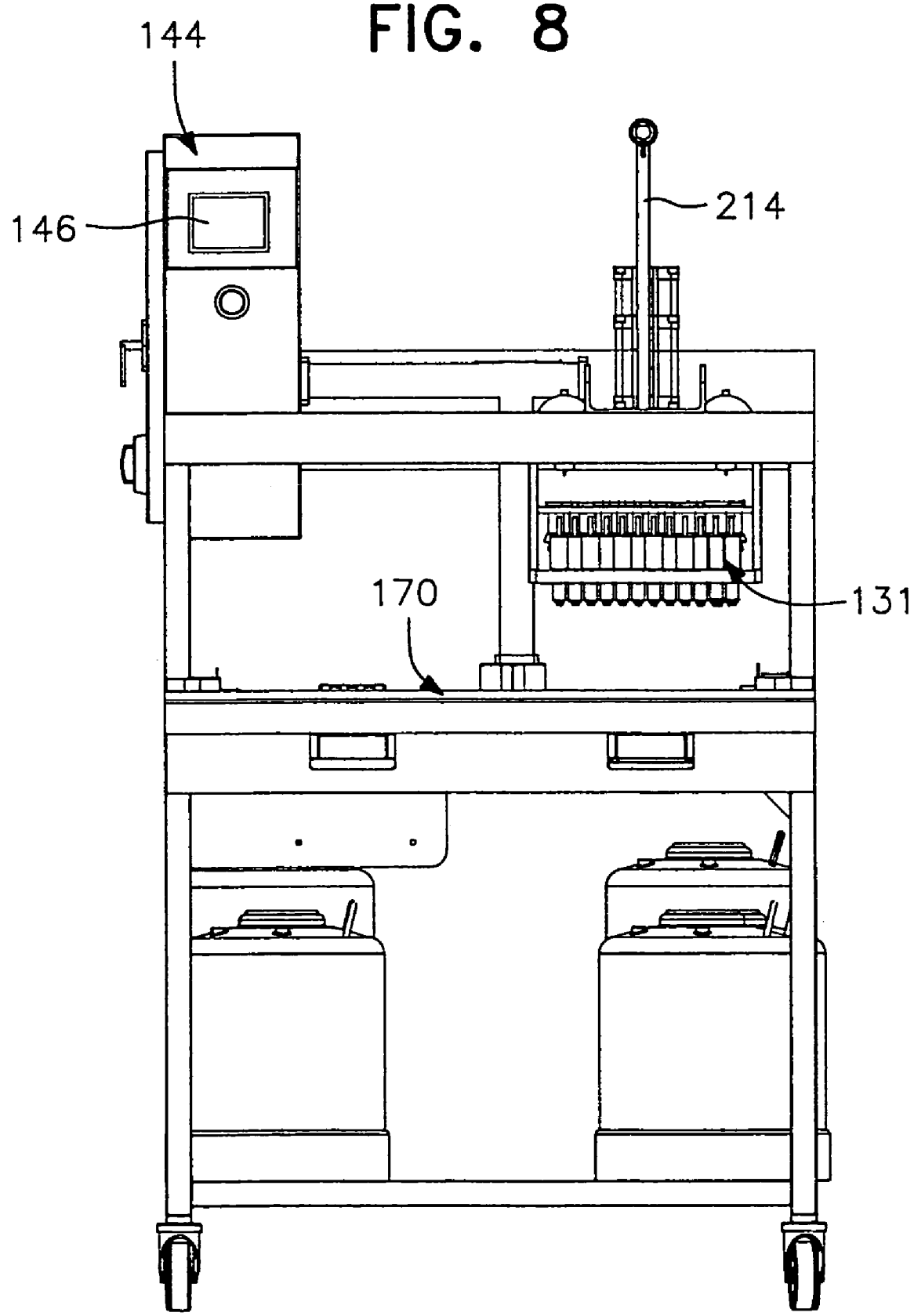
FIG. 8 is a front plan view of the injection machine of FIG. 1, with certain components omitted.
Figure 9:
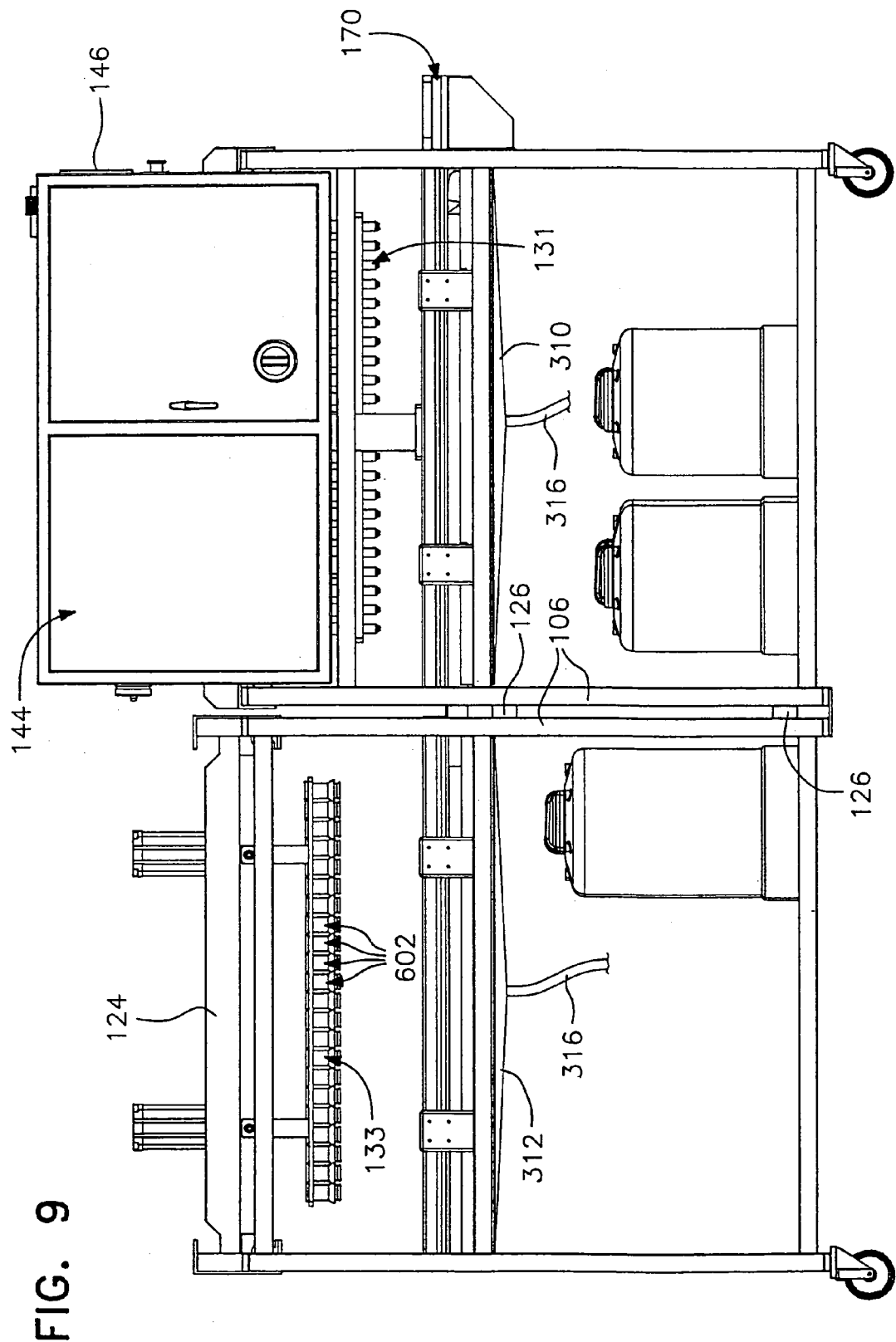
FIG. 9 is a side elevation view of the left side of the injection machine of FIG. 1, illustrating the control panel and transfer section.
Figure 10:
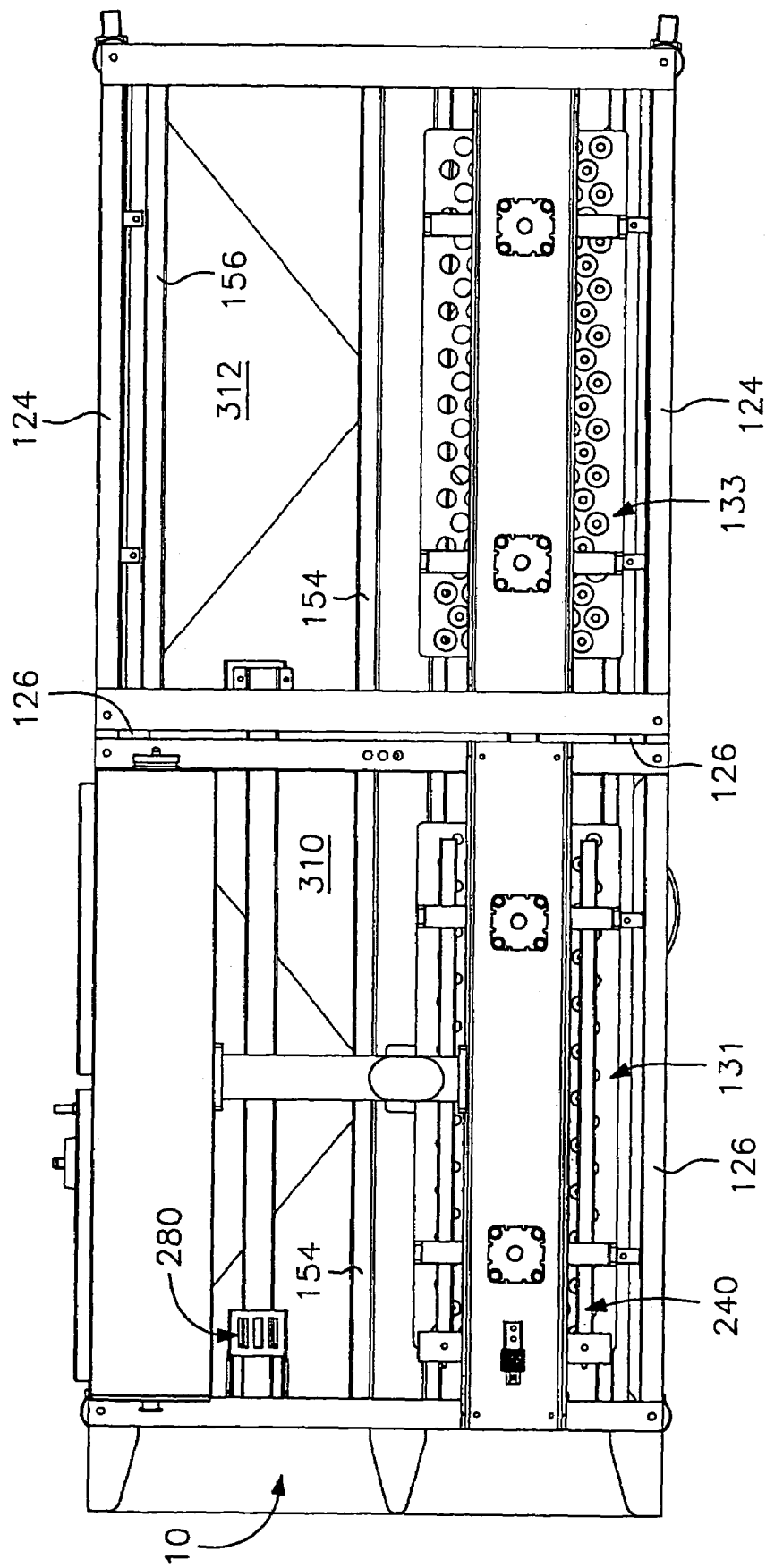
FIG. 10 is a top plan view of the injection machine of FIG. 1.
Figure 23:
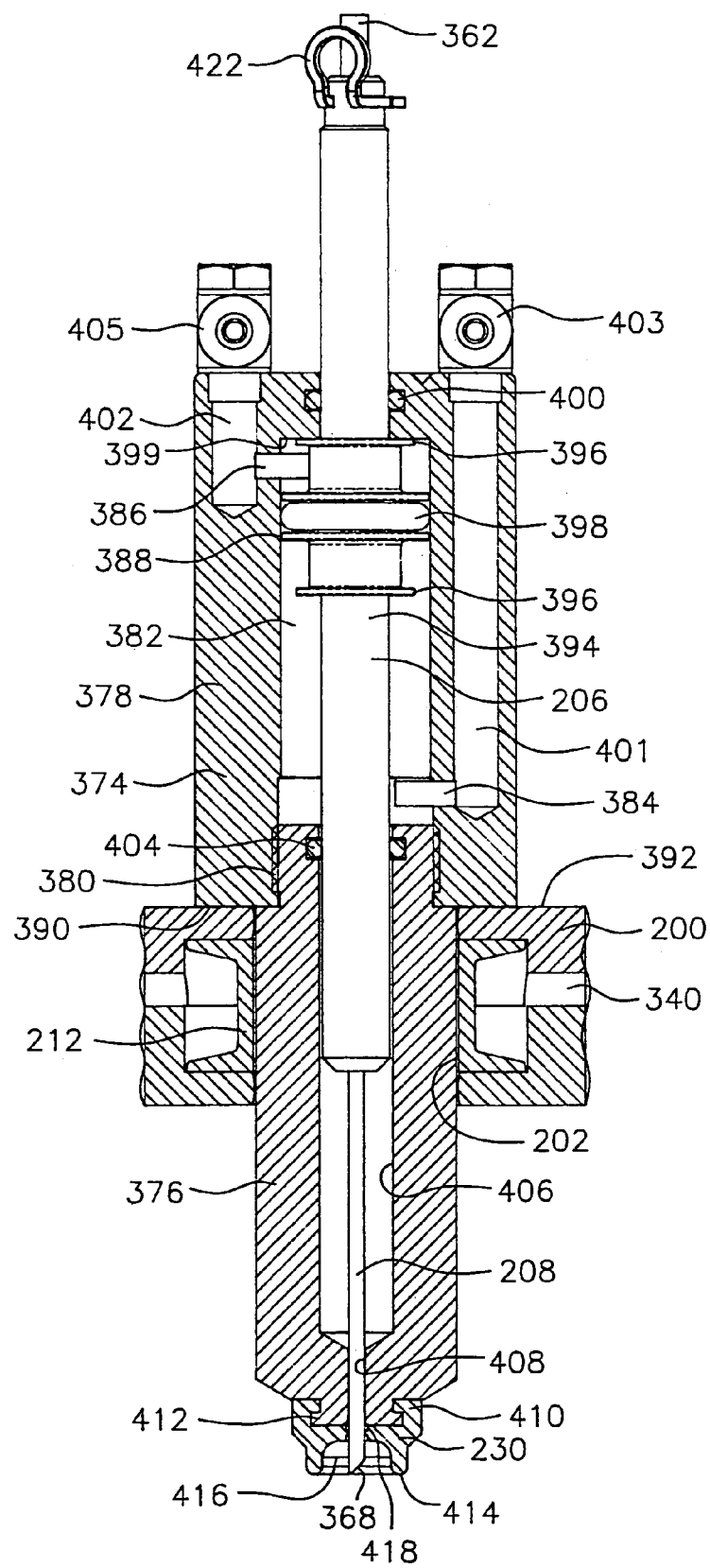
FIG. 23 is a partial sectional view of an injector in accordance with the present invention, illustrating the injection needle assembly positioned within the injector housing in a retracted position, and showing the injector positioned in an opening of the injector support plate.
Figure 24:
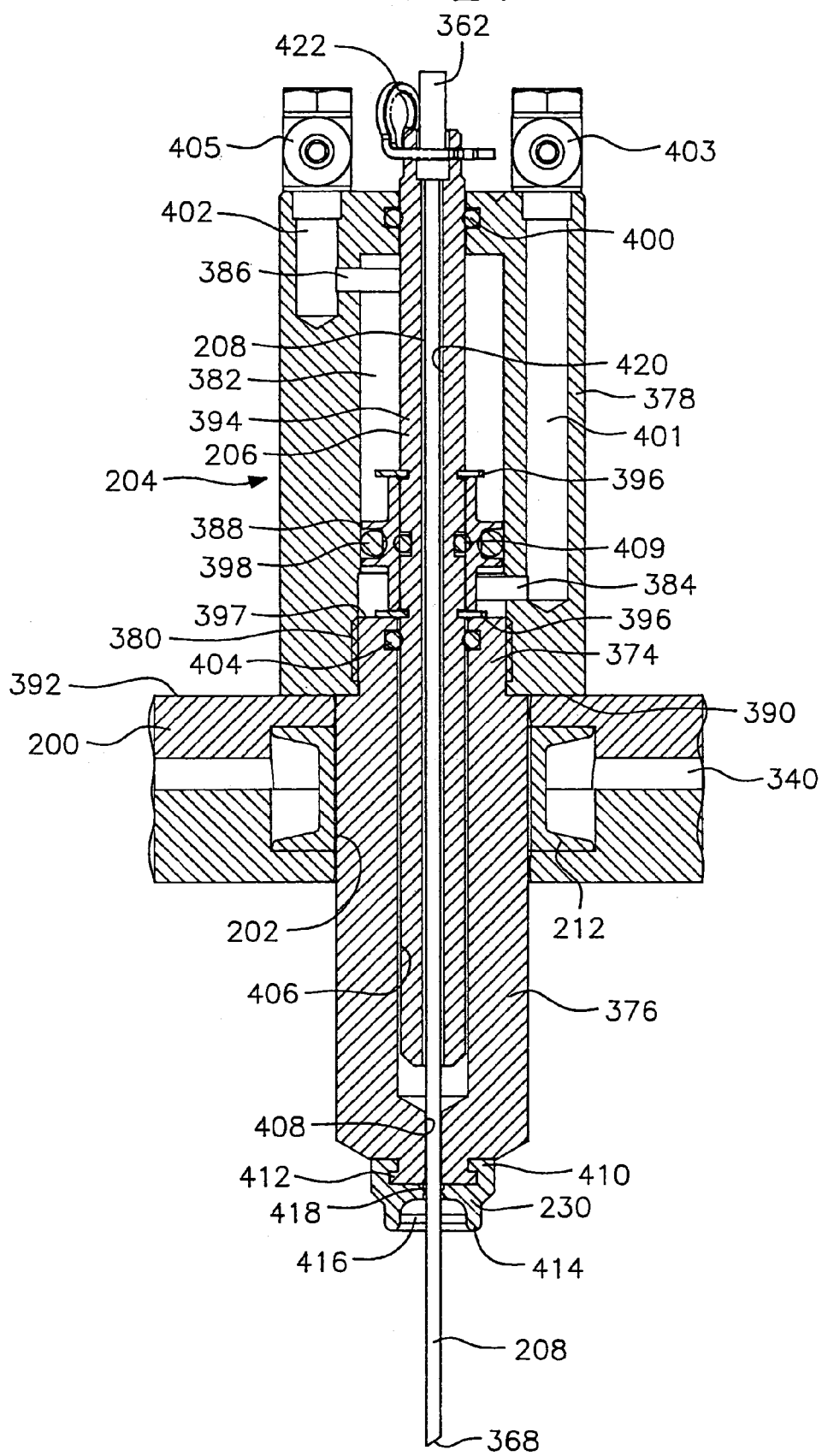
FIG. 24 is a sectional view of the injector and support plate shown in FIG. 23, but with the injection needle assembly in an extended position.

For the sake of clarity, one injector 204 positioned in its respective opening 202 of the injector support plate 200 is shown in FIGS. 23 and 24 with the injection needle 208 in its retracted position in FIG. 23 and in an extended position in FIG. 24. The injection assembly 131 includes numerous vertically movable injectors 204, one for each egg, such as shown in FIGS. 1 and 5. Each injector 204 includes a cylindrical body or housing 374 made up of a cylindrical lower body portion 376 and a cylindrical upper body portion 378 which are connected preferably by threads 380. When assembled, the cylindrical body 374 defines an air chamber 382 with an air up port 384 at the lower end and air down port 386 at its upper end on either side of an actuating piston 388, as will be described below. The air ports 384 and 386 are connected to vertical air channels 401 and 402, respectively, through upper body portion 378 to air hose connectors 403 and 405 mounted on top of the injector body 374.

The gripper ring 212 is mounted in the support plate 200 such that the lower body portion 376 of the cylindrical body 374 is free to move vertically within the plate opening 202. The upper body portion 378 has a larger diameter than the lower body portion 376 so as to define a ledge 390 when the portions 376 and 378 are assembled. When the injector 204 is resting freely in opening 202, such as when the injector is not in contact with an egg, the ledge 390 rests on the top surface 392 of the support plate 200 around opening 202.

Each injector 204 includes an injection needle assembly 206 which is vertically movable within the cylindrical body 374. The injection needle assembly 206 includes the injection needle 208 which is surrounded along a major portion of its length by a needle guide sleeve 394 and the piston 388 which is mounted on the sleeve 394 and captured in position by upper and lower retaining rings 396. The outer periphery of piston 388 includes a conventional ring seal 398 which seals the piston 388 against the inner cylindrical wall of air chamber 382. A second conventional ring seal 409 is fitted in an appropriate recess to seal the inside of piston 388 against the outside wall of guide sleeve 394.

The upper end of chamber 382 is sealed by another conventional ring seal 400 captured in the upper end of cylindrical upper body portion 378 which seals against the outer cylindrical surface of needle guide sleeve 394. The lower end of chamber 382 is sealed by a fourth conventional ring seal 404 captured in the top end of cylindrical lower body portion 376 which also seals against the sleeve outer surface. The cylindrical lower body portion 376 has a longitudinal cylindrical bore 406 extending through its center which has a diameter only slightly larger than the diameter of needle guide sleeve 394. The cylindrical bore 406 serves to guide the injection needle assembly 206 as it moves up and down within the cylindrical body 374. The cylindrical bore 406 terminates toward the lower end of the cylindrical lower body portion 376 to define a reduced diameter bore 408 sized to receive only the needle 208 therethrough.

The cylindrical body 374 is preferably made from high density plastic material, while the needle guide sleeve 394 and piston 388 are preferably made of stainless steel. The O-rings 398, 400 and 404 are all conventional and made from standard elastomeric materials. The needle 208 is preferably made of stainless steel, with or without a reinforced titanium tip at the piercing and injecting end 368.

A stabilizing nipple 230 is sealingly secured to the lowermost end of the cylindrical lower body portion 376 by a snap fitting 410 over cylindrical flange 412 of the lower body portion 376. The lower edge 414 of the stabilizing nipple 230 is preferably rounded and sized to present a reduced ring area for contact with the egg. More specifically, the diameter of the circular lower edge 414 is preferably less than ½ inch, and a ⅜ inch outer diameter is most preferred. It has been found that this smaller diameter contact surface area results in a proper injection location within the egg irrespective of the size and tilt orientation of the egg in the incubating tray 168. The central opening 416 of the nipple 230 through which the needle 208 extends during egg penetration and injecting also has a small internal seal ring 418 which seals against the outer surface of the needle 208. When the needle 208 is lifted to its retracted position, with the needle tip 368 in opening 416, the internal seal ring 418 serves to wipe the outer wall surface of the needle 308. Hence, the internal seal ring 418 cleans the needle 208 during its upstroke both after egg injection and after injector sanitization. This wiping of the needle 208 after the injector sanitization causes the sanitizing fluid to be wiped clean from the needles and to drop into the collecting pan 310 before initiation of the next injecting cycle, thus eliminating the dripping of sanitizing solution onto the next group of eggs to be injected. The stabilizing nipple 230 is made from any suitable elastomeric material, and silicone rubber is preferred in view of its inert properties.

The needle guide sleeve 394 has an axial bore 420 for receiving the needle 208. The male fitting 362 at the upper end 360 of the needle 208 is received in a complementary fitting clip 422 at the upper end of the needle guide sleeve 394 so that the needle 208, sleeve 394 and piston 388 all move together. It is understood that a threaded or other type fitting could be used to accomplish this purpose. The axial bore 420 in the needle guide sleeve 394 is minimally larger than the outside diameter of the needle 208, thereby providing lateral support to the needle during penetration of the egg shell. This diameter differential also allows removal and replacement of the needle 208 from the top of the injector 204.

When the injector support plate 200 is lowered by air cylinders 186 into position over the incubating tray 168, two things happen. First, the lower edge contact ring 414 of nipple 230 engages and seats around the uppermost part of the egg. Because the ring 414 presents a reduced surface contact area, each nipple 230 adjusts to the position of its respective egg as the injectors 204 on plate 200 descend, regardless of the orientation of the eggs in the tray 168. This allows the nipples 230 to make complete contact around their perimeter at the upper end of the eggs. Second, each injector 204 adjusts vertically to the height of the egg by virtue of the free vertical movement of the injector 204 in the openings 202. Since the injectors 204 can move independently of one another, the injectors rise to different heights so that different sizes of eggs can be accommodated within the same tray 168. Further, because the design of the conventional incubating tray dictates the center of rotation for each egg within the egg flat depression, the stabilizing nipple 230 functions to align the egg with respect to the needle 208 regardless of the orientation of the egg. Because of this alignment and along with the simultaneous vertical adjustment of the injector 204, the needle 208 will always extend substantially to the same location or desired injecting region within the egg.

When the support plate 200 completes its downward travel, the air pressure through inlets 342 is activated to expand the gripper rings 212 against the lower body portion 376 to hold the injectors 204 securely in position in the holes 202. Thus, once the injectors 204 stop descending with the descending plate 200 to accommodate individual egg heights, the gripper rings 212 clamp the injectors 204 in place, preventing the injectors 204 from lifting off from the eggs. Otherwise, the injectors 204 could lift off from the eggs when the needles 208 make contact during piercing of the egg shells.

Once the injectors 204 are locked in position in plate 200, the needle assembly 206 with the piston 388 is activated by pressurized air fed to the upper side of chamber 382 through air connector 405, channel 402 and port 386. The air delivery tubes are all as short as possible and from opposed outlets deliver air to the chambers 382 at opposite ends of each row of injectors 204. All of the injectors 204 in the row are connected in series. This configuration evenly distributes line pressure and enables all the injection needle assemblies 206 to move downwardly with the needles 208 extending substantially at the same time. As the assemblies 206 move downwardly, the needles 208 extend out of the injectors 204 a predetermined distance and with sufficient velocity to cause the beveled tip 368 of the needle to shear through the egg shell. The needle 208 continues through the opening in the egg shell to the injecting location or region. The distance the needle tip 368 moves is determined by the stroke length of the piston 388 in the chamber 382. The needle assembly 206 bottoms out and the needle 208 reaches maximum extension, when the lower retaining ring 396 engages the top surface 397 of the lower body component 376. As shown in FIG. 24, the needle 208 is close to its fully extended position. When needle 208 is fully extended, fluid is injected into the egg through the needle tip 368. After injection, air pressure is applied to the underneath side of the piston 388 through air inlet connector 403, channel 401 and port 384 to move the needle assembly 206 upwardly, thus retracting the needle 208 back into cylindrical bore 406 and needle tip 368 into opening 416. The upstroke is completed when the upper retaining ring 396 engages the top wall 399 defining chamber 382, as shown in FIG. 23.

While the needle assemblies 206 move up, the gripper rings 212 release and the plate 200 begins its move to the "up" position. As the support plate 200 moves upwardly, its top surface 392 engages ledges 390 of the injector bodies 374 to lift the injectors 204 upwardly from the injected eggs. When the support plate 200 reaches its "up" position, a proximity sensor in the pneumatic cylinders 186 senses the return of the plate 200 and signals the PLC to move the tray positioning assembly 280 to push the incubating tray 168 forward to the area of the transfer section 132 and to activate the sanitizing assembly 300.

Next, one vaccine delivery assembly 240 will be described in detail by reference to FIGS. 25–28. This vaccine delivery assembly 240 includes a diaphragm or heart-type pump, generally designated by reference numeral 242, for pumping the vaccine to the injection needles 208 and a fluid distribution manifold, generally designated by reference numeral 260, which is made up of a plurality of individual manifold modules 270. There are preferably two delivery assemblies 240 which are positioned above the injectors 204, adjacent each longitudinal edge of the injection assembly 131. Each delivery assembly 240 is supported underneath the outer extremities of the yoke of the U-shaped support members 210 (see FIG. 5), and each feeds the half of the injectors 204 on its side of the injection assembly 131. Hence, if the injection assembly 131 includes 132 injectors, each delivery assembly 240 simultaneously feeds 66 injectors.

A fluid delivery tube extends downwardly from the bottom of the vaccine delivery bag to feed the diaphragm or heart-like pumps 242 of the vaccine delivery assemblies 240 through inlet barb fitting 264. In the preferred configuration, i.e. two vaccine delivery assemblies 240, the fluid delivery tube splits into two feeder lines one to each pump 242. The vaccine is delivered by gravity flow from the vaccine delivery bag by the gravity pressure exerted as a result of the bag height above the pump 242.

Each diaphragm or heart pump 242 is formed by a pair of mating body members 424 and 426 which define a generally cylindrical valve chamber 428. Centrally positioned within the valve chamber 428 is a circular flexible membrane 430 which is captured around its periphery 432 between the mating body members 424 and 426. The flexible membrane 430 divides the valve chamber 428 into a vaccine chamber 434 and an air pressure chamber 436. Formed in the upper end of body member 424 is a fluid inlet opening 438 and formed in the lower portion of body member 424 is a fluid outlet opening 440. A floating ball valve 442 is fitted into inlet opening 438 and inlet fitting 264 is fitted into the inlet side of the ball valve 442. A central air port 444 is formed in body member 426 to deliver air pressure centrally to flexible membrane 430 within the valve chamber 428.

Figure 25:
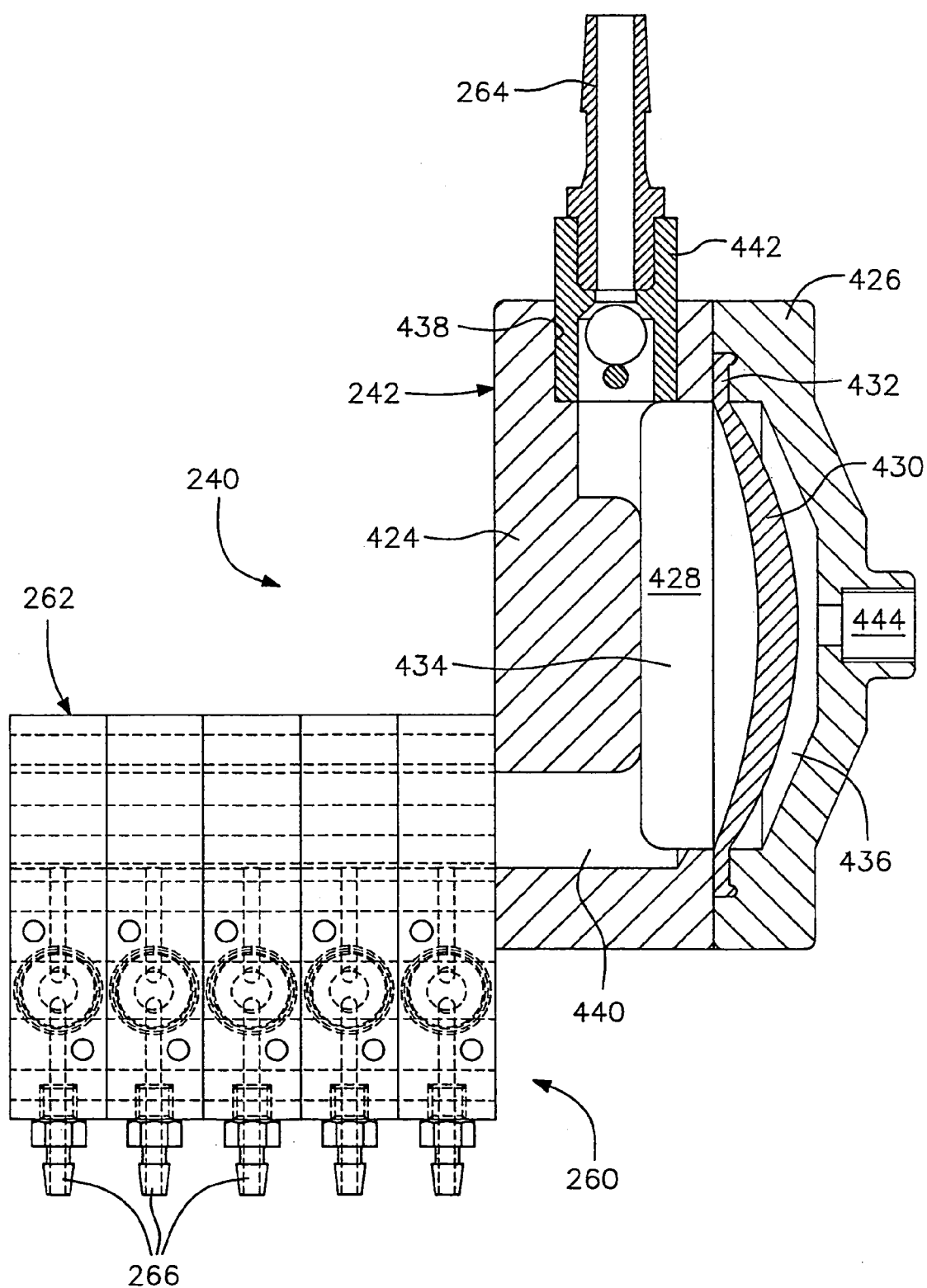
FIG. 25 is a sectional view of one embodiment of a vaccine delivery system for the injection apparatus and method of the present invention, illustrating the heart-type valve pump connected to a series of side-by-side individual modules which are assembled together to construct the fluid distribution manifold.

As shown in FIG. 25, the fluid vaccine enters the pump 242 through the inlet fitting 264. With no pressure in air pressure chamber 436, the floating ball valve 442 permits the vaccine to enter the vaccine chamber 434. Once the vaccine chamber 434 is full, the ball valve 442 closes off the inlet fitting 264. No further fluid enters the chamber 434 and the valve prevents fluid from escaping out of the inlet 264. At this point, air is forced into the air pressure chamber 436 through port 444. This in turn drives the central portion of the membrane 430 into the vaccine chamber (to the left in FIG. 25) and forces the vaccine out through the outlet port 440 and into the manifold assembly 260 under pressure.

The manifold assembly 260 comprises a plurality of vaccine manifold modules 262 shown positioned in side-by-side relation to the pump outlet 440 in FIG. 25. Each of the manifold modules 262 supplies one-half of each row of injectors 204 in the injection assembly 131. Each module 262 is connected to the upper end 360 of its respective needles 208 by way of split tubing connected to the outlet barb fitting 266 at the lower end of the module 262. At the other end, the vaccine enters the vaccine delivery port 446 directly from the pump vaccine outlet 440. When placed in series, the modules 262 making up the manifold assembly 260 form an elongated vaccine delivery port 446 extending from the pump outlet 440 to the outermost module 262. The vaccine delivery port 446 is preferably about ½ inch in diameter. The port 446 in each module 262 communicates with a vertical vaccine delivery pathway 448 which extends down through the manifold module 262, terminating in the outlet barb fitting 266.

Each manifold module 262 is made up of two body components, a vaccine body component 450 and an air pressure body component 452 which fit snugly together to form valve opening 454, as shown in FIG. 26. The valve opening 454 is fitted with a conical flexible valve element 456 clamped between opposed faces of the vaccine body component 450 and air pressure body component 452 around the valve opening 454 to form the pneumatic valve 457.

The pneumatic valves 457 and the flow of vaccine down the vertical path 448 is controlled by air pressure transmitted through an air delivery port 458 which laterally extends through each air pressure body component 452. Hence, when the modules 262 are positioned side-by-side, the adjacent air pressure body components 452 are aligned to form the air delivery port 458 extending the full length of the manifold assembly 260, in a manner similar to the vaccine delivery port 446. The vaccine body component 450 includes a frustoconical opening 460 which crosses over the vertical vaccine flow path 448, and the flexible valve element 456 sits in the opening 460. The concave side of the valve element 456 communicates with the air pressure delivery port 458 through a side port 462 extending laterally through the air pressure body component 452. When air pressure is applied to the air delivery port 458, the valve element 456 is forced against the opening 460, the valve 457 closes, and the flow of vaccine down the path 448 is prevented.

Holes 464 are drilled laterally through each module 262 for holding the vaccine body component 450 and air pressure body component 452 in position with respect to each other for each module 262 and for connecting the modules in series. Rods (not shown) run through these holes 464 to connect the vaccine manifold modules 262 together and to pump 242 and then securely to mount the overall delivery assembly to the U-shaped supports 210.

When installed on the injection assembly 131, the assembled vaccine delivery assembly 240 is tilted so that the manifold assembly 260, and particularly the longitudinal vaccine delivery port 446, is tilted approximately 1°–2°, or more off the horizontal in the direction of raising the vaccine delivery port 446 of the outermost module 262 above the delivery port 446 in the innermost module 262 and the adjacent outlet port 440 of the diaphragm pump 242. This allows any air which may build up in the delivery port 446 to migrate to the outermost module 262, where it can periodically be bled off by the operator through an appropriate bleed-off valve of conventional configuration (not shown).

In operation, the vaccine delivery port 446 and pathways 448 to the valves 457 are filled with vaccine. When air is removed from the heart pump air pressure chamber 436 through port 444, flexible pump membrane 430 moves to expand the vaccine chamber 434 (to the right in FIG. 25). This expansion causes vaccine to be drawn into the vaccine chamber 434 through inlet 264 past floating ball valve 442. When the vaccine chamber 434 is filled, the valve 442 closes off the inlet 264. Air pressure into the air pressure chamber 436 through port 444 causes the flexible pump membrane 430 to reduce the vaccine chamber volume and force one full vaccine dose for all injectors out of the pump outlet 440 into the delivery port 446 and then into the vertical paths 448 of each module 262. The pressure in the vaccine path caused by the movement of the pump membrane 430 causes the vaccine to move past the pneumatic valve 457, out the barbed fitting 266 and into each needle 208 for injection into the respective eggs. The preferred air pressure imparted to the air pressure chamber 436 is about 3 psi to about 5 psi. Once a proper amount of vaccine has been injected, air pressure delivered through port 462 causes the valve 456 to close by pressing against the frustoconical surface of valve opening 460. The fluid delivery system 240 is then ready to begin its next cycle by reducing the air pressure in the air pressure chamber 436 of the diaphragm pump 242.

An alternate preferred embodiment of the fluid delivery assembly is schematically shown in FIGS. 29 through 33 and is generally designated by reference numeral 500. The assembly 500 is a high precision vaccine delivery system and includes a valve distribution manifold, generally designated by reference numeral 502. The manifold 502 has a forwardly extending ledge 504 having a series of vaccine delivery ports 506 extending from a lower surface thereof and an upstanding rear section 508 which defines an elongated vaccine delivery chamber 510 that extends substantially the entire length of the manifold 502. Mounted on the upper side of the forwardly extending ledge 504 is a pneumatic valve receiving plate 512 which holds a series of pneumatic valve elements 514 in position in respective valve chambers 516 defined by the mating lower surface 513 of the pneumatic valve receiving plate 512 and upper surface 505 of the forwardly extending ledge 504 to form a series of pneumatic valves, generally designated by reference numeral 517. Mounted above the pneumatic valve receiving plate 512 is an elongated high pressure air manifold 518 which defines an elongated high pressure air chamber 520. The chamber 520 communicates with the upper surface of each of the respective pneumatic valve elements 514 through respective holes 522 in the pneumatic valve receiving plate 512.

Figure 29:
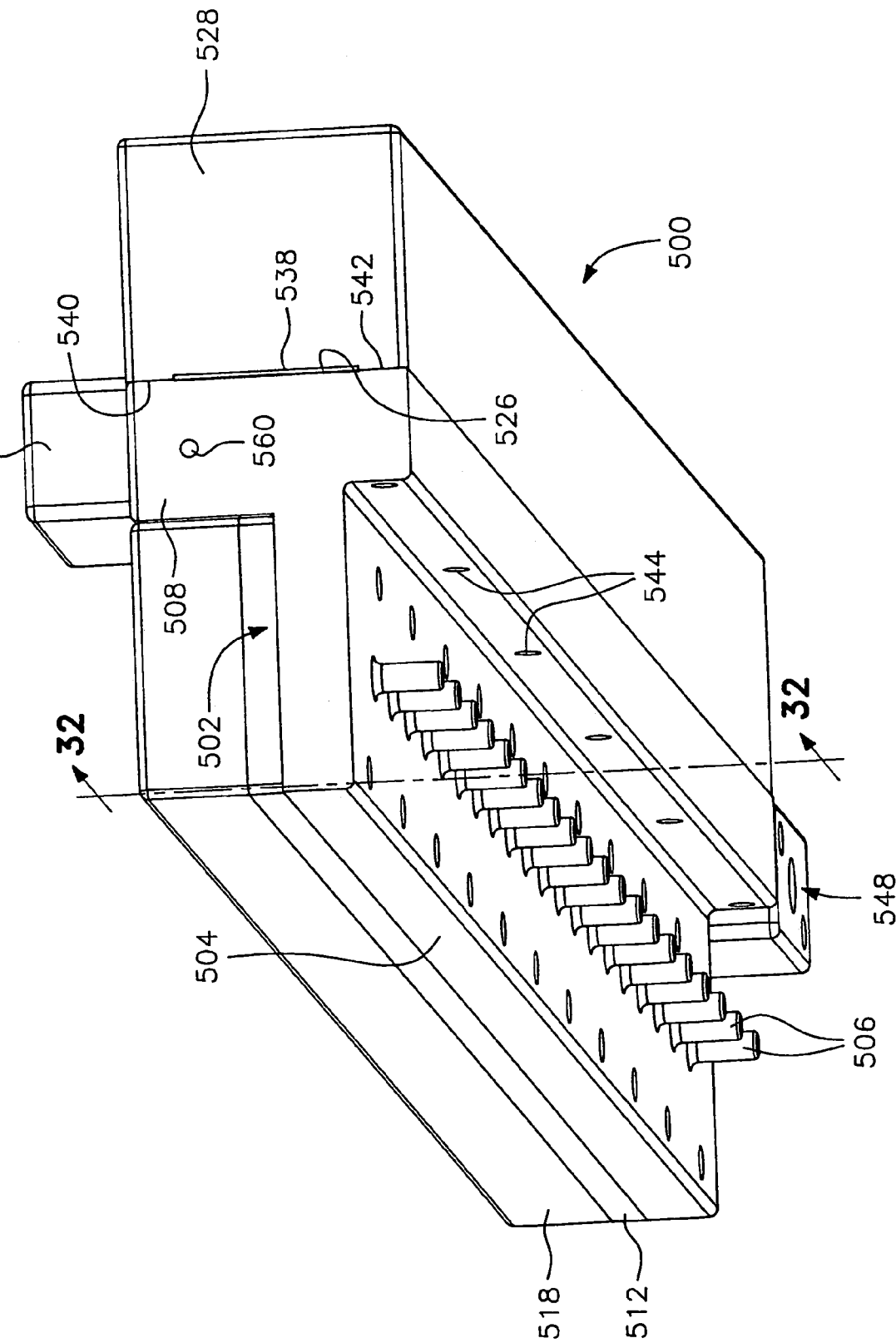
FIG. 29 is a bottom side perspective view of a high precision valve distribution manifold in accordance with the present invention, illustrating the relationship of the various longitudinal body sections and the aligned, vaccine delivery ports for delivering precise quantities of vaccine to the injectors and needles.
Figure 30:
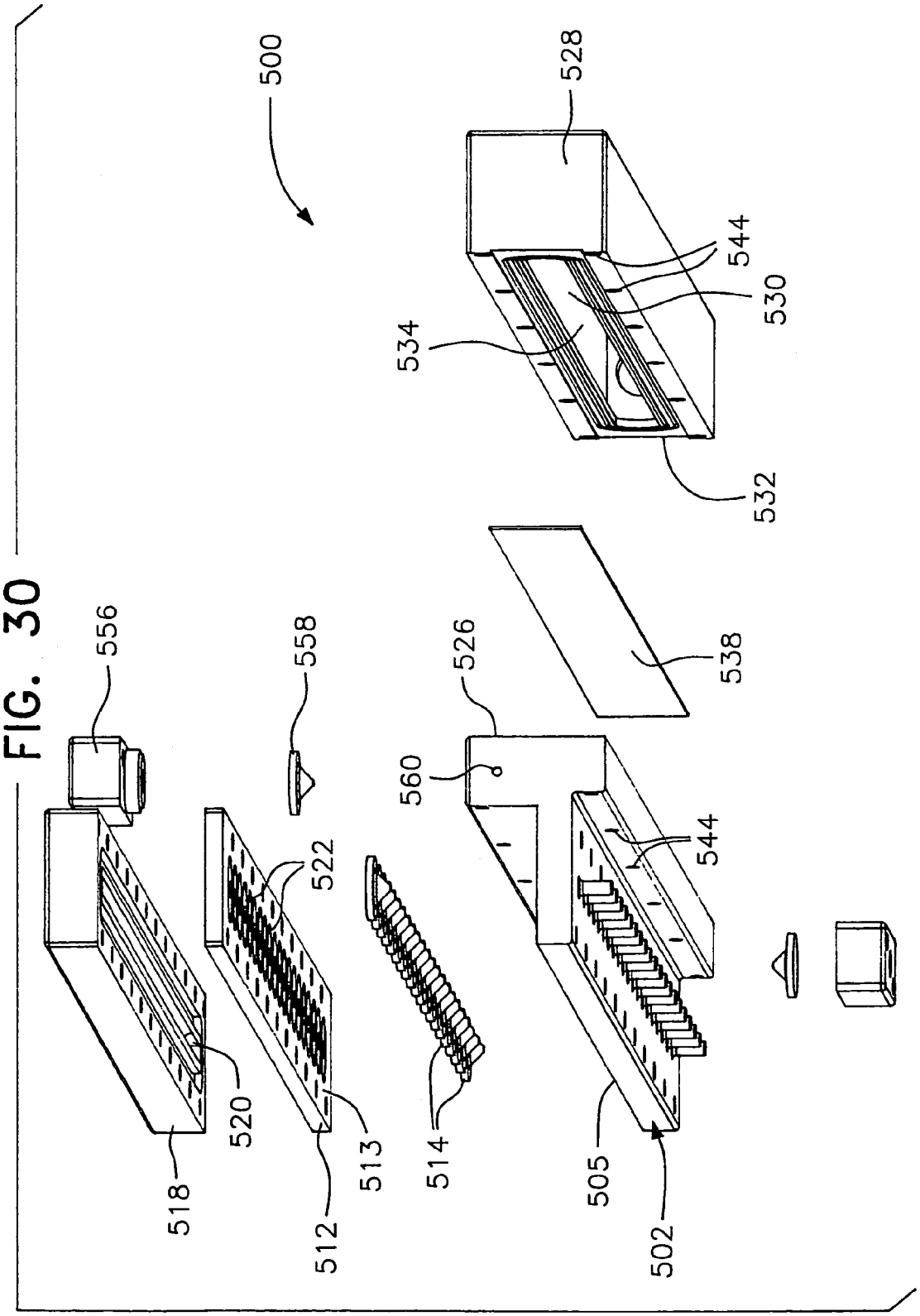
FIG. 30 is an exploded perspective view of the valve distribution manifold of FIG. 29, illustrating the components from the same perspective direction as FIG. 29.
Figure 31:
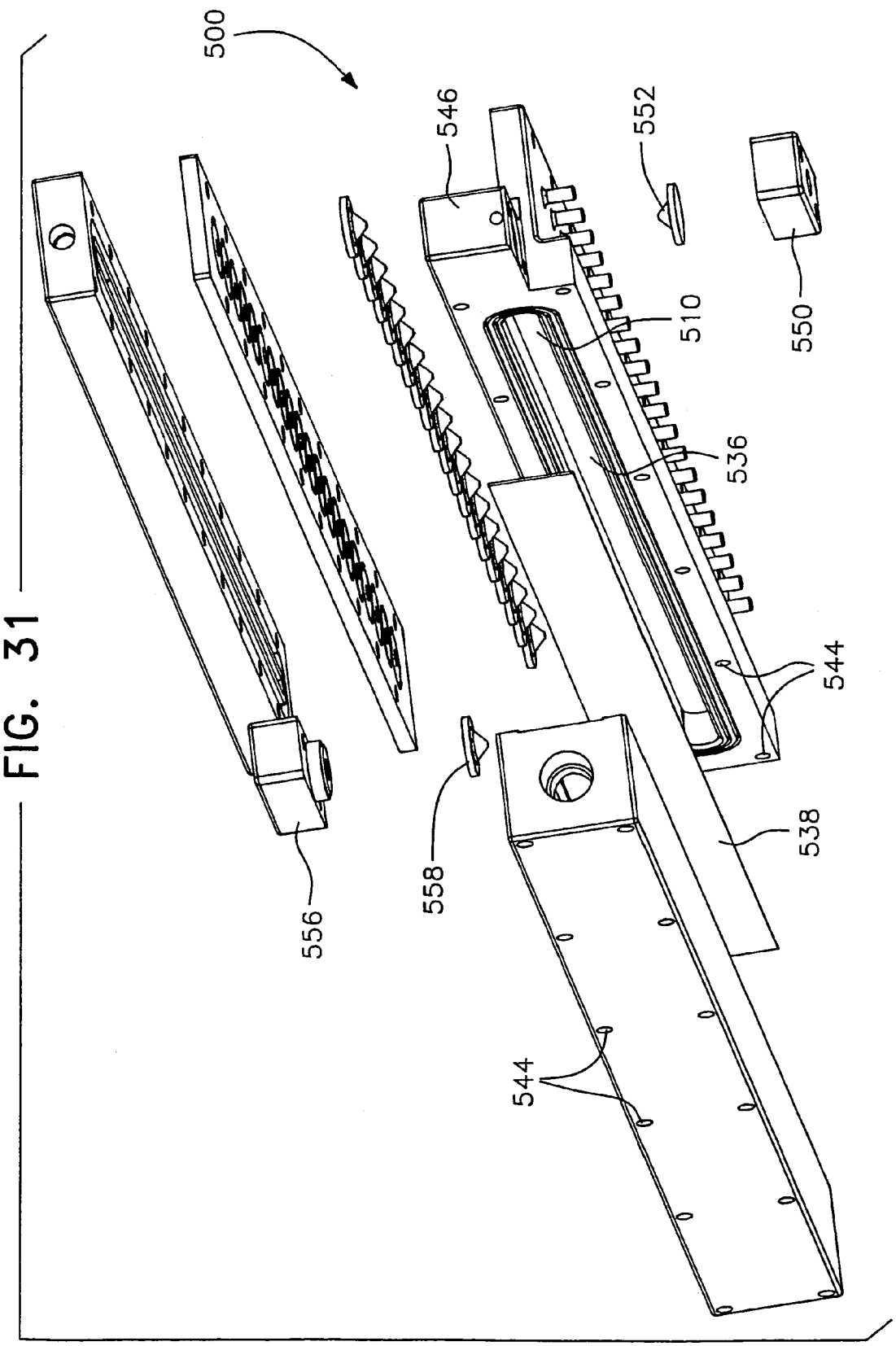
FIG. 31 is an exploded perspective view of the valve distribution manifold of FIG. 29, illustrating the components as seen from the back of the manifold.
Figure 32:
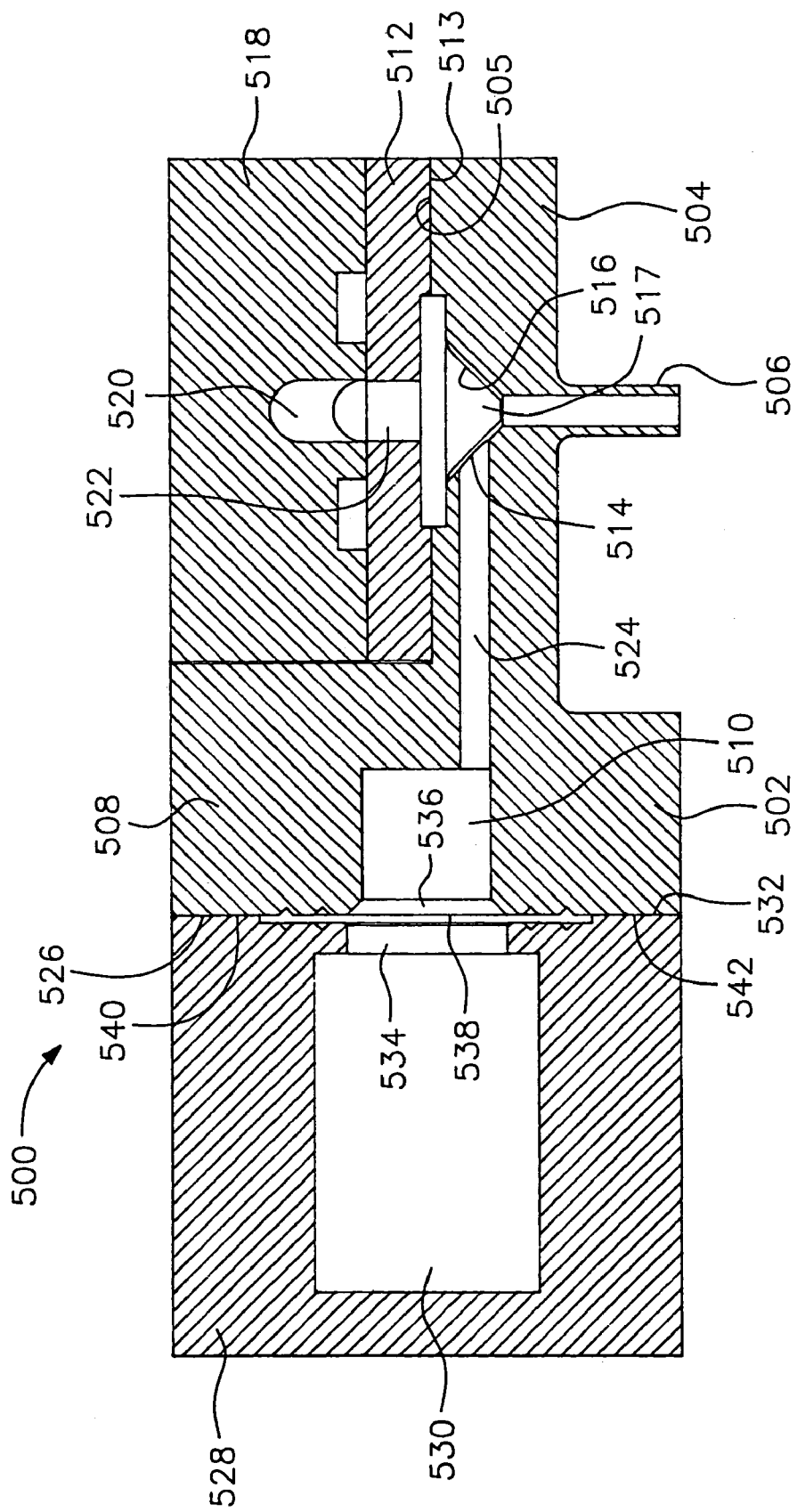
FIG. 32 is a partial sectional view taken along sectional line 32—32 in FIG. 29.
Figure 33:
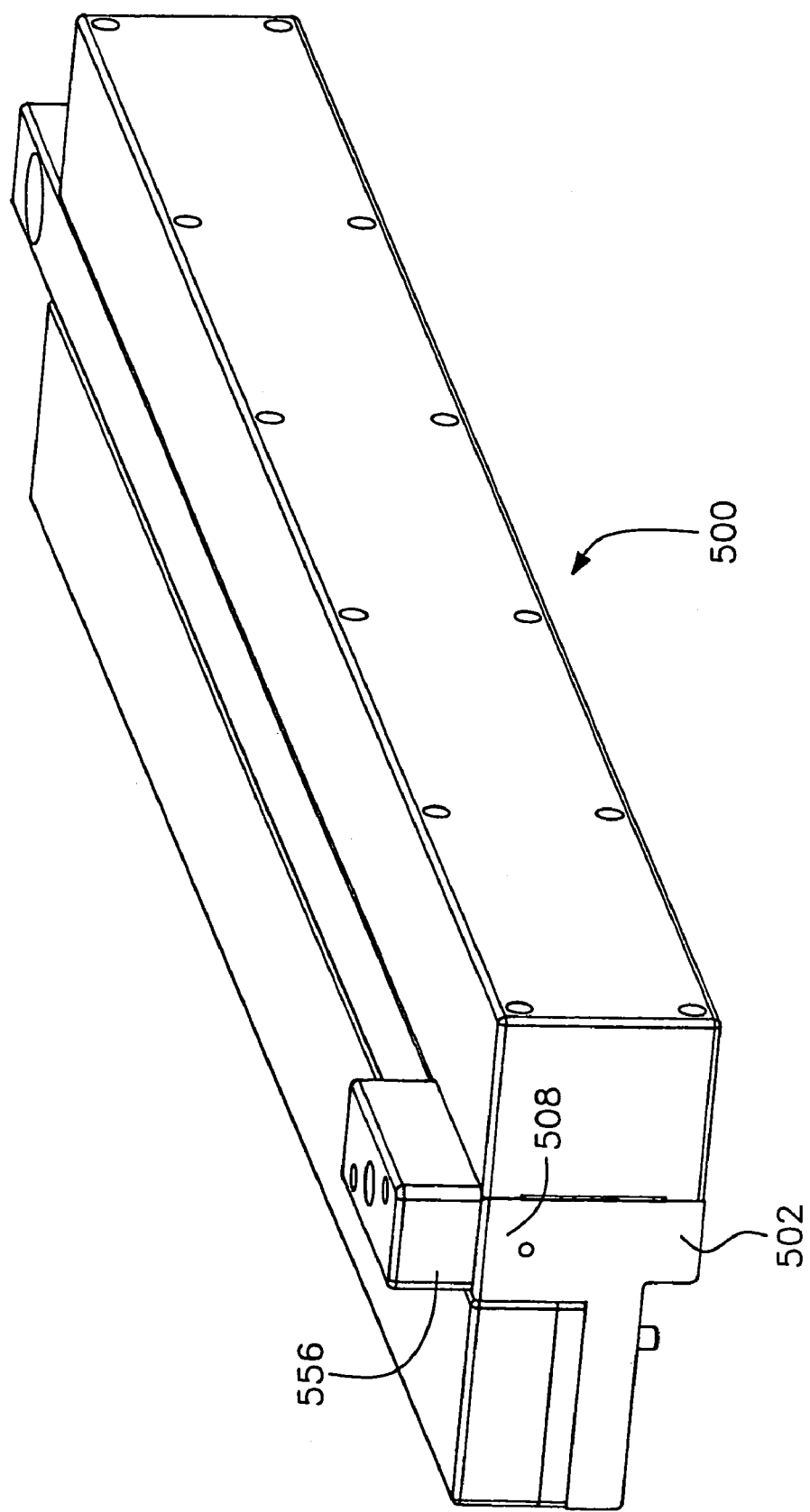
FIG. 33 is a perspective view of the valve distribution manifold shown in FIG. 29, but illustrating the manifold from the opposite direction.

The vaccine delivery chamber 510 communicates with each of the vaccine delivery ports 506 through a respective vaccine passageway 524 which flows through manifold valve chamber 516 and past pneumatic valve 517 in each vaccine passageway 524. Appropriate tubing is attached from each of the vaccine delivery ports 506 to the tops of each of the needles 208, there being preferably one delivery port 506 for each needle. Hence, the twenty vaccine delivery ports 506 shown in FIGS. 29–31, are for illustration purposes only. With two fluid delivery assemblies 500 incorporated into a machine designed to inject 132 eggs at one time, each assembly 500 would have 66 delivery ports 506. When the high pressure air chamber 520 is pressurized, the pneumatic valve elements 514 are pressed against the frustoconical shaped bottom wall 515 (see FIG. 32) of the manifold valve chamber 516, which prevents any vaccine flow from the vaccine delivery chamber 510 out of vaccine delivery ports 506. The pressurized pressure in the high pressure chamber 520 is preferably between about 25 psi and about 75 psi and most preferably about 50 psi. Further, it will be seen that there are separate valve elements 514 illustrated in FIGS. 30 and 31. As an alternative to individual valve elements 514, it may be possible to utilize a single flexible membrane which when assembled between mating surfaces 513 and 512 and pressurized by the high pressure air chamber 520, will close off the pneumatic valves 517.

Mounted behind the back wall 526 of the upstanding rear section 508 is a low pressure air manifold 528 which extends the full length of the upstanding rear section 508. The low pressure air manifold 528 defines an elongated low pressure air chamber 530 which generally aligns with the elongated vaccine delivery chamber 510 in the upstanding rear section 508. The front surface 532 of the low pressure air manifold 528 includes an elongated opening 534 leading to the low pressure air chamber 530. The back wall or rear surface 526 of the upstanding rear section 508 includes an elongated opening 536 which corresponds in size and shape to the elongated opening 534 in the front of the lower pressure air manifold 528. Sandwiched between the front surface 532 of the low pressure air manifold 528 and the rear surface 526 of the upstanding rear section 508 is an elastomeric diaphragm 538 which sealingly separates the low pressure air chamber 530 from the vaccine delivery chamber 510. The front surface 532 of the lower pressure air manifold 528 includes a projecting upper ledge 540 and a projecting lower ledge 542 along its upper and lower edges to mate with the back wall 526 of the upstanding rear section 508 for attachment thereto through holes 544 while at the same time sandwiching the elastomeric diaphragm 538 in position between the horizontally adjacent low pressure air chamber 530 and vaccine delivery chamber 510.

When the low pressure air chamber 530 is pressurized, the elastomeric diaphragm 538 is forced toward the vaccine delivery chamber 510. If the vaccine delivery chamber 510 is full of fluid or vaccine, this force causes a hydraulic pressure build-up, or head pressure in the vaccine delivery chamber 510 and vaccine passageways 524. A preferred pressure for pressurizing the low pressure air chamber 530 is about 1.0 psi to about 3.5 psi and most preferably about 2.5 psi. Then, if the pressure in the high pressure air chamber 520 (about 25–75 psi) is removed, the pneumatic valve elements 514 can be displaced and the pneumatic valves 517 open. A high precision quantity of vaccine is then forced through the manifold valve chamber 516 (past valve elements 514) and out through vaccine delivery ports 506, thus delivering a precise quantity of vaccine to each of the respective needles 208 for injection into the eggs.

The inlet end of the distribution manifold 502 has an extension 546 which includes a vaccine inlet and defines the upper section of a vaccine receiving valve, generally designated by reference numeral 548. The lower section 550 of the vaccine receiving valve 548 is attached to the underneath surface of the extension 546 and sandwiches a pneumatic valve 552 therebetween. When pneumatic pressure is applied to the underneath surface of the pneumatic valve 552 through opening 553 in lower section 550, the upper surface of the valve 552 is pressed against the mating frustoconical surface inside extension 546 and prevents vaccine or other fluid from flowing through the inlet of the receiving valve 548 into the vaccine delivery chamber 510.

Mounted on the opposite end of the distribution manifold 502 from the vaccine receiving valve 548 is a vaccine purging valve 554. The vaccine delivery assembly 500 is tilted at a slight angle from the horizontal so that the vaccine purging valve 554 is mounted above and in fluid communication with the highest elevation of the vaccine delivery chamber 510. The vaccine purging valve 554 includes an upper housing 556 which sandwiches a pneumatic valve 558 in a corresponding opening in the upper surface of the distribution upstanding rear section 508. The pneumatic valve 558 is normally pressurized to a closed position with its frustoconical lower surface engaging the opposed mating surface in the upstanding rear section 508 by pneumatic pressure fed through the vaccine purging valve upper section 556. When the operator desires to purge any air accumulation in the vaccine delivery chamber 510, which will accumulate adjacent the pneumatic valve 558 due to the tilting of the manifold 502, the vaccine purging valve 554 is activated to release pneumatic pressure against the pneumatic valve 558 and allow air and vaccine to exit through purging port 560.

As described previously, the vaccine delivery assembly 500 is preferably tilted approximately 1°–2°, or more, off horizontal, with the vaccine delivery chamber 510 adjacent the vaccine receiving valve 548 positioned below the portion of the chamber 510 adjacent the vaccine purging valve 554. As well, the high precision vaccine delivery assembly 500 is mounted in the injection assembly 131 in the same location as vaccine delivery assembly 240, i.e. supported underneath the outer extremities of the yoke portion of the U-shaped supports 210.

Figure 35:
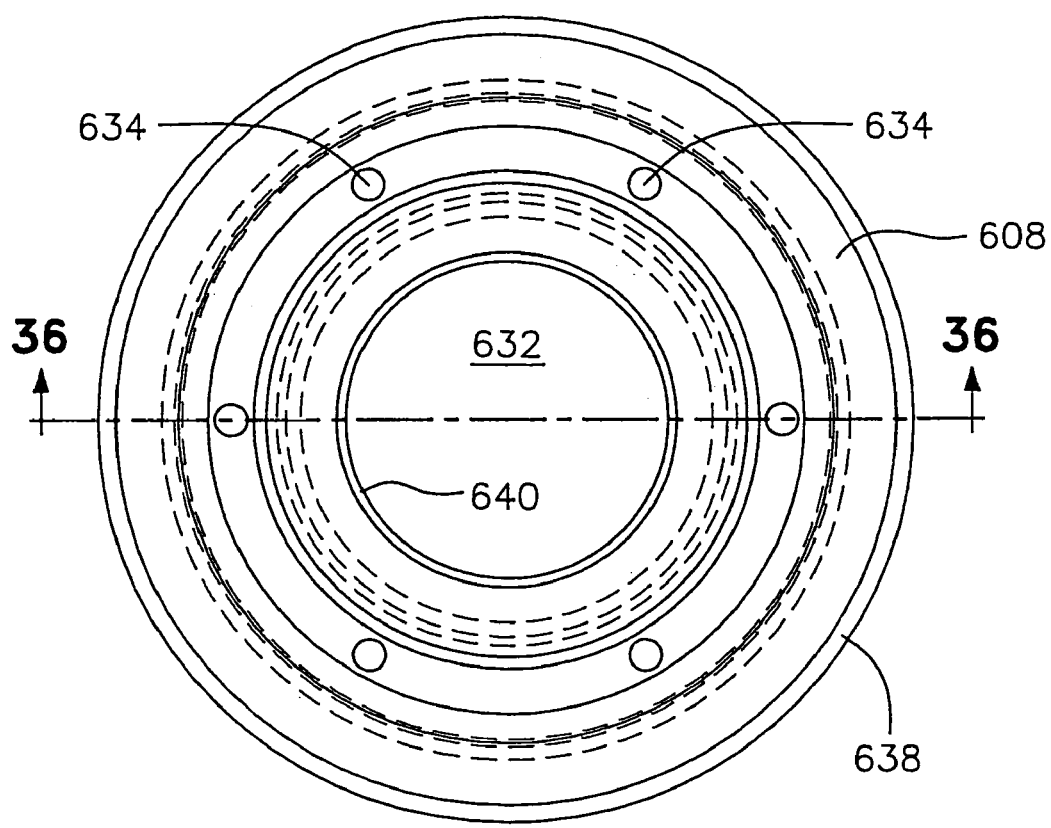
FIG. 35 is a bottom view of the flexible suction cup used in the suction cup assembly shown in FIG. 34.

In normal operation, the vaccine purging valve 554 is closed. At the beginning of the injection cycle, all of the pneumatic valves 514 are in their closed position by pneumatic pressure imposed against their upper surfaces by air pressure in the high pressure air chamber 520 through holes 522, thus preventing any flow of vaccine from the vaccine delivery chamber 510 through passages 524 into ports 506. There is no excess pressure in the low pressure chamber 530, thus allowing the elastomeric diaphragm 538 to be positioned in an "at rest" vertical position, as shown in FIG. 35, but there may be residual head pressure in vaccine chamber 510. The vaccine receiving valve 548 is then opened through pneumatic valve 552 which opens the inlet in extension 546 and allows vaccine to fill the vaccine delivery chamber by gravity flow from the bag storage container. When the vaccine chamber 510 is full, the receiving valve 548 is pneumatically operated to a closed position in order to isolate the vaccine manifold 502 from the external pressure produced by gravity of the vaccine in the bag storage container. Once the injection needles have pierced the egg shells, air pressure is imposed on the low pressure air chamber 530 thus pressurizing the elastomeric diaphragm 538 to increase the head pressure in the vaccine delivery chamber 510 and manifold 502. No fluid yet flows because the pneumatic valves 517 remain closed due to the high pressure in the air chamber 520. The vaccine delivery valves 517 are then simultaneously released for a predetermined amount of time which delivers a precise adjustable volume of vaccine fluid through the valve chambers 516 and delivery ports 506, through needles 208 and into each respective egg cavity.

It will be seen by those skilled in the art that the high precision vaccine delivery system 500 in accordance with the present invention is able to create a predetermined hydraulic pressure in the vaccine chamber and manifold in advance of fluid delivery past the pneumatic valves 517. Then, when opening each individual vaccine delivery valve 517 for a specified amount of time, a precise volume of fluid can be delivered out of each delivery port 506, which volume can be adjusted by changing the length of time the valve 517 is open. Further, the high precision vaccine delivery assembly 500 and all of its functions are operated pneumatically, thus eliminating the pumping of fluids through conventional fluid handling systems which otherwise cause damaging friction and turbulence within the fluid. Thus, few live cells are destroyed in the delivery of vaccine through delivery assembly 500, ensuring that an effective quantity of vaccine titer reaches each injected egg.

If desired, the pneumatic delivery valves 517, vaccine receiving valve 548 and vaccine purging valve 554 could be operated electronically or electrically, rather than pneumatically. In such event, individual delivery valves 517 could be operated independently as determined by the PLC of the machine. Further, even if a single membrane is substituted for the multiple valve elements 514, the individual valves 517 could still be operated independently.

While the high precision vaccine delivery assembly described herein and illustrated in FIGS. 29–33 was specially designed and developed for inclusion in the injection machine and method of the present invention, the vaccine delivery assembly 500 could be built as a separate unit. As such, it could have other applications where high precision fluid delivery of simultaneous multiple dosages is desired, other than for egg injection machines and the like. For example, the high precision vaccine delivery system of the present invention could have application in medical and biotechnology research where specific high precision dosages are delivered in multiple operations simultaneously at one time. Accordingly, it is contemplated that the high precision vaccine delivery system of the present invention be adapted as an independent apparatus for usages outside egg injecting machines.

As described previously, the apparatus and method of the present invention further includes transfer section 132 for transferring the eggs following injection from the incubating tray 168 into the hatching or receiving tray 169. While the transfer section 132 is an integral part of the injecting machine apparatus and method of the present invention, those skilled in the art will readily recognize that the transfer section can be constructed as a separate and independent machine for transferring injected eggs from an incubating tray or egg flat into a hatching or receiving tray. Typical stand alone transfer machines are illustrated in U.S. Pat. Nos. 5,107,794 and 5,247,903. Hence, it is contemplated that the transfer section 132 of the present invention can be an integral part of an overall injection and transfer machine or as a separate stand alone transfer machine.

Referring now to FIGS. 34–38, there is shown one embodiment of the transfer assembly 133 for transferring eggs from the incubating tray 168 to the hatching tray 169. This is the embodiment shown generally in the transfer section 132 in FIGS. 9 and 10. The transfer assembly 133 in this embodiment includes a rectangular generally solid support plate 600 which is positioned to move up and down with respect to the injected eggs in the incubating tray 168. The support plate 600 supports a bank of suction cup assemblies, generally designated by reference numeral 602, that align with each of the injected eggs in the tray 168. The suction cup assemblies are loosely received in circular openings 606 in the support plate 600 such that the assemblies 602 are free to move vertically with respect to the support plate.

The operator initiates transfer by placing a hatching tray 169 on the right side track 152 of the machine. The tray 169 is moved down the track 152 while the incubating tray 168 is moving down the left side track 150. After the eggs in the tray 168 are injected, the tray 168 and injected eggs move forward to the transfer section 132 under the transfer assembly 133. Sensors 295 and 297 in the center guide 158 along track 152 sense when the hatching tray 169 is in place in the transfer section 132 parallel to the incubating tray 168 with the injected eggs. The sensors signal the PLC to start the transfer sequence.

Each suction cup assembly 602 includes a generally annular body 604, and a flexible suction cup 608 mounted on its lower end. An outwardly extending flange 610 around the top of the body 604 prevents the assemblies 602 from moving downwardly out of the support plate openings 606. The number and location of the assemblies 602 preferably correspond in number and location to the egg holding depressions 182 in each incubating tray 168. This configuration allows the transfer of all of the eggs in a tray at one time.

Figure 36:
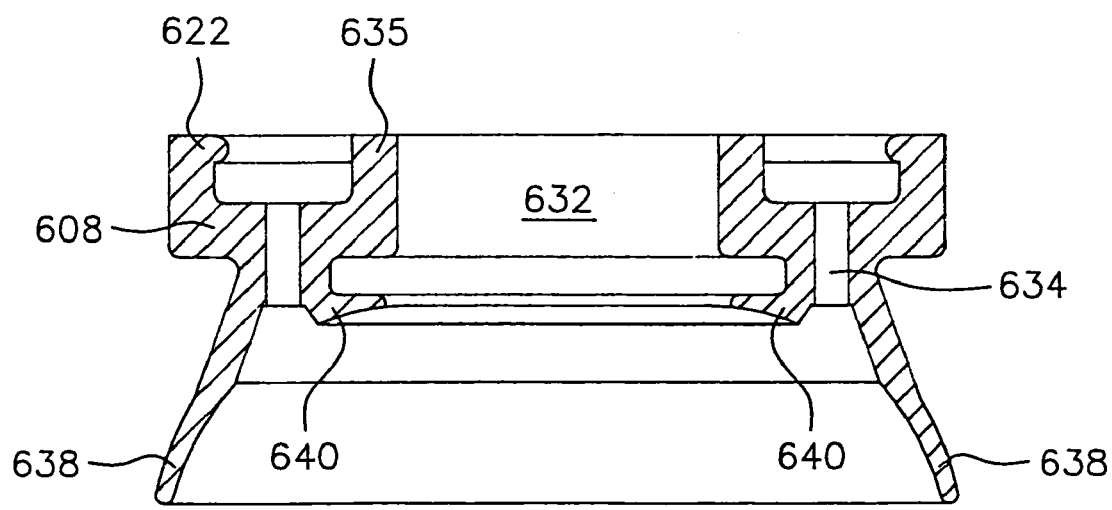
FIG. 36 is a cross-sectional view of the suction cup taken along line 36—36 of FIG. 35.

The annular body 604 includes an open cylindrical center 612 which generally algins with the injection or punctured hole 614 punched in the egg 616. The hole 606 in the support plate 600 receiving the assembly 602 is only slightly larger than the diameter of the body 604 thereby providing lateral support to the assembly 602 but allowing the assembly 602 to remain stationary in the vertical direction upon contact with the injected egg 616 even as the support plate 600 continues its downward stroke. The inner surface of the hole 606 is preferably convex in order to allow the assembly 602 to tilt axially as necessary when engaging the egg 616, as shown in FIG. 36. An air passageway 618 extends the length of the body 604 parallel to the open center 612 and includes an air outlet port 620 at its uppermost end. Appropriate pneumatic connection and hose (not shown) are connected to the air outlet port 620 to apply and release air suction to passageway 618 for operation of the suction cup assembly 602. In operation of the transfer assembly 133, the air is sucked out from the air outlet port 620 to provide a suction or reduced pressure at the lower end of the body 604 and the suction cup 608.

Figure 34:
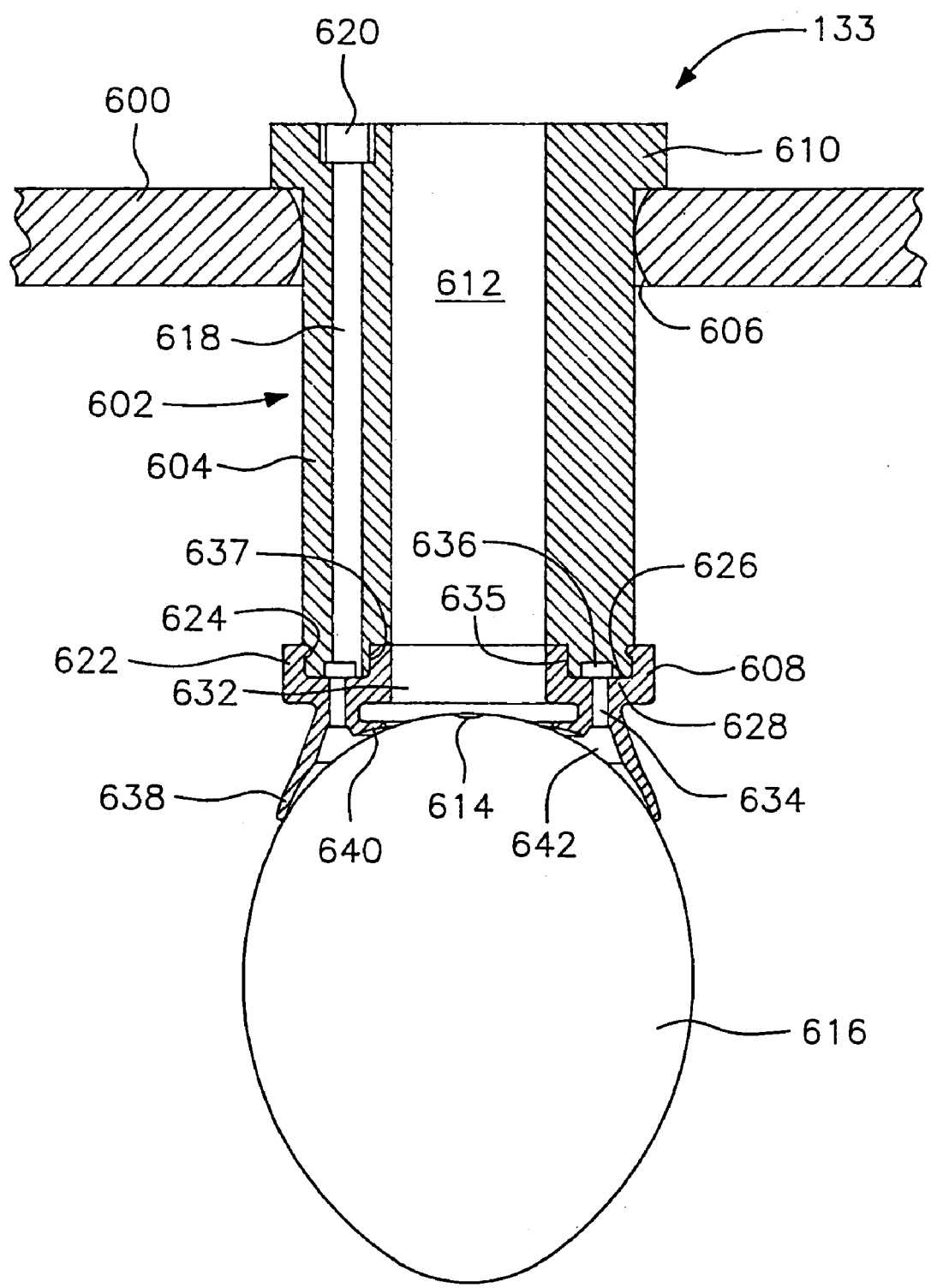
FIG. 34 is a sectional view of one embodiment of a suction cup assembly for use in gripping and transferring the injected eggs in accordance with the present invention, illustrating the suction cup assembly supported within an opening in a transfer support plate.
Figure 37:
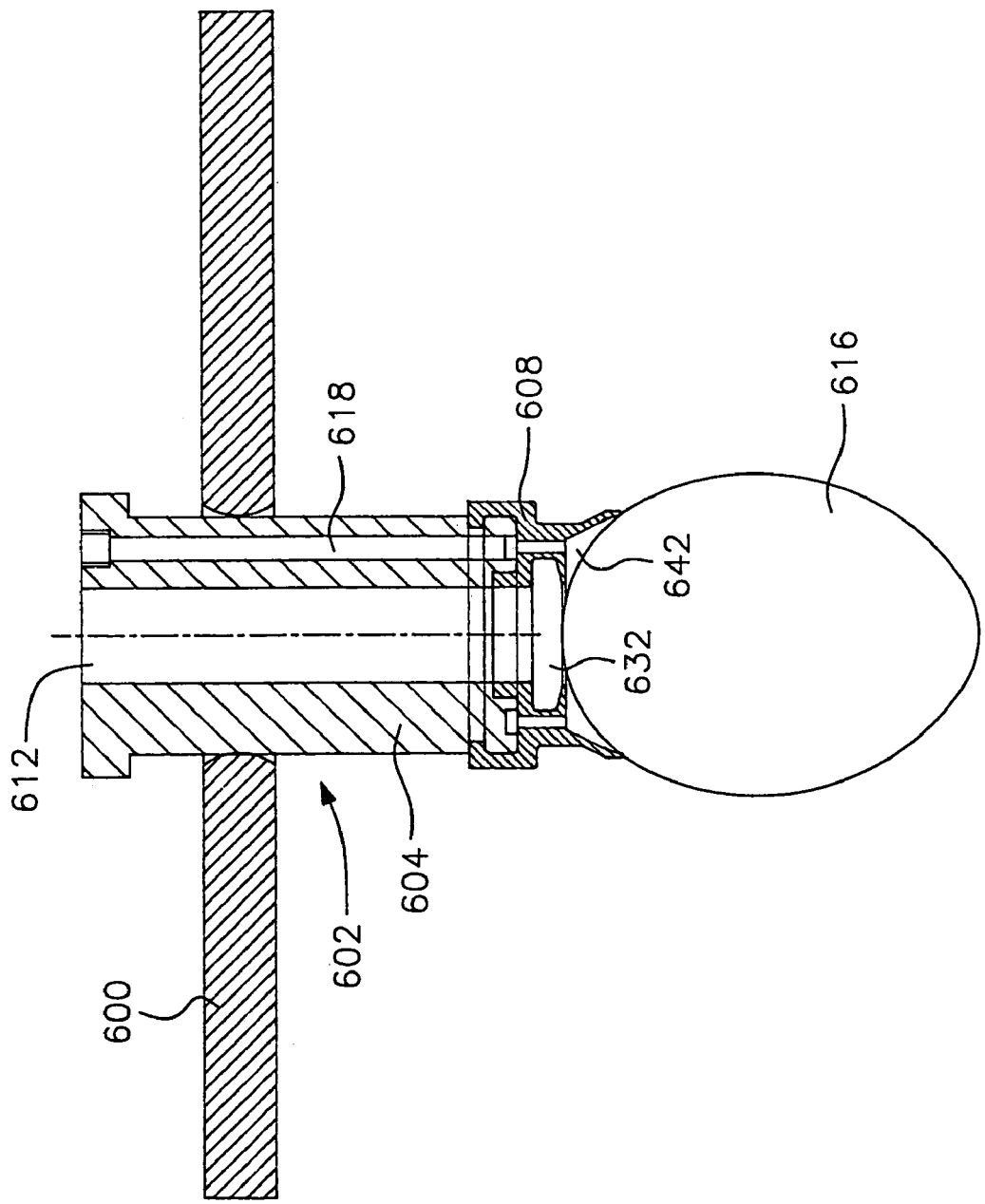
FIGS. 37 and 38 are cross-sectional views of the suction cup assembly of FIG. 34, illustrating how the assembly articulates in the opening of a transfer support plate when the injected eggs are in different orientations in the incubating tray.
Figure 38:
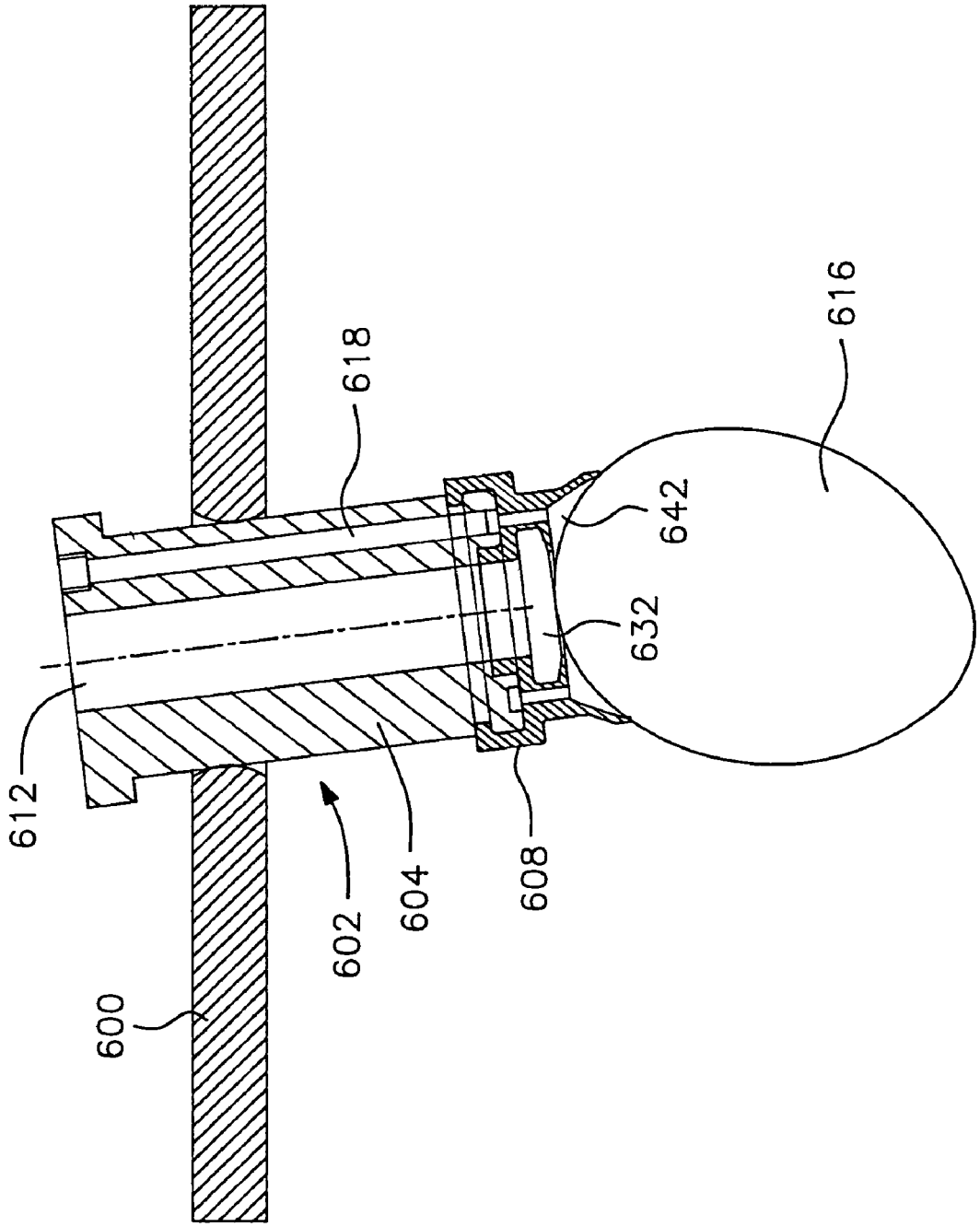

The suction cup 608 is also annular in configuration and is made of a flexible plastic or elastomeric material. As shown in FIGS. 34, 37 and 38, the suction cup 608 fits around the outside lower end of the body 604 and includes an inwardly extending circular flange 622 on its uppermost end which engages in a circular ring 624 on the lower outside surface of the annular body 604. The suction cup 608 includes an inner top surface 626 which engages and mates with the lowermost bottom surface 628 of the body 604. Spaced inwardly of the suction cup inner top surface 626 is an upwardly extending flange 635 which engages groove 637 on the inner top surface of the annular body 604 to complete the sealing of the upper annular end of the suction cup 608 to the annular lower end of the body 604.

The suction cup 608 also includes a center hole 632 which aligns with the opening 612 in the center of the annular body 602. Axially spaced from the center hole 632 are a series of vertical suction holes 634 which connect to a circular groove 636 formed in the bottom end surface 628 of body 604. The groove 636 is sealed by the inner top surface 626 of the suction cup 608. There are preferably six vertical suction holes 634, but more or less can be utilized as desired. The lower end of the suction cup 608 tapers outwardly at its lower end to a flexible outer suction seal 638 which forms one circular seal with the outer shell surface of the egg 616 when the cup 608 is positioned on the egg. Facing inwardly on the bottom of the suction cup 608 is an inner suction seal 640 which forms a second circular seal against the outer shell surface of the egg 616. The second circular seal formed by inner seal 640 is at a location spaced inwardly from and above the first circular seal formed by the outer seal 638. When positioned on the upper end of the egg 616, the lower end of the suction cup 608 and the first and second circular seals form a circular vacuum ring 642 for lifting the egg 616. Thus, when air is removed from air passageway 618 out through air outlet port 620 by a vacuum generator or other suction forming pneumatic component (not shown), a vacuum or reduced pressure is formed in the circular vacuum ring 642 through the vertical holes 634 and circular groove 636, which reduced pressure is sufficient to lift the egg 616 with the suction cup assembly 602 when it is lifted upwardly by support plate 600.

The inner suction seal 640 which forms the second circular seal for the suction cup 608 with the egg 616 is spaced away from the injection or punctured hole 614. Thus, the circular vacuum ring 642 which lifts the egg 616 is spaced away from and surrounds the punctured hole 614, and the portion of the egg 616 which includes the punctured hole 614 is open through center hole 632 of the suction cup 608 and cylindrical hole 612 of the body 604. Hence, the punctured hole 614 is always subject to atmospheric pressure even when suction or reduced pressure is applied to the circular vacuum rings 642 to lift the egg 616. Accordingly, the suction cup assembly 602 is not causing any reduced pressure to be created inside the egg 616 and, therefore, the potential for cross-contamination is substantially reduced as the suction cup assemblies are used repeatedly on many eggs during normal operation of the machine. By creating the vacuum away from the punctured hole of the eggshell, the problems associated with suction cups of the prior art machines are significantly reduced.

When the support plate 600 has raised the suction cup assemblies 602 to their uppermost position with the injected eggs adhered to the suction cups 608 through the reduced air pressure in the circular vacuum rings 642, the transfer assembly 133 is then in a position to move transversely across the machine to a position over the hatching tray 169 properly positioned in the left side track 152. This is accomplished automatically by activation of the transfer air cylinder 196 which moves the transfer assembly 133 from above the incubating tray 168 to above the hatching tray 169. From this latter position, the support plate 600 moves downwardly until the bottom of the eggs 616 engage the bottom of the hatching tray 169. Again, the suction cup assemblies 602 are permitted to move upwardly within openings 606 of the support plate 600, as the support plate continues downwardly to complete its downward stroke.

When the support plate 600 reaches its downward stroke, the suction or reduced pressure in circular vacuum ring 642 is released through passageway 618 and air outlet port 620 thus releasing the eggs 616 from sealed engagement with the bottom of the suction cups 608. The support plate 600 then proceeds upwardly raising the suction cup assemblies 602 as the outward flanges 610 engage the upper surface of the support plate 600 surrounding the openings 604. After the support plate 600 and suspended suction cup assemblies 602 reach their uppermost position, the transverse pneumatic cylinder 196 returns the transfer assembly 133 to its original position above the right side or incubating tray track 150.

FIGS. 37 and 38 illustrates one suction gripping assembly 602 in sealing vacuum engagement with one egg 616. FIG. 37 illustrates a vertically straight or normal engagement with the egg. FIG. 38 illustrates engagement with a skewed or tilted egg. In both examples, when engaging and sealing with the egg, the punctured hole 614 from injection is aligned with the center opening 632 of the annular suction cup 608 and the center opening 612 of the annular body 604. Hence, the pressure surrounding the punctured hole in the egg shell is always maintained at atmospheric levels, with the vacuum applied to the egg 616 in a circular ring spaced away from the punctured hole.

Figure 39:
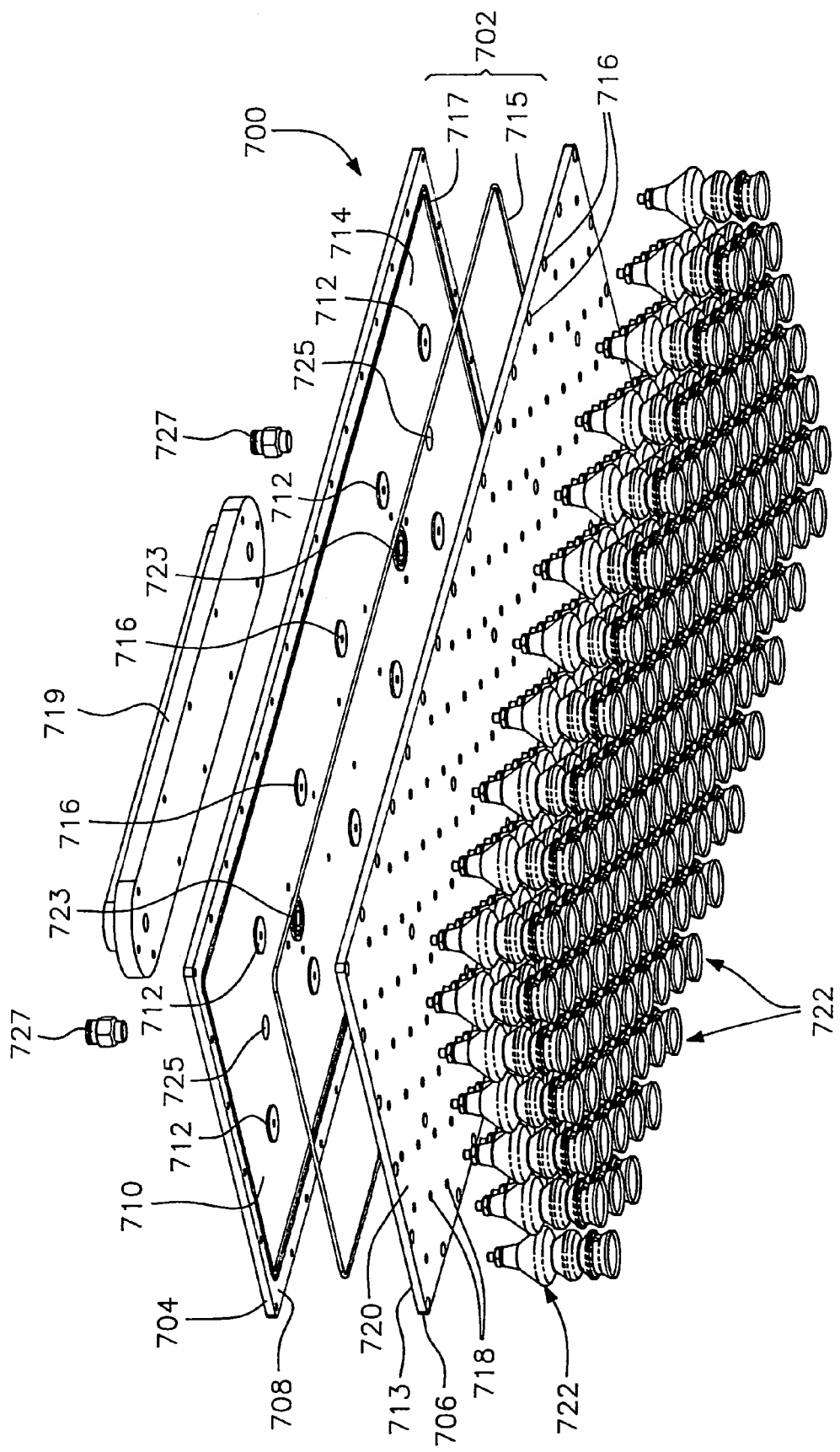
FIG. 39 is an exploded bottom side perspective view of another embodiment of a transfer support plate and suction cup assembly in accordance with the present invention.
Figure 40:
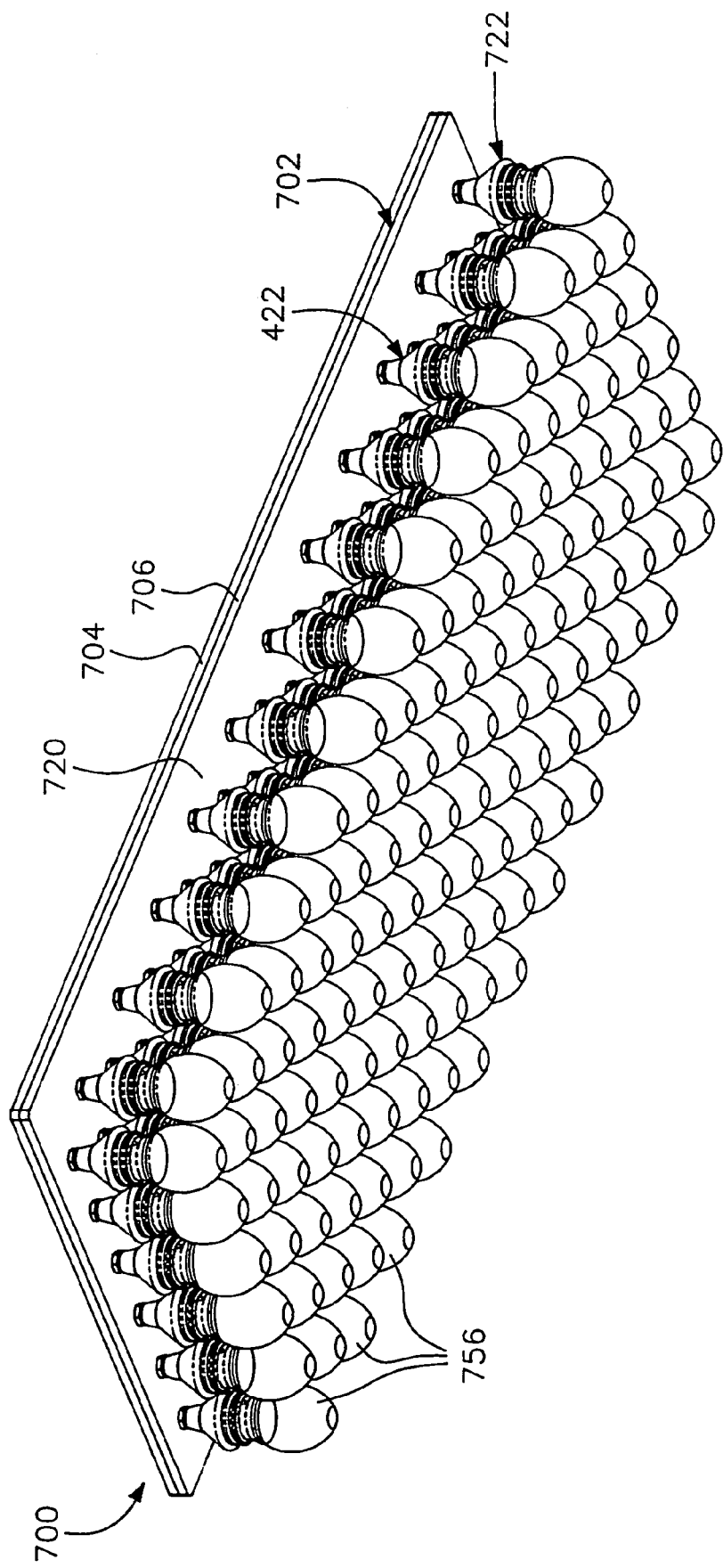
FIG. 40 is a bottom side perspective view of the transfer support plate and suction cup assembly as shown in FIG. 39, when assembled, with each suction cup assembly gripping an egg.

A preferred embodiment for the support plate and suction cup assemblies of the transfer assembly 133 in accordance with the present invention is shown in FIGS. 39 and 40 and is generally designated by reference numeral 700. This embodiment is illustrated generally in FIG. 6. In this embodiment, the assembly 700 includes a moving combination support and air channel plate, generally designated by reference numeral 702, somewhat similar to the injector support and holding plate 200. The transfer support plate 702 is made up of mating upper half plate 704 and lower half plate 706 which when sealed together form the transfer support plate 702. The lower mating surface 708 of the upper half plate 704 is machined out to form a raised lower surface 710. Spacers 712 are left unmachined in surface 708 and the mating upper surface of 713 of the lower half plate 706 is smooth and unmachined. Hence, when the half plates 704 and 706 are mated with the lower surface 708 engaged with the upper surface 713, the raised lower surface 710 forms a flat air chamber 714 through the transfer support plate 702, with the spacers 712 maintaining the height of the air chamber 714. A seal 715 is positioned in peripheral groove 717, also machined in the mating lower surface 708 of the upper half plate 704, to seal off the air chamber 714. The half plates 704 and 706 are adhered together by appropriate bolts or fasteners (not shown) through spaced holes 716 around the periphery of the half plates.

Positioned on top of the upper half plate 704 is a support plate 719. The support plate 719 has two aligned through holes 721 to receive the outer ends of the two piston rods of the tandem pneumatic cylinders 196. The outer ends are fastened to half plates 704 and 706 by appropriate bolts or the like (not shown) through aligned holes 723, shown only in the upper half plate 704. The air flow chamber 714 is connected to the vacuum generator, or other suction creating component, through holes 725 in upper half plate 704, which holes 725 are fitted with connectors 727 with appropriate pneumatic hoses (not shown) connecting to the vacuum generator. The support plate 719 is appropriately secured by bolts or other suitable fasteners (not shown) to the upper half plate 704 through holes 725.

Machined through the lower half plate 706 are a series of through holes 718 which interconnect with the chamber 714. The through holes 718 are spaced so as to have one hole 718 aligned with each depression or injected egg supported on the incubating tray 168 when positioned below the transfer support plate 702. Attached to each through hole 718 and supported from the lower surface 720 of the lower half plate 706 are a series of suction cup assemblies, generally designated by reference numeral 722. As shown in FIGS. 39 and 40, there is one suction cup assembly 722 for each through hole 718 and, correspondingly, each suction cup assembly 722 is aligned with a corresponding depression of, or an injected egg supported by, the tray 168.

The details of the suction cup assembly 722 are illustrated in FIGS. 41–46. In this embodiment, the hard plastic annular body 604 is replaced with a soft flexible vacuum bellows 724, which supports a slightly different flexible suction cup 726. Both the bellows 724 and the suction cup 726 are made of a flexible plastic, rubber or other elastomeric material and are designed so that the bellows 724 and the attached suction cup 726 can adjust to any size egg or egg tilt by compressing against the egg. This compression procedure produces its own vacuum or reduced pressure when the compressed bellows 724 is sealed at the top. The suction cup 726 allows for approximately a one-half inch diameter on top of the egg to be connected to atmospheric pressure through one or more lateral holes 728 located radially through the annular midsection 727 of the cup 726. The egg is picked up by the suction cup 726 through a vacuum ring 730 caused by a series of vertical holes 732 evenly spaced around the suction cup 726. This permits the suction cup 726 to pick up the egg that has been previously punctured on the top surface without creating negative pressure inside the egg.

The bellows 724 has a solid cone-shaped member 734 at its top end with a through bore 736 which accepts the hardware, generally designated by reference numeral 737, for connection to the air holes 718 of the transfer support plate 702. The connecting hardware 737 includes a cylindrical bolt 738 which is received in and extends through the through bore 736 and has a central opening 740 which extends therethrough. Mounted on the lower end of the bolt 738 is a securing cap 742 which engages the lower surface 744 of the cone member 734. Threaded onto the bolt 728 adjacent its upper end is a nut 745 which engages the upper surface of the cone shaped member 734. By threading the nut 745 to reduce the distance between the nut 745 and the cap 742, the bolt 738 is rigidified within the through bore 736. The upper end of the bolt 738 is attached within the holes 718 by mating threads or other sealing connection. Hence, the inside of bellows 724 is in air communication with air channels 714 of the support plate 702 and the pneumatic apparatus of the machine 100.

Figure 41:
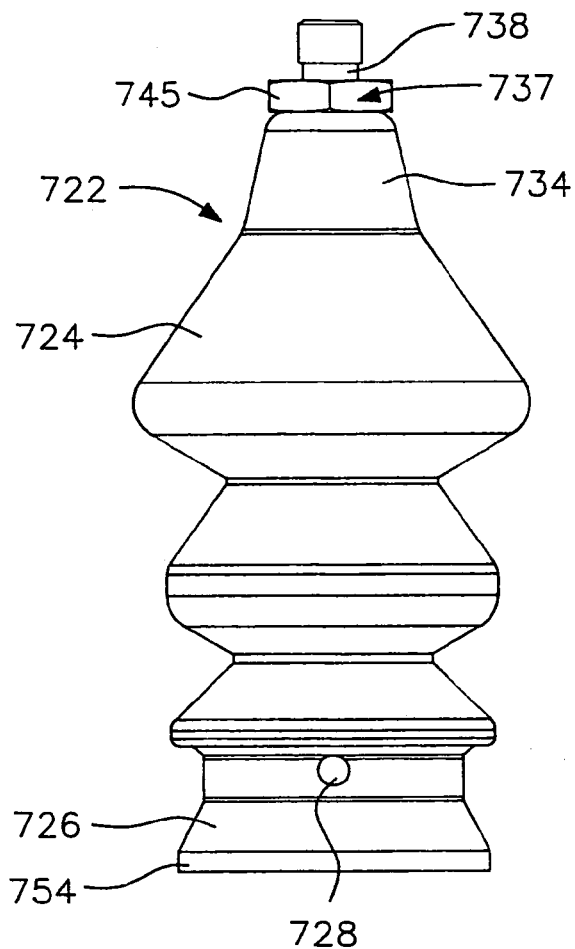
FIG. 41 is a side elevation view of the suction cup assembly shown in FIGS. 39 and 40.
Figure 42:
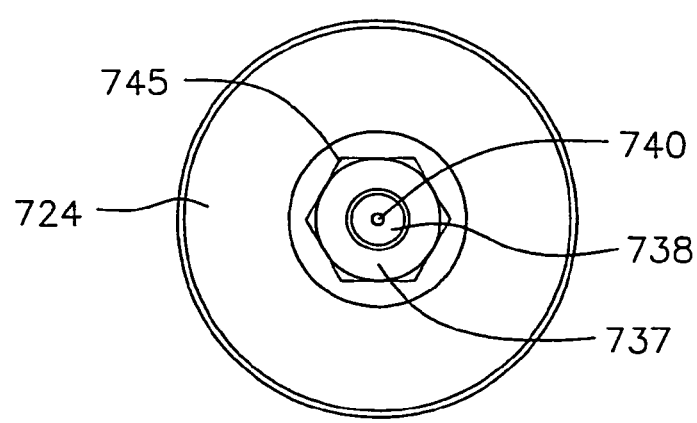
FIG. 42 is a top view of the suction cup assembly shown in FIGS. 39 and 40.
Figure 43:
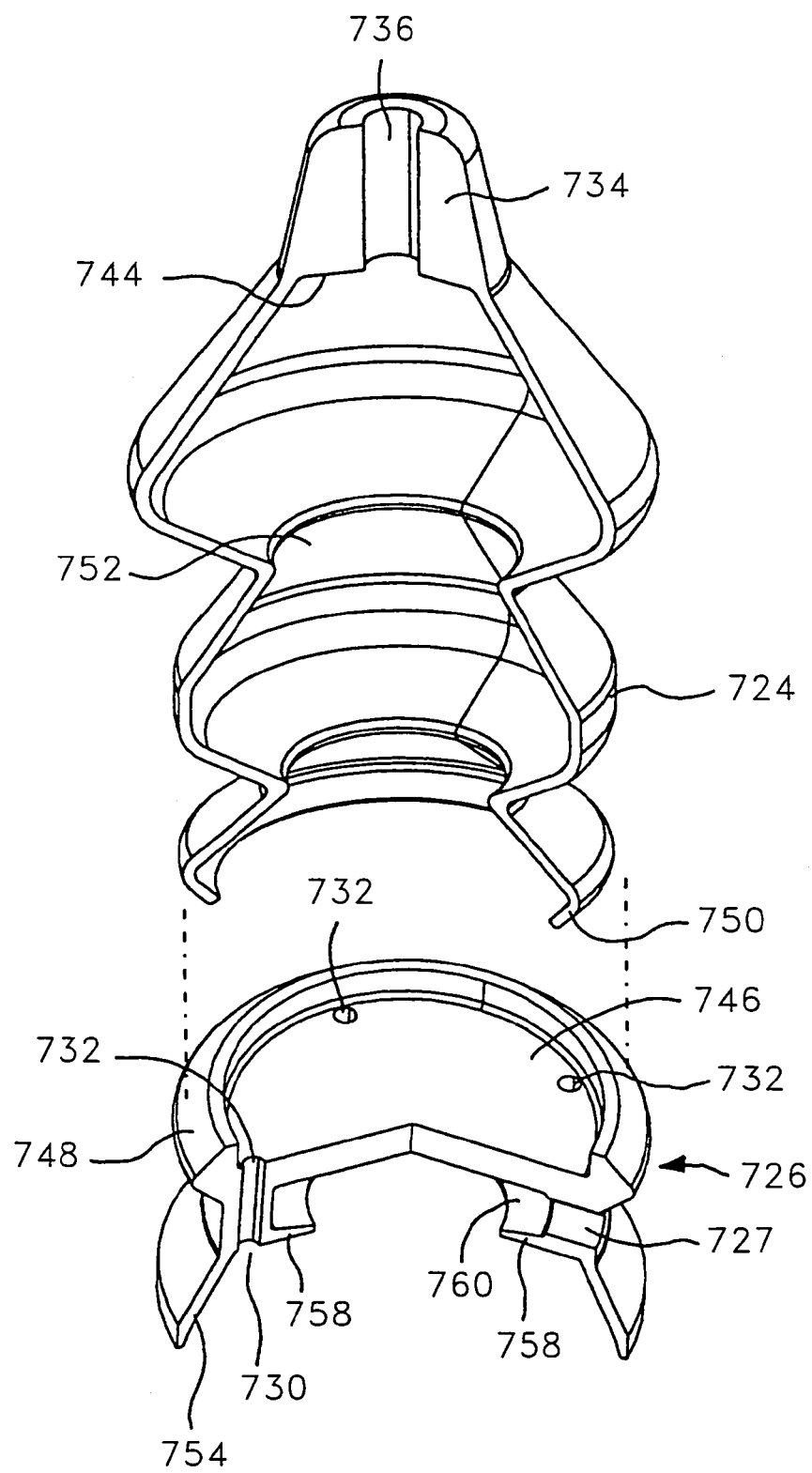
FIG. 43 is a partial cutaway, exploded perspective view of the flexible bellows and suction cup components of the suction cup assembly shown in FIGS. 39 and 40.
Figure 44:
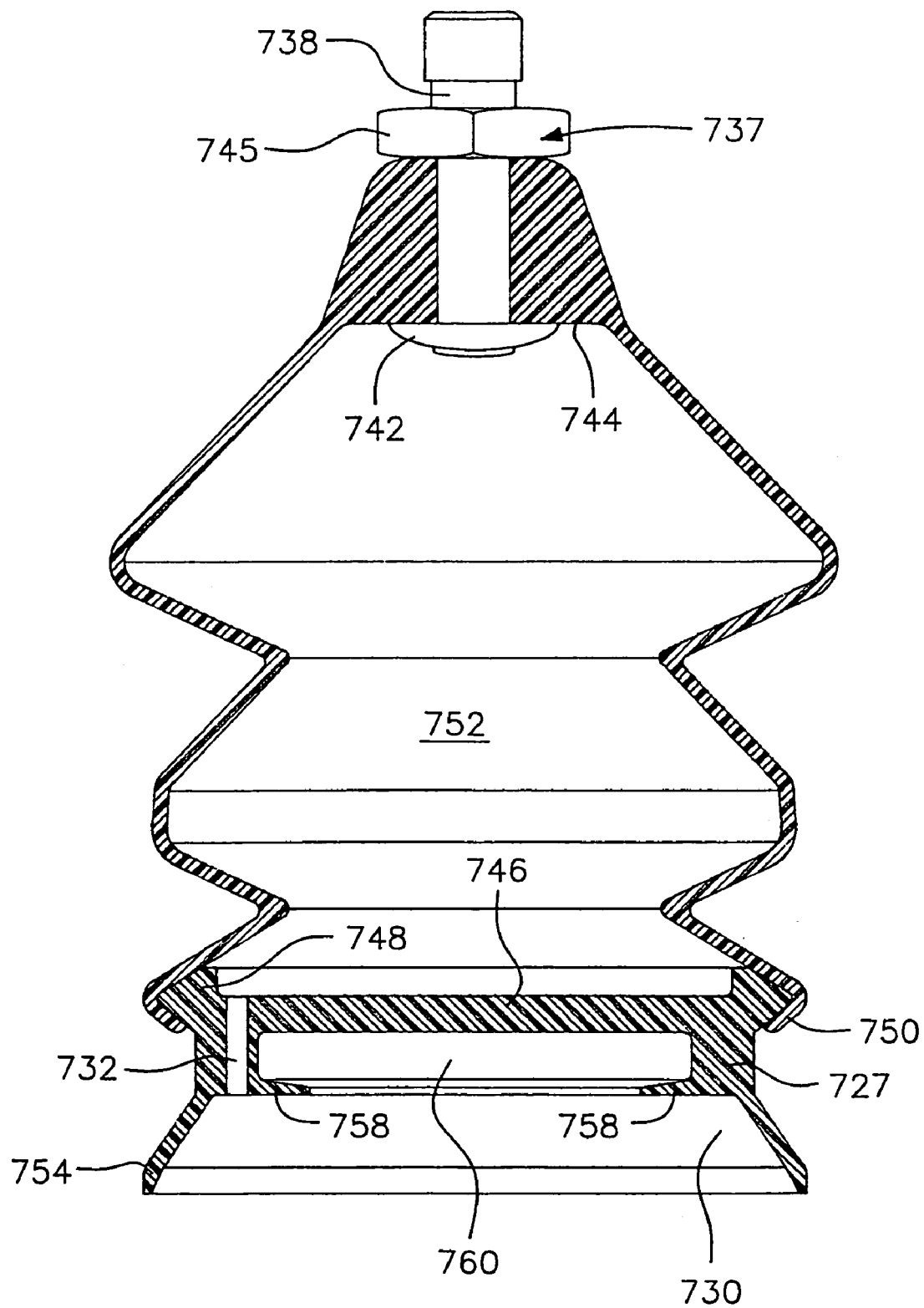
FIG. 44 is a partial cross-sectional view of the suction cup assembly shown in FIGS. 39 and 40.
Figure 45:
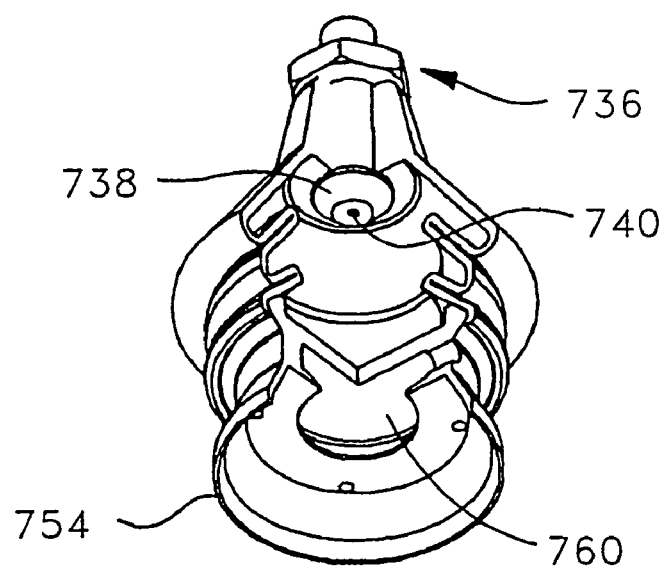
FIG. 45 is a partial cutaway, perspective view of the assembled suction cup assembly shown in FIGS. 39 and 40, illustrating the components of the suction cup assembly when in a compressed condition.
Figure 46:
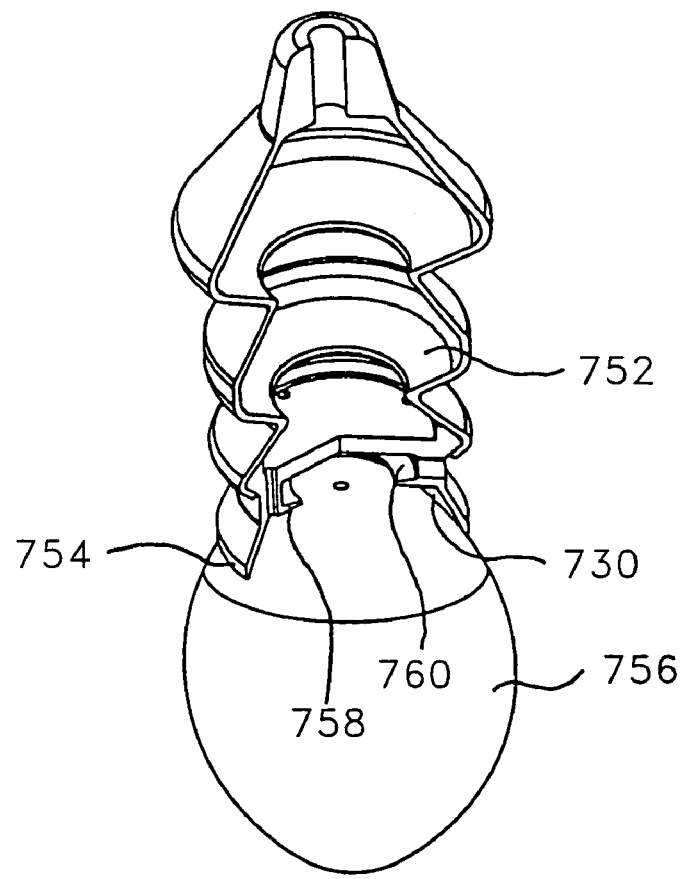
FIG. 46 is a partial cutaway perspective view of the assembled flexible bellows and suction cup components of the suction cup assembly shown in FIGS. 39 and 40 with the suction cup gripping an egg.

The suction cup 726 mounted on the lower end of bellows 724 is generally cylindrical and includes a top wall 746 and an upstanding circular rim 748 which extends above wall 746. The upstanding circular rim 748 fits into the circular receiving curl 750 at the bottom of bellows 724 to assemble the suction cup 726 at the lower end of the bellows 724, as shown in FIGS. 40 and 41. When assembled, the top wall 746 of the vacuum cup 726 forms a lower wall of a vacuum chamber 752 within the bellows 724.

The bottom of the suction cup 726 is similar to the bottom of the suction cup 608 of the previously described embodiment 602 in that it includes a tapering flexible circular seal 754 which forms an outer seal with the outer shell surface of an egg 756 when the cup 726 is positioned on the egg 756. Facing inwardly on the bottom of the suction cup 726, below wall 746 is an inner seal 758 which seals the suction cup 746 against the outer shell surface of the egg 756 at a location spaced away from and above the outer seal 754 to form the circular vacuum ring 730. Vertical holes 732 through the annular midsection 727 provide air flow communication between the circular vacuum ring 730 and the bellow vacuum chamber 752. Thus, as the support plate 702 descends in its downward stroke, and each suction cup 726 engages and seats on the upper outer surface of its aligned injected egg, the bellows 724 and bellows vacuum chamber 752 contract. This contraction forces air out through opening 740 in hollow rod 738, through plate air chamber 714 and out through the pneumatic system of the machine. When the support plate 702 reaches the lowermost position of its downward stroke, the vacuum generator of the pneumatic system of the machine creates a negative pressure in chamber 714 and thus into the bellows 724. Further, as the support plate 702 begins its upward stroke, the vacuum bellows 724 attempts to elongate creating a further vacuum or greater negative pressure in the bellows vacuum chamber 752 which is communicated to the sealed circular vacuum ring 730 through holes 732 thus holding the egg to the bottom of the suction cup 726 in a circular ring spaced away from the egg perforation. Meanwhile, the air space 760 above the inner seal 758 and below the wall 746 is maintained at atmospheric pressure by the lateral holes 728 in the annular midsection.

Subsequently, when the support plate 702 and suction cup assemblies 722 have transferred the injected eggs to the hatching tray 169, the closed off air to plate chamber 714 is opened, thus allowing air into the chamber 714, bellows vacuum chamber 752 and vacuum air ring 730, which releases the vacuum on the egg shells and releases the eggs 756 from suction cups 726. In the preferred embodiment, there are four 1/16 diameter holes 732 spaced vertically around the annular midsection 727. These holes permit the suction cup 726 to pick up eggs 756 that have been previously perforated on the top surface without creating negative pressure inside the egg. The annular midsection 727 preferably has two radial holes 728 for maintaining atmospheric pressure in chamber 760 around the egg perforation.

Figure 47:
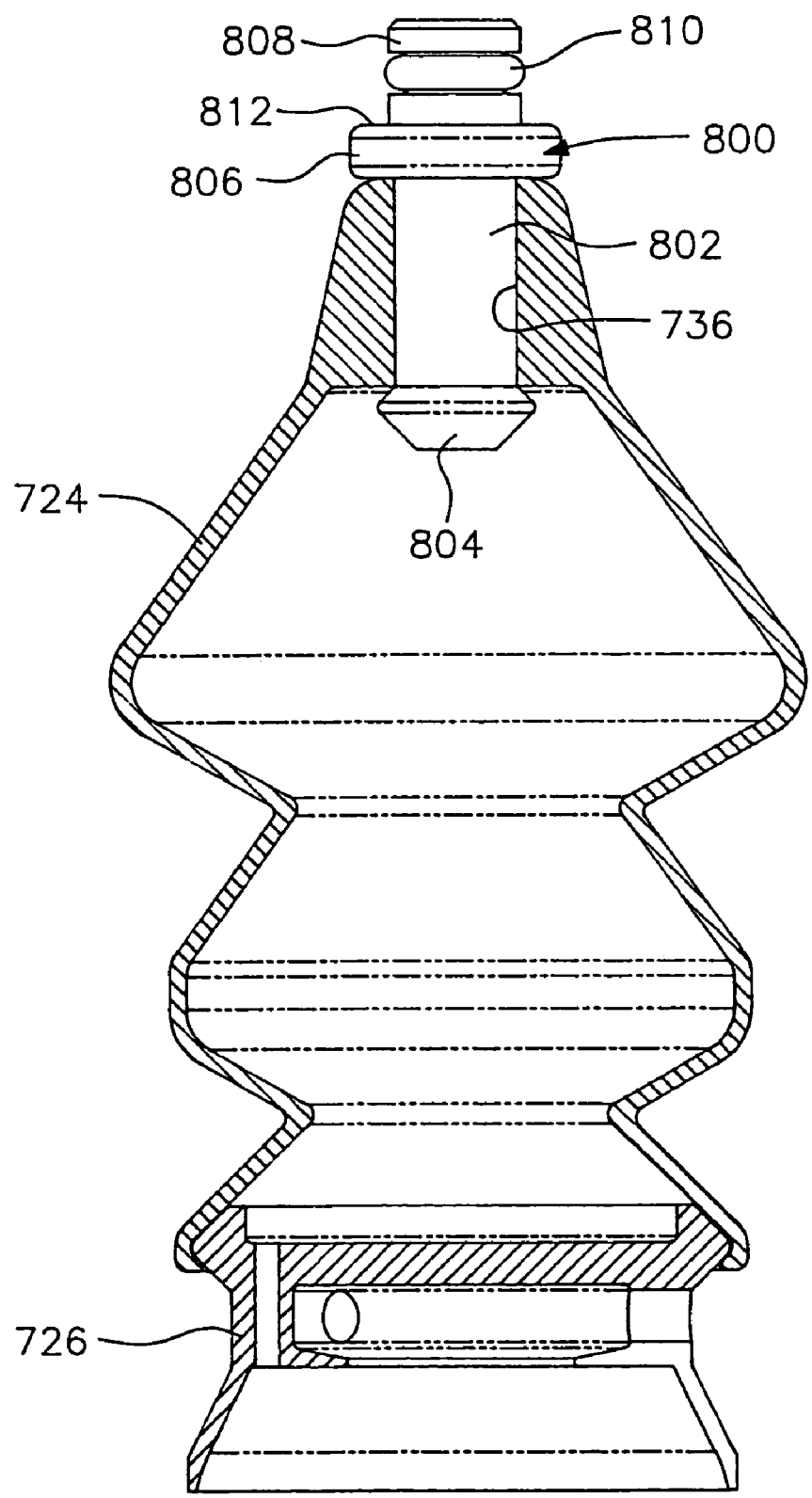
FIG. 47 is a partial cross-sectional view of the suction cup assembly shown in FIG. 44, but illustrating preferred hardware at the upper end which permits quick connection into and out of the suction cup openings in the transfer support plate.

A modified form of the hardware for connecting the suction cup assembly 722 to the air holes 718 of the transfer support plate 702 is shown in FIG. 47 and generally designated by reference numeral 800. The connecting hardware 800 includes a cylindrical bolt 802 which is received in and extends through the through bore 736 and has a central opening which extends therethrough. The bolt 802 has an enlarged lower end 804 which has a diameter larger than the through bore 736 so as to retain the bolt 802 in position against the lower surface of the cone shaped member 734. Threaded onto the bolt 802 adjacent its upper end is a circular spacer 806 which engages the upper surface of the cone shaped member 734 and retains the bolt 802 properly positioned in through bore 736. The top end 808 of bolt 802 has a smooth cylindrical surface and is fitted with a conventional elastomeric O-ring seal 810.

In this embodiment, the through holes or openings 718 in the lower half plate 706 have a smooth inner cylindrical surface which mates with the smooth outer cylindrical surface of bolt top end 808. When assembled, the top surface 812 of spacer 806 also abuts the lower surface 720 of the lower half plate 706. As such, the suction cup assembly 722 can be quickly connected into openings 718 with the O-ring 810 forming the seal with the inner cylindrical surface of the opening 718. Inasmuch as the suction cup assembly 722 is always under negative pressure through chamber 714 when lifting eggs, the negative pressure prevents the assembly 722 from pulling out of the opening 718. Otherwise, when not lifting eggs, the assembly 722 is sufficiently lightweight so as not to disconnect. The quick connecting and disconnecting assembly of this embodiment allows for easier and faster replacement of each suction cup assembly 722 from the support plate 702 for repair, replacement or the like.

While suction cup assemblies 602 and 722 are formed of two parts, it may be possible to form such assemblies of more parts or even a single unitary structure, so long as the reduced pressure necessary to grip and pick up the egg is formed away from the punctured hole and the area around the hole is maintained at atmospheric pressure so as not to impose any negative pressure inside the egg.

The total time required for the injection and transfer cycle, from inserting a filled incubating tray and empty hatching tray in place to removing the empty incubating tray and filled hatching tray from the rear of the machinery, is about 10 seconds and can be as short as 6–7 seconds. It is estimated that with the apparatus and method of the present invention one trained operator can inject over 50,000 eggs per hour, if the trays are off-loaded onto a conveyor at the back of the machine, or with two trained operators if the back end of the machine is off-loaded by hand. In the latter case, the machine provides a balanced system for the operators; each handles one full and one empty egg flat/hatching tray during each machine cycle. This system also facilitates timing between operators.

The integrated operation of the pneumatic cylinders, fiber optic sensors and their electronic controls will now be described. Each of the pneumatic air cylinders used in connection with the present invention incorporate a conventional magnetic or proximity sensor to signal the external end of each stroke. As the piston (not shown) moves up and down or forward and reverse, the magnetic sensor signals the position of the piston to the electronic controller (computer) located in the control panel. The controller compares the actual piston position with set point or program and sends an electronic signal to a servo pneumatic valve, this allows the computer to verify each position before it sends the electronic signal to a servo pneumatic valve to go to the next step.

There are seven fiber optic sensors located in the parallel tracks 150 and 152 where the incubating trays and hatching trays move through the machine, as previously described. The sensors are directly connected to the electronic controller (computer) and they are located at precise positions along the track to indicate if the incubating tray or hatching tray is in its correct position before the process of injection or transfer can proceed.

Five pneumatic air cylinders activate each of five dead stops located at precise positions along the parallel tracks 150 and 152, three on the incubating tray track 150 and two on the hatching tray track 152. The cylinders and dead stops are located in the center guide 158. The dead stops are activated by servo pneumatic valves controlled by the electronic controller (computer). The dead stops 292, 294 and 299 allow for a precise longitudinal positioning of the incubating tray and hatching tray in their respective parallel tracks.

Four short pneumatic air cylinders 164 and 166 are also located on the right side of the machine, preferably outside of the moving guide rail 156 of the incubating tray track 150. Two of the cylinders support the injection section moving rail 156 and two support the transfer section moving rail 156. These cylinders are actuated to full stroke and low pressure by the servo pneumatic valve controlled by the computer. They locate and hold the incubating tray straight and against the fixed guide rail 154 during the injection sequence and the transfer sequence.

Two rod-less pneumatic air cylinders 282 are associated with the pusher assemblies 280, one each in the center of the right side track 150 and the left side track 152. Servo pneumatic valves controlled by the computer activate these cylinders. The one on the right side track operates in two steps. The first step is to insure that the incubating tray is positioned firmly against the stop 292. Second, once the injection sequence is complete and the stop 292 has been pneumatically removed, the right side cylinder gently pushes the egg tray to the transfer section of the machine against stop 294. The second or left side cylinder pushes the hatching tray to the transfer section of the machine against stop 299 and alongside the incubating tray.

At the injection section 130 of the machine there are two pneumatic cylinders 186 located vertically and in fixed channel bridge 184. The cylinders hold and move the egg injection assembly 131 up and down. They operate to full stroke and are controlled by a servo pneumatic valve which, in turn, is controlled by the computer. At the transfer section 132 of the machine, there are also two pneumatic cylinders 194 located vertically and in movable channel bridge 188, which hold and activate the transfer assembly 133. They operate to full stroke during the egg pick up operation and they operate to a partial stroke controlled by a magnetic sensor signaling the computer during the completion or depositing of the eggs into the hatching tray.

Finally, there is one pneumatic rod-less cylinder 196 located in the front cross member 118 of the transfer section 132 of the machine. This cylinder 196 operates to full stroke and it carries the transfer assembly 133 sideways to transfer the eggs from above the incubating tray to above the hatching tray. It is controlled by end of stroke sensors sending signals to the computer.

As the machine touch screen 146 alerts the operator that the machine is ready to start operation, the first stop 270 at the entry of the right hand track 150 is retracted and the second stop 292 in the right hand track is activated. This allows the operator to load the incubator tray onto the incubator (right side) track. The pusher assembly 280 and the rod-less pneumatic air cylinder 282 insure that the tray is against the stop 292. The two fiber optic sensors 268 and 269, one in front and one in the rear, verify the location and the two pneumatic clamping air cylinders 164 insure that the tray is straight against the fixed inside rail 154. These operations guarantee the repeatability of location of all incubator trays by pushing against two fixed axes.

Once this positioning operation is completed and verified, the injecting sequence starts by activating the two pneumatically operated cylinders 186, which lower the injection assembly 131 over the eggs located in the incubating tray. Each injector 204 descends over an individual egg, self-adjusting to the egg's size. Once the sensor of cylinders 186 has verified to the computer the end of the stroke, the computer signals the servo pneumatic valve, and the gripper support plate 200 is pressurized, firmly and individually holding each injector 204 over its respective egg. After a fraction of a second the computer signals a servo pneumatic valve to pressurize the injectors, forcing the needles 208 to pierce the eggs. The high precision vaccine delivery system is activated and the vaccine is delivered. The needles are retracted, the gripper support plate is depressurized, and the pneumatic cylinders 186 lift the support plate carrying up the injectors 204 to its full up-stroke.

Once the computer has verified the completion of the up stroke, the computer once again signals the servo pneumatic valve that operates the injectors 204 and all needles 208 are exposed for disinfection purposes. The injection section rear stop 292 is retracted, the rear or transfer section stop 294 is simultaneously activated, the pneumatic clamping cylinders 164 of the injection section retract the moving guide rail 156, and the rod-less pneumatic air cylinder 282 is activated to cause the pusher assembly 280 to push the incubator tray to the rear of the machine or transfer section against the transfer section stop 294. The front and rear fiber optic sensors 271 and 273 of the transfer section verify the position of the tray, and the second set of pneumatic clamping cylinders 166 is operated to clamp the tray in the transfer section.

The operator should load the hatching tray on the parallel left side track 152 right after loading the incubator tray on the right side track 150. The hatching tray is pushed to the transfer section of the machine against a pneumatic stop 295 at the rear of the machine. The front and rear fiber optic sensors 295 and 297 located in the transfer section on the hatching tray track 152 verify the position of the tray. Once the hatching tray is in place, the transfer sequence may begin. A moving guide rail 156 for clamping the hatching tray in its track 152 is not necessary and preferably one is not included in the machine.

Once the signal has been received by the computer that a hatching tray is in place, the computer immediately signals a servo pneumatic valve activating two pneumatic cylinders 194 to lower to a full bottom stroke the transfer assembly 133 with the associated suction cup assemblies. The computer simultaneously turns on the vacuum generator and upon a minimal dwell at the bottom of stroke the eggs are picked up. The vacuum generator gauge signals the computer that it has reached the desired reduced pressure, the computer signals a servo pneumatic valve and the cylinders 194 lift the transfer assembly upwardly with the eggs attached to the suction cups and out of the incubator tray. As the cylinders 194 reach the top of their stroke, the sensor signals the computer to send a signal to a servo pneumatic valve to activate the rod-less cylinder 196 to move the transfer assembly mounted on linear bearing rails 190 across to the hatching tray track 152. Once the sensor detects the end of stroke, it signals the computer to lower the transfer assembly with the eggs into the hatching tray. The computer is programmed to recognize a mid-stroke sensor and signal the vacuum generator to reverse, gently releasing all eggs.

The computer is programmed to reverse this operation and return the transfer support plate back to the home position over the incubator tray track.

The injection section 130 and the transfer section 132 are also integrated together in the overall operation of the machine 100. More specifically, the transfer assembly 133 will not operate if there is no hatching tray in place on the hatching tray track 152 in the transfer section 132. In order for the transfer assembly 133 to be ready for operation, the fiber optic sensors 295 and 297 in left side track 152 must have sensed that the tray positioning assembly 280 of the hatching tray track 152 has pushed the hatching tray into its proper longitudinal position against stop 299. Further, stop 294 prevents the next hatching tray to be loaded from being pushed into the transfer section 132 until sensors 295 and 297 sense that the filled hatching tray in the transfer section 132 has been removed from the back of the machine.

The apparatus of the present invention as described herein provides a method for simultaneously injecting at one time all of the eggs necessary to fill one hatching tray and at a predetermined location within the eggs. The method of the present invention is applicable to any bird egg, and particularly those which are commercially reared for meat or egg production. Any substance may be efficiently and precisely injected into the egg, including without limitation antimicrobials such as antibiotics, bactericides, sulfonamides; vitamins; enzymes; nutrients; organic salts; hormones; adjuvants; immune stimulators; vaccines and the like.

The scope of the method of the present invention extends to immunization against all immunizable avian diseases, whether of viral, bacterial or other microbial origin. Birds which are reared in high density brooder houses, such as broiler and layer chickens, are especially vulnerable to infectious agents and would largely benefit from pre-hatch vaccination. Examples of such, without limitation, are Marek's disease, infectious bronchitis, infectious bursal, Newcastle disease, adenovirus diseases, reovirus, pox, laryngotracheitis, influenza, infectious coryza, fowl typhoid and fowl cholera. Vaccinating avian embryos potentially increases hatchability and livability during grow-out.

The present invention has many advantages, including providing an egg injection assembly 130 comprising a series of vertically movable injectors 204, each designed to position itself in relation to an egg so that the injection location within the egg is precise and consistent and all eggs are injected at one time. Since the injectors 204 are vertically adjustable, and the contact area of the stabilizing nipple 230 is relatively small, the injectors can individually adjust to varying heights and orientation of each individual egg in the incubating tray. This is desirable because eggs can assume different axes of rotation within depressions in the conventional egg flats. Hence, the relationship defined by the seated position of the stabilizing nipple 230 against the egg can position the extended needle at a predetermined location within the egg with respect to the center of rotation of the egg. Since the center of rotation of the egg remains relatively fixed with respect to the contact surface of the nipple 230, the injector configuration ensures that the needles always extend to what is substantially the same injection region with respect to the center of rotation of the egg irrespective of any egg tilt. Thus, a plurality of eggs can be consistently injected at a desired location, both horizontally and vertically, regardless of individual differences in egg size and orientation.

The needle design of the present invention also allows for egg shell penetration without a separate punch or drill. The needle tip is sturdy enough to penetrate thousands of egg shells, and the relatively large size of the hole diameter and the shape of the needle tip assures that clogging with egg shell is avoided.

The fluid delivery assemblies of the present invention move fluids through the machine under low internal line pressure without pumping and with a minimum of friction and turbulence. The fluid is injected out of the needles rapidly and with a very high controllable precision. Moreover, due to the low internal line pressure, hydraulic shear is minimized and cell integrity maximized. This is desirable since vaccine efficiency is dose-related and depends on cell integrity in vaccines, such as for Marek's disease. Thus, the apparatus of the present invention is particularly useful in vaccine delivery since the apparatus will destroy fewer cells in the delivery process and therefore a higher actual vaccine titer will be delivered to the egg.

The apparatus and method of the present invention also offer a very sanitary injection environment. All of the structural components of the machine are sealed and welded together; there are no cracks or crevices. The control panel 144 is preferably pressurized to keep out airborne contaminants. This sanitary environment minimizes the potential for cross-contamination of eggs. Moreover, the sanitization system is designed to be independent of the injection system thereby eliminating congested tubing. The positioning of the spray nozzles behind the pusher to traverse the injection section as the incubating tray with the injected eggs is simultaneously moved to the transfer section insures complete, uniform coverage of the sanitization fluid on all portions of the injectors which touch the eggs during the injection process while also saving time in the machine cycle. The sanitization spray directly impinges all sides of the exposed needles, the outside of the injectors below the support plate 200 and the underneath side of the support plate itself.

Further, egg transfer of the injected eggs from the incubating trays to the hatching trays in accordance with the present invention is a significant improvement over the known egg transfer machines using-vacuum cups. The vacuum cups potentially provide an easy path for cross-contamination of the eggs. In the present invention, after the egg is injected, the penetration hole in the egg is maintained at atmospheric pressure, thus ensuring that the egg interior is not subjected to a reduced pressure. This is accomplished by the special design of the vacuum cup assembly of the present invention by which the egg shell is subjected to vacuum pressure in a vacuum ring around the penetration hole and not over the hole. Thus, a possible path for cross contamination is eliminated. Moreover, the vacuum cup assembly of the present invention is easily cleaned in a few minutes, as opposed to the vacuum cups and manifolds of other machines which must be disassembled and placed in an aerated chemical bath for more than 30 minutes.

The apparatus of the present invention also produces a marked increase in productivity. The simplicity of the parallel machine tracks, horizontally moving transfer assembly and the egg handling paths reduce labor. One operator can perform all necessary operations, whereas the known technology requires two operators who have to continuously coordinate their tasks carefully for smooth and efficient operation. The present invention also allows feeding the incubating tray right from the hatchery without switching to another tray or feeding one egg flat at a time on a moving conveyor. The present method frees the operator to perform other tasks after he has loaded the filled incubating tray into the machine. Outputs are greater than with double the labor on the current commercial machine. The apparatus of the present invention is also simple in construction, this resulting in easier cleaning and a decrease in manufacturing and operating costs over known machines and methods.

The foregoing is considered as illustrative only of the principles of the invention. Further, since numerous modifications and changes will readily occur to those skilled in the art, it is not desired to limit the invention to the exact construction and operation shown an described, and, accordingly, all suitable modifications and equivalents may be resorted to, falling within the scope of the invention.

What is claimed is:

1. An automated injection machine for injecting fluid substances into eggs, said machine comprising:
    an incubating tray track and a hatching tray track rigidly mounted on a frame in substantially parallel relation and extending longitudinally through said machine, an incubating tray and a hatching tray being movable in a longitudinal direction of movement through said machine on said incubating tray track and said hatching tray track, respectively;
    a plurality of injectors in an injection section movable in a substantially vertical direction over said incubating tray track to inject eggs in the incubating tray positioned on said incubating tray track; and
    a plurality of egg transfer assemblies in a transfer section spaced longitudinally in said machine from said injection section so as to be sequentially in line therewith in the direction of movement, said egg transfer assemblies being movable in a substantially vertical direction over said incubating tray track to pick up injected eggs from said incubating tray and movable in a substantially horizontal direction to transfer said lifted eggs from over said incubating tray track to a position over said hatching tray track.

2. The automated egg injection machine as recited in claim 1, wherein the injection section includes a moveable injector assembly in which said injectors are individually moveable within said injector assembly in a vertical direction, and further includes gripping elements in said injector assembly which inflate to grip said injectors when properly positioned on said eggs for injection.

3. The automated egg injection machine as recited in claim 2, wherein the injection section further includes longitudinally spaced pneumatic cylinders to move said injector assembly in a substantially vertical direction between a down position in which said injectors can contact and inject said eggs, and an up position in which said injectors are spaced therefrom.

4. The automated egg injection machine as recited in claim 2, wherein the injector assembly includes a substantially horizontal support plate having a series of openings each of which supports one of said injectors, said inflatable gripping elements received in said support plate around said openings, and said support plate further having an air channel to apply pneumatic pressure external of said support plate to said gripping elements within said support plate to grip said injectors.

5. The automated egg injection machine as recited in claim 1, wherein said injection section includes a pneumatically operated pressurized fluid source, a fluid delivery manifold receiving pressurized fluid from said delivery source, and flexible tubing carrying said fluid from the pressurized fluid source to an injecting needle associated with each of said injectors.

6. The automated egg injection machine as recited in claim 5, wherein said fluid source is a heart-type valve pump.

7. The automated egg injection machine as recited in claim 5, wherein said fluid source is an elongated fluid chamber pressurized along an elongated side wall of said chamber and said fluid delivery manifold includes a plurality of high pressure pneumatic valves which upon opening deliver a precise quantity of said fluid through said flexible tubes to said injecting needles.

8. The automated egg injection machine as recited in claim 5, wherein said fluid delivery manifold is tilted approximately 1°–2° off horizontal.

9. The automated egg injection machine as recited in claim 1, wherein each injector has a contact nipple made of a flexible material secured adjacent said injector's lower end for seating against an upwardly facing shell portion of said egg when injected by an injecting needle.

10. The automated egg injection machine as recited in claim 9, wherein said contact nipple surrounds said injecting needle when injecting said egg and wipes an outer surface of said needle when retracted into said injector.

11. The automated egg injection machine as recited in claim 1, wherein said injectors include an injector housing defining a cylindrical chamber, an injection needle assembly positioned in said generally cylindrical chamber and surrounding an injecting needle which can extend out of a lower end of said injector housing, said injection needle assembly including a piston which moves up and down within said cylindrical chamber upon application of pneumatic pressure on opposite sides of said piston in said chamber.

12. The automated egg injection machine as recited in claim 11, and further comprising a contact nipple secured to said lower end of said injector housing through which said injecting needle extends during egg injection.

13. The automated egg injection machine as recited in claim 1, wherein each tray track includes a moving tray positioning assembly configured to slide said incubating tray on said incubating tray track sequentially into proper position for egg injection in said injection section and then longitudinally on said incubating tray track for egg transfer in said transfer section, said tray positioning assembly for the hatching tray track moving said hatching tray into a proper position in said transfer section to receive injected eggs from said egg transfer assemblies.

14. The automated egg injection machine as recited in claim 13, wherein said moving tray positioning assembly for said incubating tray track includes at least one sanitizing sprayer mounted thereon for spraying sanitizing fluid upwardly onto said plurality of injectors in said injection section while, at the same time, said tray positioning assembly is moving said incubating tray with injected eggs from said injection section to said transfer section.

15. The automated egg injection machine as recited in claim 1, wherein said plurality of injectors in said injection section inject said eggs in said incubating tray all at one time in a sufficient quantity to fill an associated hatching tray.

16. The automated egg injection machine as recited in claim 1, wherein each of said tracks includes opposed, spaced apart side rails forming a longitudinal opening therebetween.

17. An automated injection machine for injecting fluid substances into eggs, said machine comprising:
    an incubating tray track and a hatching tray track mounted on a frame in substantially parallel relation through said machine, at least said incubating tray track having a longitudinal opening therein;
    a plurality of injectors fixed horizontally in an injection position so as to be moveable only in a vertical direction to inject eggs in an incubating tray positioned on said incubating tray track at a first position that is in generally vertical alignment with said injection position; and at least one automated tray positioning assembly moving along said longitudinal opening of the incubating tray track to slide said incubating tray horizontally from said first position to a second position spaced longitudinally in said machine from said first position and in line therewith, said tray positioning assembly including a sanitizing device positioned beneath said injectors and configured to spray, simultaneously with the movement of said tray positioning assembly, sanitizing solution upwardly onto said plurality of injectors following each injection sequence.

18. The automated injection machine as recited in claim 17, wherein injected eggs in one incubating tray at said second position are transferred to an empty hatching tray while eggs in a next incubating tray are being simultaneously injected at said first position.

19. An automated injection machine for injecting fluid substances into eggs, said machine comprising:

an injection assembly for injecting eggs moving through said machine on an incubating tray;

a transfer assembly separate and spaced longitudinally from said injection assembly so as to be sequentially in line with said injection assembly in a direction of movement of said incubating tray, said transfer assembly moving said eggs from said incubating tray to a hatching tray while generally maintaining an original injection orientation of said eggs;

at least one automated tray positioning assembly configured to move said incubating tray in said direction of movement from a first position adjacent said injection assembly to a second position adjacent said transfer assembly; and a plurality of containers containing water and sanitizing and cleaning solutions, said containers pressurized by pneumatic pressure to force said water and solutions out of said containers when associated valves are opened.

20. The automated egg injection machine as recited in claim 19, and further comprising a hand held spray wand and nozzle integral with said machine and separately connected to the solution and water containers for spraying solution and water onto selected surfaces of said machine.

21. An automated injection machine for injecting fluid substances into eggs, said machine comprising:

an incubating tray track and a hatching tray track mounted on a frame in substantially parallel relation and extending longitudinally through said machine;

a plurality of injectors in an injection section over said incubating tray track to inject eggs in an incubating tray on said incubating tray track; and a plurality of egg transfer assemblies in a transfer section spaced longitudinally in said machine from said injection section, said egg transfer assemblies being configured to transfer injected eggs from said incubating tray to a hatching tray on said hatching tray track while, at the same time, said injectors are injecting eggs in the next incubating tray on said incubating tray track.

22. The machine as recited in claim 21, wherein said incubating tray and said hatching tray move on said respective incubating tray track and said hatching tray track from one end of said machine to an opposite end of said machine.

23. An automated injection machine for injecting fluid substances into eggs, said machine comprising:

an incubating tray track and a hatching tray track mounted on a frame in substantially parallel relation and extending longitudinally through said machine, an incubating tray and a hatching tray being movable in a longitudinal direction of movement through said machine on said incubating tray track and said hatching tray track, respectively;

a separate injection section and a separate transfer section spaced longitudinally on said machine and sequentially in line with one another in said direction of movement;

at least one egg injection assembly in said injection section movable in a vertical direction to inject an egg oriented for injection in said incubating tray positioned on said incubating tray track; and at least one egg transfer assembly separate from said injection assembly in said transfer section movable in a vertical direction over said incubating tray track to pick up said injected egg from said incubating tray while generally maintaining said egg in said injection orientation and movable in a horizontal direction to transfer said lifted egg from over said incubating tray track to a position over said hatching tray track while also generally maintaining said egg in said injection orientation.

24. The automated egg injection machine as recited in claim 23, wherein a plurality of injectors are individually movable in said vertical direction to inject each egg to the same predetermined vertical depth and location irrespective of the injection orientation of each egg in said incubating tray.

* * * * *